United States Patent
Ohmaru

(10) Patent No.: US 10,021,329 B2
(45) Date of Patent: Jul. 10, 2018

(54) IMAGING DEVICE, MONITORING DEVICE, AND ELECTRONIC DEVICE

(71) Applicant: Semiconductor Energy Laboratory Co., Ltd., Atsugi-shi, Kanagawa-ken (JP)

(72) Inventor: Takuro Ohmaru, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 536 days.

(21) Appl. No.: 14/806,876

(22) Filed: Jul. 23, 2015

(65) Prior Publication Data

US 2016/0037106 A1    Feb. 4, 2016

(30) Foreign Application Priority Data

Jul. 31, 2014 (JP) .................................. 2014-156296
Sep. 4, 2014 (JP) .................................. 2014-179769

(51) Int. Cl.
*H04N 5/378* (2011.01)
*H04N 5/369* (2011.01)
(Continued)

(52) U.S. Cl.
CPC ....... *H04N 5/3698* (2013.01); *H04N 5/23241* (2013.01); *H04N 5/32* (2013.01);
(Continued)

(58) Field of Classification Search
CPC .. H04N 5/3698; H04N 5/23241; H04N 5/332; H04N 5/32; H04N 5/378; H04N 5/369
See application file for complete search history.

(56) References Cited

U.S. PATENT DOCUMENTS

| 5,705,807 A | 1/1998 | Throngnumchai et al. |
| 5,731,856 A | 3/1998 | Kim et al. |

(Continued)

FOREIGN PATENT DOCUMENTS

| EP | 1737044 A | 12/2006 |
| EP | 2226847 A | 9/2010 |

(Continued)

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

(Continued)

*Primary Examiner* — Tony Ko
(74) *Attorney, Agent, or Firm* — Fish & Richardson P.C.

(57) ABSTRACT

An imaging device includes a pixel; a digital circuit; and an analog processing circuit including a constant current circuit, a current comparison circuit, and a control circuit. The pixel is capable of outputting differential data. The constant current circuit is capable of supplying a first current corresponding to the differential data, in accordance with a first control signal. The current comparison circuit is capable of supplying a second current that flows through the constant current circuit in accordance with a change in the differential data. The current comparison circuit has a function of setting a determination signal active depending on whether to supply the second current to the constant current circuit. The control circuit has a function of controlling the constant current circuit and the current comparison circuit to stop their functions as the determination signal becomes active. The digital circuit operates as the determination signal becomes active.

20 Claims, 32 Drawing Sheets

(51) Int. Cl.
*H04N 5/232* (2006.01)
*H04N 5/32* (2006.01)
*H04N 5/33* (2006.01)

(52) U.S. Cl.
CPC ............. *H04N 5/332* (2013.01); *H04N 5/369* (2013.01); *H04N 5/378* (2013.01)

(56) References Cited

U.S. PATENT DOCUMENTS

| | | | |
|---|---|---|---|
| 5,744,864 A | 4/1998 | Cillessen et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,046,282 B1 | 5/2006 | Zhang et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al. | |
| 7,282,782 B2 | 10/2007 | Hoffman et al. | |
| 7,286,173 B2 | 10/2007 | Zhang et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 7,791,117 B2 | 9/2010 | Zhang et al. | |
| 8,564,035 B2 | 10/2013 | Zhang et al. | |
| 8,836,626 B2 | 9/2014 | Ikeda | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0067424 A1* | 4/2003 | Akimoto .............. | G09G 3/3233 345/55 |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0007316 A1* | 1/2005 | Akimoto .............. | G09G 3/3233 345/76 |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2013/0222584 A1 | 8/2013 | Aoki et al. | |
| 2014/0361296 A1 | 12/2014 | Ikeda | |
| 2015/0332568 A1 | 11/2015 | Kurokawa | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| WO | WO-2004/114391 | 12/2004 |

OTHER PUBLICATIONS

Asaoka.Y et al., "29.1: Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

(56) References Cited

OTHER PUBLICATIONS

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application"SID Digest '07 : SID International Symposium Digest of Technical Papers, 2007, Vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YbFe2O4, and Yb2Fe3O7 Types of Structures for Compounds in the In2O3 and SC2O3—A2O3—BO Systems [A; Fe, Ga, or Al; B: Mg, Mn, Fe, Ni, Cu,or Zn] at Temperatures Over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 8, pp. 045501-1-045501-4.

Lee.H et al., "Current Status of, Challenges to, and Perspective View of AM-OLED", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

(56) References Cited

OTHER PUBLICATIONS

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White TANDEM OLEDS", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn—Oxide TFTS With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTS and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors By Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTS", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator" Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

\* cited by examiner

112

FIG. 22A1
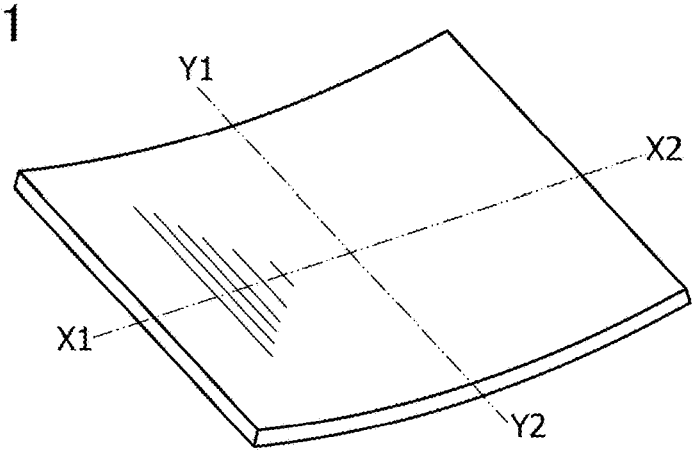
FIG. 22A2
FIG. 22A3
FIG. 22B1
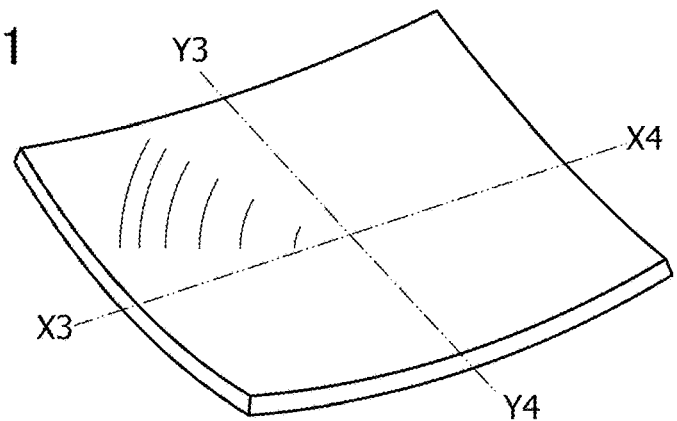
FIG. 22B2
FIG. 22B3
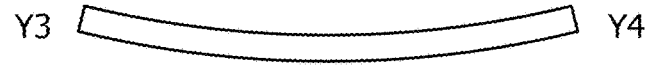

IMAGING DEVICE, MONITORING DEVICE, AND ELECTRONIC DEVICE

BACKGROUND OF THE INVENTION

1. Field of the Invention

One embodiment of the present invention relates to an imaging device, a monitoring device, and an electronic device.

Note that one embodiment of the present invention is not limited to the above technical field. The technical field of the invention disclosed in this specification and the like relates to an object, a method, or a manufacturing method. In addition, one embodiment of the present invention relates to a process, a machine, manufacture, or a composition of matter. Specific examples of the technical field of one embodiment of the present invention disclosed in this specification include a semiconductor device, a display device, a light-emitting device, a power storage device, an imaging device, a memory device, a method for driving any of them, and a method for manufacturing any of them.

2. Description of the Related Art

Imaging devices are generally incorporated in mobile phones and have come into widespread use (e.g., Patent Document 1). In particular, complementary metal-oxide-semiconductor (CMOS) image sensors have advantages of low price, high resolution, low power consumption, and the like over charge-coupled device (CCD) image sensors. An imaging device consists mainly of CMOS image sensors.

REFERENCE

Patent Document 1: U.S. Pat. No. 7,046,282

SUMMARY OF THE INVENTION

Using a CMOS image sensor in a security camera can provide a system that sounds an alarm when an intruder is detected. Specifically, it is possible that image processing is executed for comparing imaging data of an image captured when no intruder is present in a monitored area and imaging data of an image of the present time (the images are taken with a CMOS image sensor), and a determination signal is generated when there is a difference in the imaging data.

The procedure of the above image processing is as follows: first, data of each pixel in the CMOS image sensor is read out and the analog data is converted into digital data; then, the digital data is taken into a computer, and image processing software on the computer is executed. Accordingly, to generate the determination signal, a vast amount of power is consumed by A/D (analog/digital) conversion of the data read out from the CMOS image sensor, data transfer for taking a large amount of digital data into the computer, storage and reading of the digital data in/from a memory device in the computer, execution of the image processing software, and the like.

To further reduce power consumption of the entire imaging device, it is important to reduce power required for digital processing and power required for analog processing for controlling digital processing.

An object of one embodiment of the present invention is to provide a novel imaging device, a novel display device, a novel electronic device, or the like. Another object of one embodiment of the present invention is to provide an imaging device or the like with a novel structure and low power consumption.

Note that the objects of one embodiment of the present invention are not limited to the above objects. The objects described above do not disturb the existence of other objects. The other objects are ones that are not described above and will be described below. The other objects will be apparent from and can be derived from the description of the specification, the drawings, and the like by those skilled in the art. One embodiment of the present invention is to solve at least one of the above objects and the other objects.

One embodiment of the present invention is an imaging device including a pixel; a digital circuit; and an analog processing circuit including a constant current circuit, a current comparison circuit, and a control circuit. The pixel is capable of outputting differential data. The constant current circuit is capable of supplying a first current corresponding to the differential data, in accordance with a first control signal. The current comparison circuit is capable of supplying a second current that flows through the constant current circuit in accordance with a change in the differential data. The current comparison circuit has a function of setting a determination signal active depending on whether to supply the second current to the constant current circuit or not. The control circuit has a function of controlling the constant current circuit and the current comparison circuit to stop their functions when the determination signal becomes active. The digital circuit is capable of operating when the determination signal becomes active.

One embodiment of the present invention is an imaging device including a pixel; a digital circuit; and an analog processing circuit including a constant current circuit, a current comparison circuit, and a control circuit. The current comparison circuit includes a comparator, an amplifier circuit, a transistor, and a latch circuit. The pixel is capable of outputting differential data. The constant current circuit is capable of supplying a first current corresponding to the differential data, in accordance with a first control signal. The current comparison circuit is capable of supplying the constant current circuit with a second current flowing in accordance with a change in the differential data. The comparator has a function of generating an output signal for inputting and outputting the second current when a bias voltage is applied. The amplifier circuit has a function of amplifying the output signal. The transistor is provided between the comparator and the amplifier circuit. The on/off state of the transistor is controlled in accordance with a second control signal. The latch circuit has a function of latching the amplified output signal. The latch circuit has a function of setting a determination signal active. The control circuit has functions of stopping output of the bias voltage, switching output of the first control signal so that the first current does not flow through the constant current circuit, and switching output of the second control signal so that the transistor is turned off when the determination signal becomes active. The digital circuit is capable of operating when the determination signal becomes active.

In the imaging device of one embodiment of the present invention, the latch circuit is preferably initialized with a reset signal.

In the imaging device of one embodiment of the present invention, a channel formation region of the transistor preferably includes an oxide semiconductor.

Note that other embodiments of the present invention will be shown in Embodiments 1 to 10 and the drawings.

One embodiment of the present invention can provide a novel imaging device, a novel display device, a novel electronic device, or the like. Another embodiment of the present invention can provide an imaging device or the like with a novel structure and low power consumption.

Note that the effects of one embodiment of the present invention are not limited to the above effects. The effects described above do not disturb the existence of other effects. The other effects are ones that are not described above and will be described below. The other effects will be apparent from and can be derived from the description of the specification, the drawings, and the like by those skilled in the art. One embodiment of the present invention is to have at least one of the above effects and the other effects. Accordingly, one embodiment of the present invention does not have the above effects in some cases.

BRIEF DESCRIPTION OF THE DRAWINGS

In the accompanying drawings:

FIGS. 22A1 to 22A3 and FIGS. 22B1 to 22B3 are schematic diagrams illustrating one embodiment of the present invention;

DETAILED DESCRIPTION OF THE INVENTION

Figure 1:
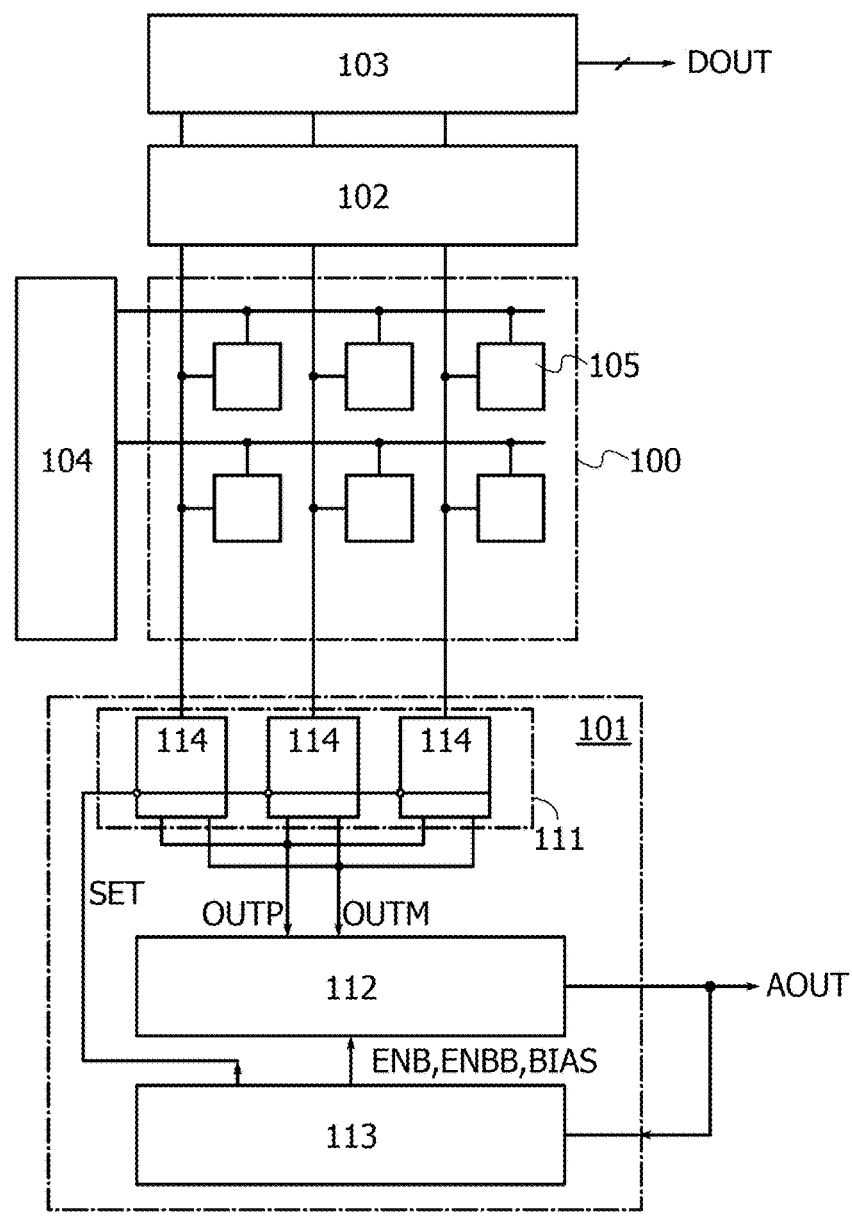
FIG. 1 is a block diagram illustrating one embodiment of the present invention.

Embodiments will be described below with reference to the drawings. Note that the embodiments can be implemented with various modes, and it will be readily appreciated by those skilled in the art that modes and details can be changed in various ways without departing from the spirit and scope of the present invention. Thus, the present invention should not be interpreted as being limited to the following description of the embodiments.

In the drawings, the size, the layer thickness, or the region is exaggerated for clarity in some cases. Therefore, embodiments of the present invention are not limited to such a scale. Note that the drawings are schematic views showing ideal examples, and embodiments of the present invention are not limited to shapes or values shown in the drawings. For example, variation in signal, voltage, or current due to noise or difference in timing can be included.

In this specification and the like, a transistor is an element having at least three terminals: a gate, a drain, and a source. The transistor has a channel region between the drain (a drain terminal, a drain region, or a drain electrode) and the source (a source terminal, a source region, or a source electrode), and current can flow through the drain, the channel region, and the source.

Since the source and the drain of the transistor change depending on the structure, operating conditions, and the like of the transistor, it is difficult to define which is a source or a drain. Thus, it is possible that a portion functioning as the source and a portion functioning as the drain are not called a source and a drain, and that one of the source and the drain is referred to as a first electrode and the other is referred to as a second electrode.

In this specification, ordinal numbers such as first, second, and third are used to avoid confusion among components, and thus do not limit the number of the components.

In this specification, the expression "A and B are connected" means the case where A and B are electrically connected to each other in addition to the case where A and B are directly connected to each other. Here, the expression "A and B are electrically connected" means the case where electric signals can be transmitted and received between A and B when an object having any electric action exists between A and B.

For example, any of the following expressions can be used for the case where a source (or a first terminal or the like) of a transistor is electrically connected to X through Z1 (or not through Z1) and a drain (or a second terminal or the like) of the transistor is electrically connected to Y through Z2 (or not through Z2), or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include "X, Y, and a source (or a first terminal or the like) and a drain (or a second terminal or the like) of a transistor are electrically connected to each other such that X, the source (or the first terminal or the like) of the transistor, the drain (or the second terminal or the like) of the transistor, and Y are electrically connected to each other in this order"; "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order"; and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order." When the connection order in a circuit configuration is defined by an expression similar to the above examples, a source (or a first terminal or the like) and a drain (or a second terminal or the like) of a transistor can be distinguished from each other to specify the technical scope.

Another example of the expression is "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path." It is possible to use the expression "a source (or a first terminal or the like) of a transistor is electrically connected to X through Z1 on at least a first connection path, the first connection path does not include a second connection path, the second connection path includes a connection path through the transistor, a drain (or a second terminal or the like) of the transistor is electrically connected to Y through Z2 on at least a third connection path, and the third connection path does not include the second connection path." It is also possible to use the expression "a source (or a first terminal or the like) of a transistor is electrically connected to X through Z1 on at least a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through Z2 on at least a third electrical path, the third electrical path does not include a fourth electrical path, and the fourth electrical path is an electrical path from the drain (or the second terminal or the like) of the transistor to the source (or the first terminal or the like) of the transistor." When the connection path in a circuit configuration is defined by an expression similar to the above examples, a source (or a first terminal or the like) and a drain (or a second terminal or the like) of a transistor can be distinguished from each other to specify the technical scope.

Note that these expressions are only examples, and there is no limitation on the expressions. Here, X, Y, Z1, and Z2 each denote an object (e.g., a device, an element, a circuit, a wiring, an electrode, a terminal, a conductive film, or a layer).

In this specification, terms for explaining arrangement, such as over and under, are used for convenience to describe the positional relation between components with reference to drawings. The positional relation between components is changed as appropriate in accordance with a direction in which each component is described. Thus, the positional relation is not limited to that described with a term used in this specification and can be explained with another term as appropriate depending on the situation.

The positional relation of circuit blocks in a block diagram is specified for description. Even when a block diagram shows that different functions are achieved by different circuit blocks, one circuit block may be actually configured to achieve different functions. Functions of circuit blocks in a diagram are specified for description, and even when a diagram shows one circuit block performing given processing, a plurality of circuit blocks may be actually provided to perform the processing.

In this specification, the term "parallel" indicates that an angle formed between two straight lines ranges from −10° to 10°, and accordingly also includes the case where the angle ranges from −5° to 5°. The term "perpendicular" indicates that the angle formed between two straight lines ranges from 80° to 100°, and accordingly also includes the case where the angle ranges from 85° to 95°.

In this specification, trigonal and rhombohedral crystal systems are included in a hexagonal crystal system.

Note that the terms "film" and "layer" can be interchanged with each other depending on circumstances or situations. For example, in some cases, the term "conductive film" can be used instead of the term "conductive layer," and the term "insulating layer" can be used instead of the term "insulating film."

Embodiment 1

The configuration of an imaging device in one embodiment of the present invention will be described with reference to FIG. 1.

In this specification and the like, an imaging device refers to any device having an image capturing function, or alternatively refers to a circuit having an image capturing function or a whole system including the circuit.

FIG. 1 is a block diagram illustrating the configuration of the imaging device in one embodiment of the present invention.

In FIG. 1, an imaging device 10 includes a pixel portion 100, an analog processing circuit 101, an A/D converter circuit 102, a column driver 103, and a row driver 104. The pixel portion 100 includes pixels 105. The analog processing circuit 101 includes a constant current circuit 111, a current comparison circuit 112, and a control circuit 113. The constant current circuit 111 includes constant current sources 114 corresponding to columns of the pixels 105.

The imaging device 10 operates in a first mode and a second mode.

In the first mode, the pixels 105 are sequentially selected on a row-by-row basis by the row driver 104, and the pixels 105 in each selected row output data (differential data)

including information on a difference between imaging data of a reference frame and that of the present frame. Note that the first mode may refer to an analog operation mode.

In the second mode, the pixels 105 are sequentially selected on a row-by-row basis by the row driver 104, and the pixels 105 in each selected row output imaging data. Note that the second mode may refer to a digital operation mode.

The pixel 105 includes an imaging element and at least one transistor. The pixel 105 has a function of obtaining imaging data by image capturing, and a function of holding differential data between imaging data of a reference frame and that of the present frame. A specific configuration and operation of the pixel 105 having functions of obtaining imaging data and holding differential data will be described later.

Note that the transistor included in the pixel 105 may be referred to as a first transistor. The first transistor is preferably a transistor with a low off-state current. The low off-state current of the transistor achieves a pixel with excellent retention of differential data. The imaging element can be a photoelectric conversion element using the photovoltaic effect, such as a photodiode, or a photoelectric conversion element using the photoconductive effect owing to a selenium-based semiconductor element or the like.

The analog processing circuit 101 executes analog data processing on imaging data that is analog data output from each pixel 105. Specifically, the analog processing circuit 101 processes differential data output from each pixel 105 as a current value that is analog data. The analog processing circuit 101 detects a change in differential data to detect a difference between imaging data of a reference frame and that of the present frame. A determination signal AOUT is set active when a change in differential data is detected, and is set inactive when a change in differential data is not detected.

The constant current source 114 included in the constant current circuit 111 feeds a constant current in response to a control signal SET. Given that a current flowing depending on differential data used as a reference is a first current, a current flowing through the constant current source 114 is set to be the same as the first current in advance. In the constant current circuit 111, a current flowing depending on differential data varies in response to a change in differential data; thus, a difference between this current and the first current occurs. To eliminate the difference, a second current is supplied between the constant current circuit 111 and the current comparison circuit 112 through a terminal OUTP or a terminal OUTM. For example, the second current flowing through the terminal OUTP flows to eliminate a difference between a current flowing through the pixel 105 and the first current when differential data becomes negative, whereas the second current flowing through the terminal OUTM flows to eliminate a difference between a current flowing through the pixel 105 and the first current when differential data becomes positive. A specific configuration and operation of the constant current circuit 111 will be described later.

The current comparison circuit 112 has a function of feeding the second current to the terminal OUTP or the terminal OUTM in response to a change in differential data. The current comparison circuit 112 includes a comparator, an amplifier circuit, a transistor, and a latch circuit, for example. The comparator can supply the second current to the terminal OUTP or the terminal OUTM by input of a reference voltage and a bias voltage BIAS. For example, since an output signal of the comparator varies depending on a change in potential of the terminal OUTP or the terminal OUTM, the comparator can supply the second current to the terminal OUTP or the terminal OUTM using this output change. The amplifier circuit amplifies a change in the output signal of the comparator and supplies the amplified signal to the latch circuit. The latch circuit latches a signal that varies in response to a change in the output signal of the comparator, that is, flow of the second current through the terminal OUTP or the terminal OUTM, thereby making the determination signal AOUT that indicates detection of a change in differential data active. To make the determination signal AOUT inactive, a reset signal is supplied to the latch circuit. The transistor is provided between the comparator and the amplifier circuit to control their electrical connection. The on/off state of the transistor is switched by controlling control signals ENB and ENBB. A specific configuration and operation of the current comparison circuit 112 will be described later.

The control circuit 113 has functions of stopping output of the bias voltage BIAS to the current comparison circuit 112, breaking electrical connection between the comparator and the amplifier circuit by controlling the control signals ENB and ENBB, and preventing flow of the first current through the constant current circuit 111 by controlling the control signal SET as the determination signal AOUT becomes active. A specific configuration and operation of the control circuit 113 will be described later.

The A/D converter circuit 102 can be transferred from the first mode to the second mode as the determination signal AOUT becomes active. In the first mode, the A/D converter circuit 102 does not need to perform digital processing consuming an enormous amount of energy, such as A/D conversion; thus, power consumption can be reduced. In the second mode, the A/D converter circuit 102 converts imaging data output from each pixel 105 into digital data by A/D conversion, and the digital data in each column is output to the outside as data DOUT by the column driver 103. The A/D converter circuit 102 is a circuit executing digital processing and thus referred to as a digital circuit in some cases.

For the column driver 103 and the row driver 104, any of a variety of circuits such as a decoder and a shift register is used.

In the imaging device 10 including the analog processing circuit 101 with the aforementioned configuration, the control circuit 113 can stop a current flowing through the constant current circuit 111 and the current comparison circuit 112 as the determination signal AOUT becomes active. The imaging device 10 can be transferred from the first mode to the second mode as the determination signal AOUT becomes active. In the first mode, digital processing that consumes a vast amount of power, such as A/D conversion, is not performed and only minimum analog processing for generating the determination signal AOUT is necessary; therefore, power consumption can be reduced. In the second mode, the amount of current flowing through the analog processing circuit 101 can be reduced, resulting in lower power consumption.

The expression "the determination signal AOUT is set active" means that an H signal is output when a circuit that operates with the determination signal AOUT is an active-high circuit. Meanwhile, the expression "the determination signal AOUT is set inactive" means that an L signal is output to an active-high circuit or that an H signal is output to an active-low circuit. The levels (H and L) of output signals interchange when a circuit that operates with the determination signal AOUT is an active-low circuit. In this specification, the A/D converter circuit 102, the operation of which is controlled with the determination signal AOUT, is described as an active-high circuit; thus, the A/D converter circuit 102 operates with an active H signal and is set in a non-operating state with an inactive L signal.

Figure 2:
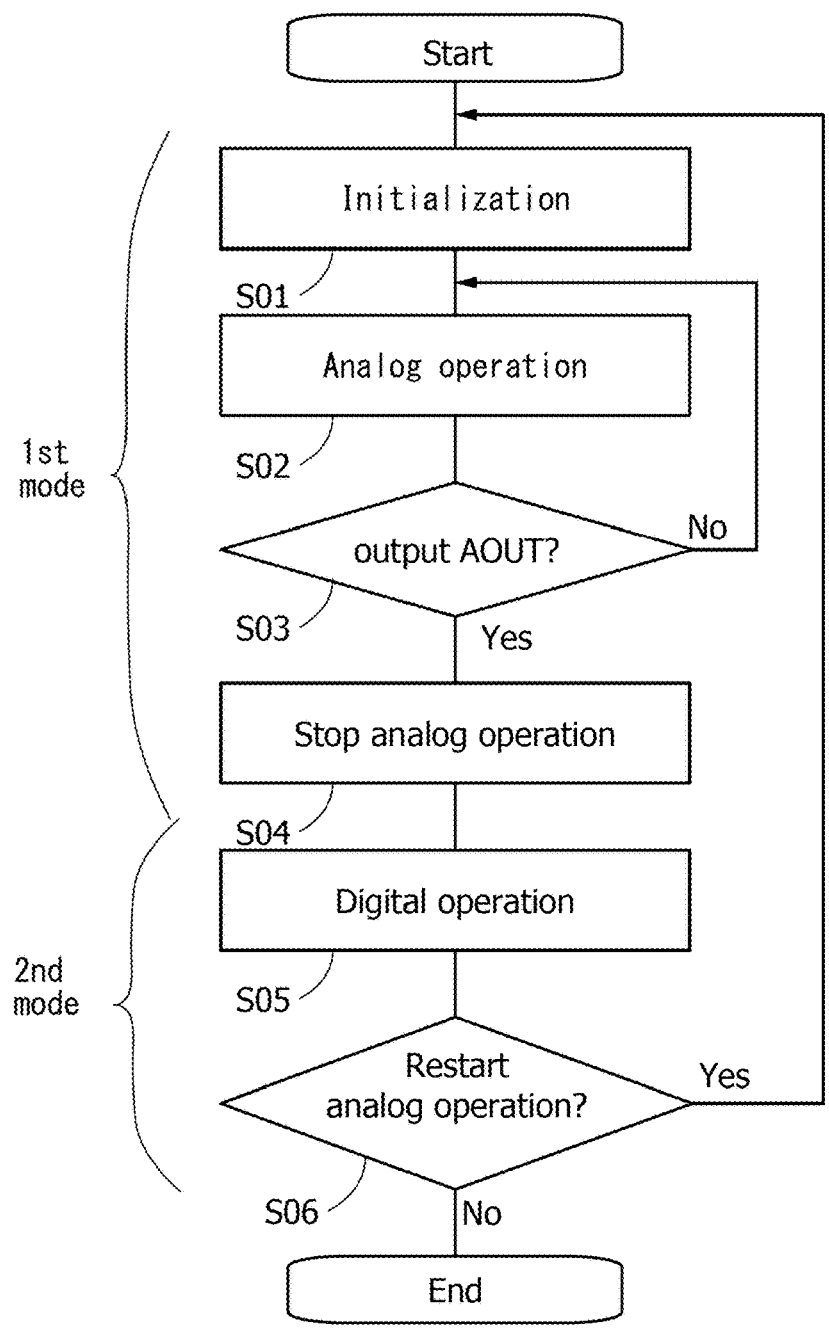
FIG. 2 is a flow chart illustrating one embodiment of the present invention.

Next, the operation of the imaging device 10 illustrated in FIG. 1 will be described using a flowchart in FIG. 2. In FIG. 2, a state in the first mode is regarded as an initial state.

First, the analog processing circuit 101 is initialized (Step S01). Specifically, the latch circuit included in the current comparison circuit 112 is reset so that the control signals ENB and ENBB, the bias voltage BIAS, and the control signal SET are initialized. With this initialization, the first current flows through the constant current circuit 111, and the second current flows from the current comparison circuit 112 in accordance with a change in differential data.

Next, analog operation, specifically, operation of detecting a change in differential data is performed (Step S02). This analog operation is not necessarily performed successively and is executed at regular intervals as necessary. Then, whether the determination signal AOUT is output or not is determined by detecting a change in differential data (Step S03). Step S02 continues when the determination signal AOUT is not output, and the procedure moves to Step S04 when the determination signal AOUT is output.

Subsequently, the analog operation is stopped (Step S04). Specifically, as the determination signal AOUT becomes active, the control signals ENB and ENBB, the bias voltage BIAS, and the control signal SET are switched such that a current flowing through the constant current circuit 111 and the current comparison circuit 112 stops.

In Step S05 and the subsequent step, the mode shifts to the second mode. Digital operation is performed (Step S05) as the determination signal AOUT becomes active in Step S03. Specifically, imaging data obtained in the pixel 105 is converted into digital data, and the digital data in each column is output to the outside as the data DOUT by the column driver 103. Then, whether the analog operation is restarted or not is determined (Step S06). The procedure returns to Step S01 to restart the analog operation. Note that in Step S06, whether the analog operation is restarted or not is determined when predetermined conditions are satisfied (e.g., when a predetermined time passes after the digital operation starts).

As described above, in the imaging device 10 with the aforementioned configuration, the control circuit 113 can stop a current flowing through the constant current circuit 111 and the current comparison circuit 112 as the determination signal AOUT becomes active. Then, the mode is transferred from the first mode to the second mode as the determination signal AOUT becomes active. In the first mode, digital processing that consumes a vast amount of power, such as A/D conversion, is not performed and only minimum analog processing for generating the determination signal AOUT is necessary; thus, power consumption can be reduced. In the second mode, the amount of current flowing through the analog processing circuit 101 can be reduced, resulting in lower power consumption.

This embodiment can be implemented in appropriate combination with any of the structures described in the other embodiments.

Embodiment 2

This embodiment will explain specific configuration examples of the constant current circuit, the current comparison circuit, and the control circuit included in the analog processing circuit described in Embodiment 1. In this embodiment, the description of the components is based on a configuration that is actually designed; thus, specific numerals used for describing the operation, such as the number of pixels and wirings provided in the row direction and column direction and the frequency of a clock signal and the like, are merely examples.

<Block Diagram of Analog Processing Circuit>

Figure 3:
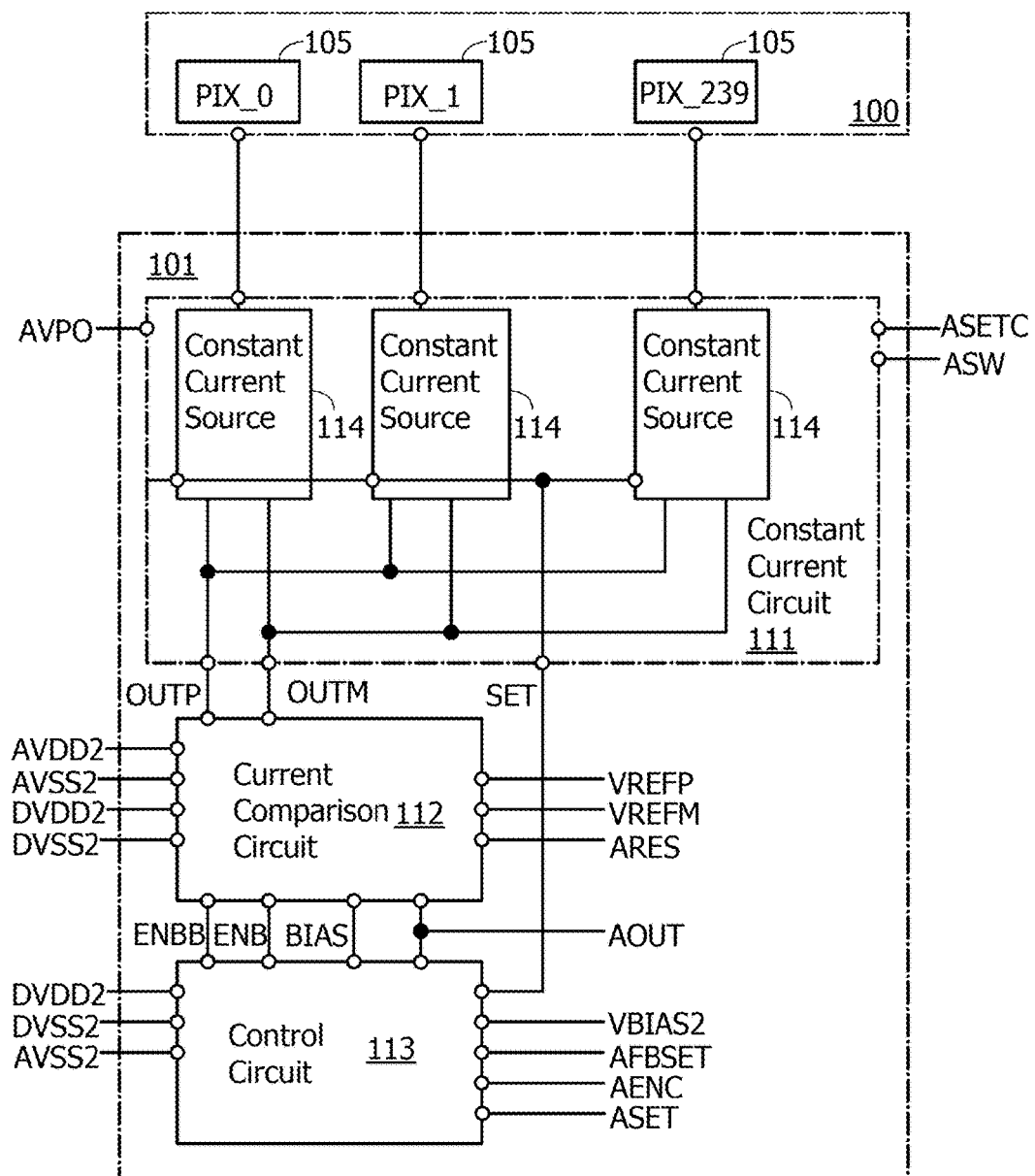
FIG. 3 is a block diagram illustrating one embodiment of the present invention.

FIG. 3 is a block diagram illustrating the analog processing circuit 101 and the pixels 105 in the pixel portion 100 electrically connected to the analog processing circuit 101. FIG. 3 illustrates an example where pixels 105 of 240 columns (only first, second, and 240th columns are shown) are provided.

In the constant current circuit 111, the constant current source 114 is provided for each column. The second current flows between the constant current source 114 and the current comparison circuit 112 through the terminal OUTP or the terminal OUTM. The control signal SET is output from the control circuit 113. The constant current circuit 111 is supplied from the outside of the analog processing circuit 101 with a potential AVPO for feeding a constant current, a signal ASETC for setting the constant current, and a signal ASW for feeding the second current.

In the current comparison circuit 112, the second current is supplied to the terminal OUTP or the terminal OUTM between the constant current source 114 and the current comparison circuit 112. The control signals ENB and ENBB and the bias voltage BIAS are output from the control circuit 113. The current comparison circuit 112 outputs the determination signal AOUT. The current comparison circuit 112 is supplied with power supply voltages AVDD2/AVSS2 for the comparator, power supply voltages DVDD2/DVSS2 for the amplifier circuit, reference voltages VREFP and VREFM (<VREFP), and a reset signal ARES from the outside of the analog processing circuit 101.

To the control circuit 113, the determination signal AOUT is input from the current comparison circuit 112. The control circuit 113 outputs the control signal SET, the control signals ENB and ENBB, and the bias voltage BIAS. The control circuit 113 is supplied from the outside of the analog processing circuit 101 with the power supply voltages DVDD2/DVSS2 for a logic circuit, a potential VBIAS2 for generating the bias voltage, the potential AVSS2, a signal AFBSET for controlling stop of the analog operation, a signal ASET for controlling the constant current circuit 111, and a signal AENC for controlling the current comparison circuit 112.

<Configuration Example of Constant Current Circuit>

Figure 4:
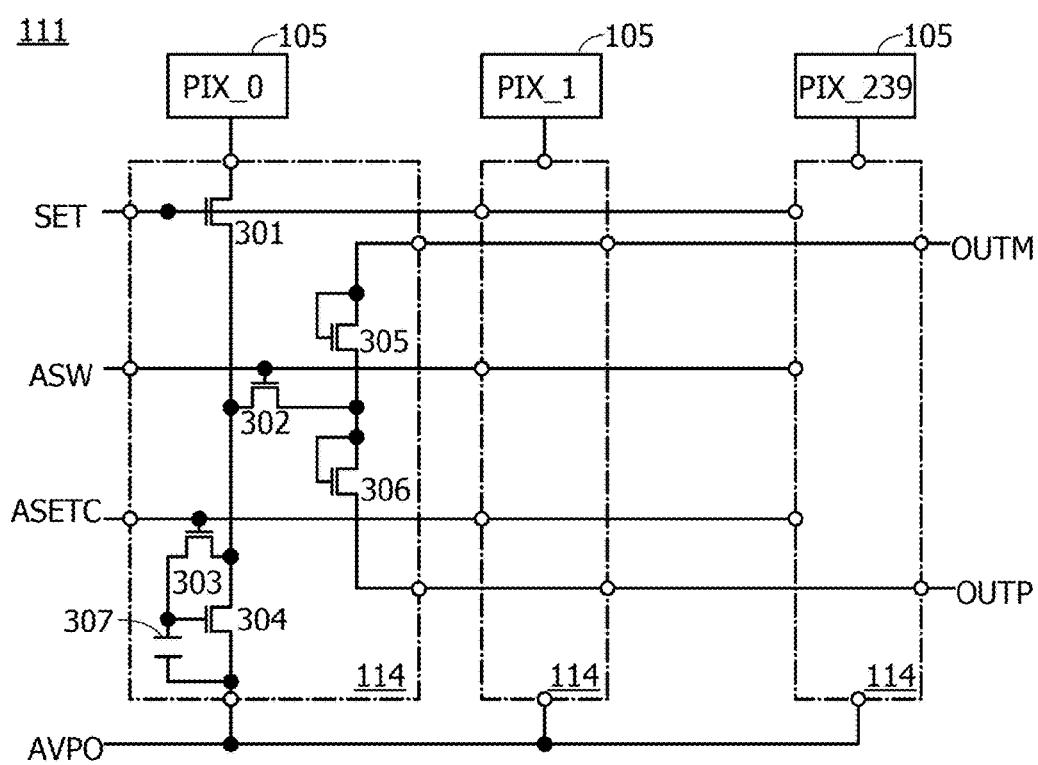
FIG. 4 is a circuit diagram illustrating one embodiment of the present invention.

FIG. 4 illustrates an example of the configuration of the constant current circuit 111. The constant current source 114 corresponding to the pixels 105 includes transistors 301 to 306 and a capacitor 307. In the following description, the transistors 301 to 306 are n-channel transistors as an example.

A gate of the transistor 301 is supplied with the control signal SET. A gate of the transistor 302 is supplied with the signal ASW. A gate of the transistor 303 is supplied with the signal ASETC. FIG. 4 is referred to for connections of the other elements included in the constant current circuit 111.

An example of the operation of the constant current circuit 111 will be described.

Operation for setting a reference current is described. The control signal SET is set to H level, the signal ASW is set to L level, and the signal ASETC is set to H level. At this time, in a given row (e.g., the first row), the value of current flowing through the constant current source 114 in each column depends on differential data of the pixel 105 at the time when the current flows. This current is also referred to as a reference current.

The value of current flowing through the transistor 301 is equal to that of current flowing through the transistor 304. A potential charged to the capacitor 307 of the constant current source 114 in each column is set to a potential corresponding to a gate voltage needed to feed a reference current.

Operation of the case where differential data does not change is described. The control signal SET and the signal ASW are set to H level, and the signal ASETC is set to L level. At this time, a current corresponding to differential data of each pixel in a given row flows through the transistor 301. Here, when differential data of each pixel in a given row does not change, the value of current flowing through the transistor 304 is equal to the reference current value. Thus, the second current does not flow from the terminals OUTP and OUTM through the transistors 305 and 306.

Operation of the case where differential data changes is described. The control signal SET and the signal ASW are set to H level, and the signal ASETC is set to L level. At this time, a current corresponding to differential data of each pixel in a given row flows through the transistor 301. Here, when differential data of each pixel in a given row changes, the value of current flowing through the transistor 304 is different from the reference current value. Thus, the second current flows from the terminal OUTP or the terminal OUTM through the transistor 305 or the transistor 306, and a current flowing through the transistor 304 becomes equal to the reference current.

To stop the operation of the constant current source 114, the control signal SET, the signal ASW, and the signal ASETC are set to L level. Thus, a current flowing through the transistors 301 and 304 can be stopped, and the function of the constant current source can be stopped.

To restart the operation of the constant current source 114, the operation of setting a reference current may be performed again. Alternatively, when the capacitor 307 holds a potential corresponding to a gate voltage needed to feed a reference current, a change in differential data may be detected by setting the control signal SET and the signal ASW at H level and the signal ASETC at L level.

<Configuration Example of Current Comparison Circuit>

Figure 5:
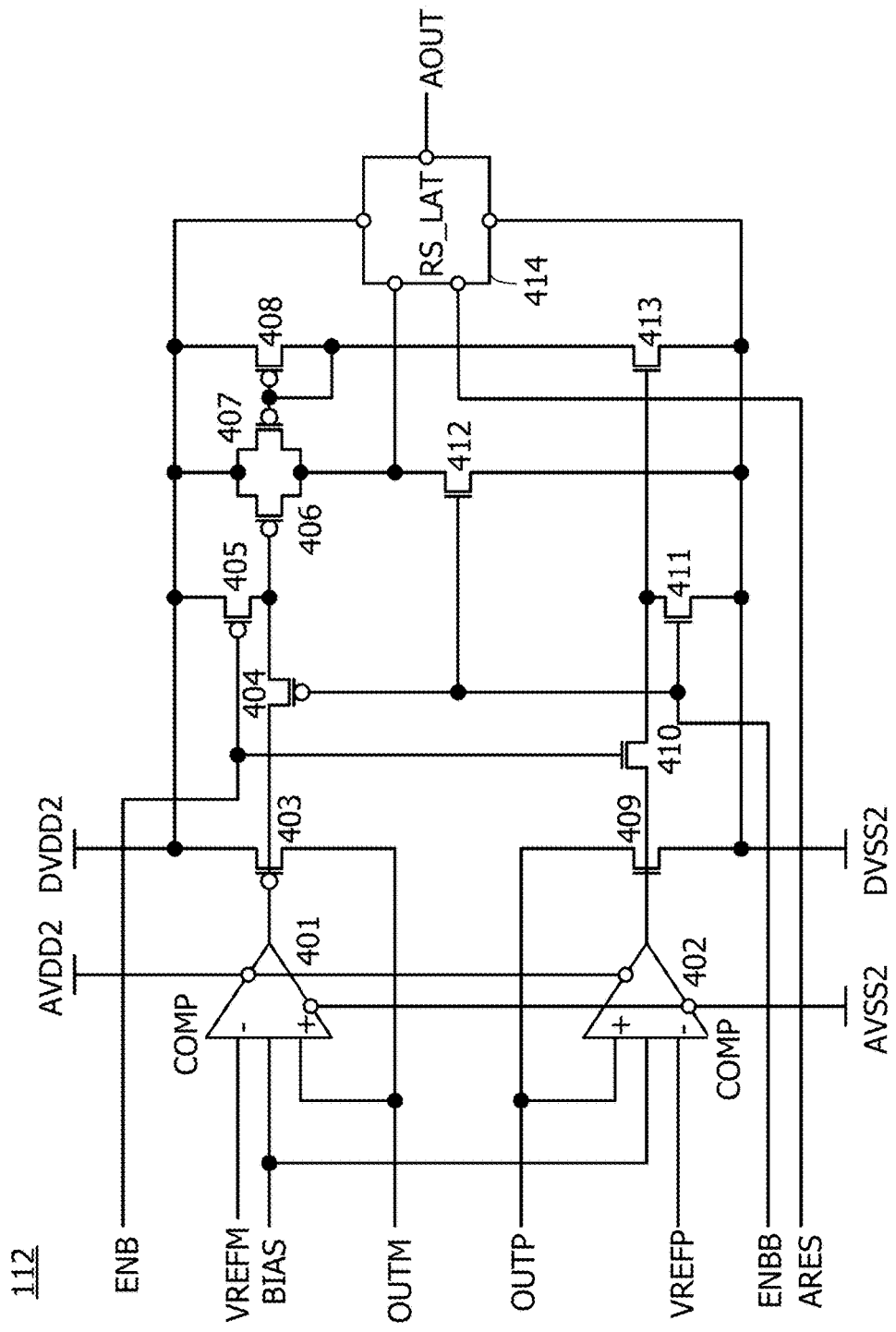
FIG. 5 is a circuit diagram illustrating one embodiment of the present invention.

FIG. 5 illustrates an example of the configuration of the current comparison circuit 112. The current comparison circuit 112 includes comparators 401 and 402, transistors 403 to 413, and a latch circuit 414. In the following description, the transistors 403 to 408 are p-channel transistors and the transistors 409 to 413 are n-channel transistors as an example.

The comparators 401 and 402 are supplied with the bias voltage BIAS. The comparator 401 is supplied with the reference voltage VREFM and a potential of the terminal OUTM. The comparator 402 is supplied with the reference voltage VREFP and a potential of the terminal OUTP. A gate of the transistor 403 is supplied with an output signal of the comparator 401. The output signal of the comparator 401 is supplied to a gate of the transistor 406 through the transistor 404. A gate of the transistor 409 is supplied with an output signal of the comparator 402. The output signal of the comparator 402 is supplied to a gate of the transistor 413 through the transistor 410. A current flowing through the transistor 413 flows through the transistor 408. The transistors 407 and 408 form a current mirror circuit. When a current flows through the transistors 407 and 408, the potential DVDD2 is supplied to the latch circuit 414 and the determination signal AOUT becomes active. The latch circuit 414 is reset with the reset signal ARES. FIG. 5 is referred to for connections of the other elements included in the current comparison circuit 112.

An example of the operation of the current comparison circuit 112 will be described.

The description is made on operation of the case where the second current flows through the terminal OUTM or the terminal OUTP to compensate a current flowing through the constant current source 114 when differential data changes. In a period during which the current comparison circuit 112 operates, the bias voltage BIAS is supplied, the control signal ENB is at H level, and the control signal ENBB is at L level; thus, the transistors 404 and 410 are on and the transistors 405, 411, and 412 are off.

First, the case where differential data retained in a pixel is finite (negative) and the second current flows through the terminal OUTM is described.

Given that the value of current flowing through the constant current source 114 when differential data is zero is $I_0$, in the case where differential data is finite (negative), the value of current flowing through the pixel is $(I_0-\Delta I_1)$. To compensate the current $-\Delta I_1$, the current $\Delta I_1$ flows to the current comparison circuit 112 by the operation of the comparator 401 and the transistor 403. Here, when the current supplied to the constant current source 114 through the transistor 403 is lower (higher) than $\Delta I_1$, the potential of a positive terminal of the comparator 401 decreases (increases) and an output of the comparator 401 decreases (increases). That is, the gate voltage of the transistor 403 decreases (increases), and a larger (smaller) amount of current $\Delta I_1$ can be supplied.

Furthermore, since a potential that is equal to the potential of the gate of the transistor 403 is supplied to the transistor 406 through the transistor 404, the current $n_1 \cdot \Delta I_1$ obtained by multiplying the current $\Delta I_1$ by $n_1$ (W/L of the transistor 406 to the transistor 403) flows through the transistor 406. With the amplifier circuit composed of the transistor 406 and the transistor 412, a latch pulse is supplied to the latch circuit 414, and the determination signal AOUT output from the latch circuit 414 becomes H level.

Next, the case where differential data retained in a pixel is finite (positive) and the second current flows through the terminal OUTP is described.

Given that the value of current flowing through the constant current source 114 when differential data is zero is $I_0$, in the case where differential data is finite (positive), the value of current flowing through the pixel is $(I_0+\Delta I_2)$. To compensate the current $+\Delta I_2$, the current $\Delta I_2$ flows to the current comparison circuit 112 by the operation of the comparator 402 and the transistor 409. Here, when the current supplied to the constant current source 114 through the transistor 409 is lower (higher) than $\Delta I_2$, the potential of a positive terminal of the comparator 402 increases (decreases) and an output of the comparator 402 increases (decreases). That is, the gate voltage of the transistor 409 increases (decreases), and a larger (smaller) amount of current $\Delta I_2$ can be supplied.

Furthermore, since a potential that is equal to the potential of the gate of the transistor 409 is supplied to the transistor 413 through the transistor 410, the current $n_2 \cdot \Delta I_2$ obtained by multiplying the current $\Delta I_2$ by $n_2$ (W/L of the transistor 413 to the transistor 409) flows through the transistor 413. The current flowing through the transistor 413 also flows through the transistor 408, and a current $n_3 \cdot n_2 \cdot \Delta I_2$ obtained by multiplying the current $n_2 \cdot \Delta I_2$ by $n_3$ (W/L of the transistor 407 to the transistor 408) flows through the transistor 407. With the amplifier circuit composed of the transistor 407 and the transistor 412, a latch pulse is supplied to the latch circuit 414, and the determination signal AOUT output from the latch circuit 414 becomes H level.

Even when differential data of pixels in each row are different between columns, a latch pulse is supplied to the latch circuit 414 by the operation of the comparators 401 and 402 described above, and the determination signal AOUT output from the latch circuit 414 becomes H level.

To stop the operation of the current comparison circuit 112, supply of the bias voltage BIAS is stopped, the control signal ENB is set to L level, and the control signal ENBB is set to H level. Thus, a current flowing through the transistors 404 and 410 is stopped and the gate potentials of the transistors 406, 412, and 413 are set such that a current does not flow through these transistors; consequently, the function of the current comparison circuit 112 can be stopped.

To restart the operation of the current comparison circuit 112, supply of the bias voltage BIAS is restarted, the control signal ENB is set to H level, and the control signal ENBB is set to L level. Thus, the transistors 404 and 410 are turned on and the transistors 405, 411, and 412 are turned off.

Figure 6A:
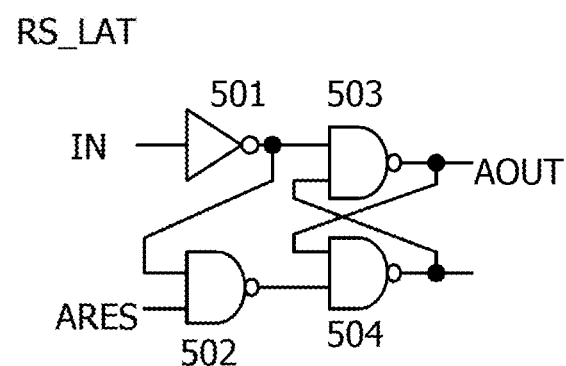
FIGS. 6A and 6B are circuit diagrams illustrating one embodiment of the present invention.

FIG. 6A illustrates an example of a specific configuration of the latch circuit 414. The latch circuit illustrated in FIG. 6A includes an inverter 501 and NANDs 502 to 504.

Figure 6B:
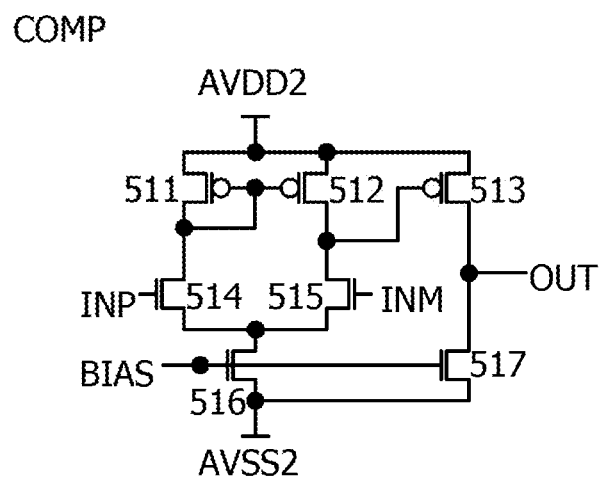

FIG. 6B illustrates an example of a specific configuration of the comparators 401 and 402. The comparator illustrated in FIG. 6B includes transistors 511 to 517. Here, as an example, the transistors 511 to 513 are p-channel transistors and the transistors 514 to 517 are n-channel transistors. Note that NP represents a positive terminal and NM represents a negative terminal.

<Configuration Example of Control Circuit>

Figure 7:
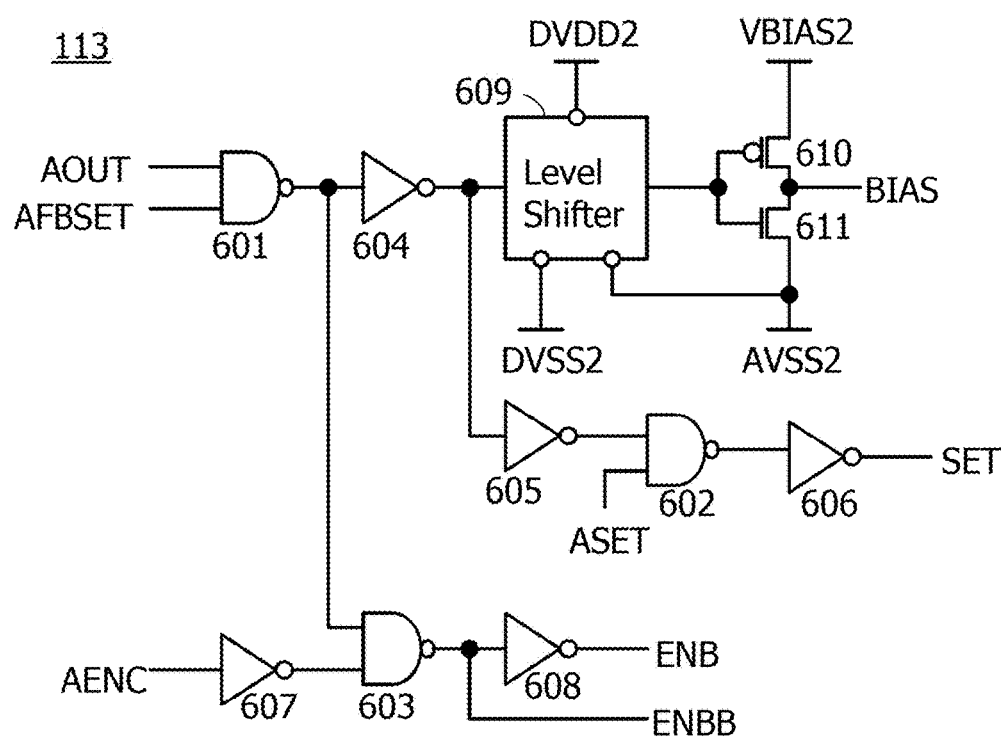
FIG. 7 is a circuit diagram illustrating one embodiment of the present invention.

FIG. 7 illustrates a configuration of the control circuit 113. The control circuit 113 includes NANDs 601 to 603, inverters 604 to 608, a level shifter 609, and transistors 610 and 611. Here, the transistor 610 is a p-channel transistor and the transistor 611 is an n-channel transistor as an example.

The NAND 601 is supplied with the determination signal AOUT and the signal AFBSET. The level shifter 609 is supplied with a signal obtained by inverting an output of the NAND 601 through the inverter 604. Gates of the transistors 610 and 611 are supplied with a signal output from the level shifter 609, and the bias voltage BIAS is supplied in accordance with the on/off state of the transistors 610 and 611. The NAND 602 is supplied with the signal ASET and a signal output from the NAND 601 through the inverters 604 and 605, and outputs the signal SET through the inverter 606. The NAND 603 is supplied with an inverted signal obtained by inverting the signal AENC through the inverter 607 and a signal output from the NAND 601. A signal output from the NAND 603 is the control signal ENBB and becomes the control signal ENB through the inverter 608. FIG. 7 is referred to for connections of the other elements included in the control circuit 113.

Figure 8:
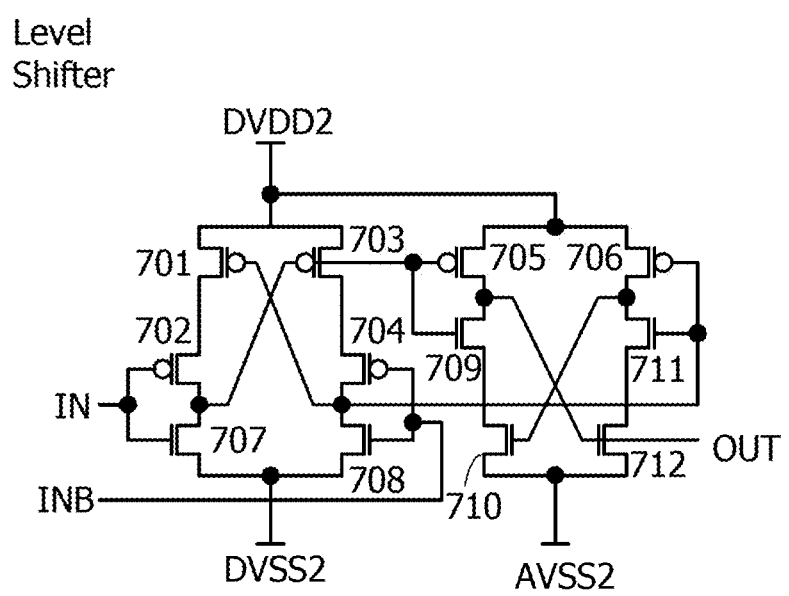
FIG. 8 is a circuit diagram illustrating one embodiment of the present invention.

FIG. 8 illustrates an example of a specific configuration of the level shifter 609. The level shifter 609 illustrated in FIG. 8 includes transistors 701 to 712. Here, as an example, the transistors 701 to 706 are p-channel transistors and the transistors 707 to 712 are n-channel transistors. Note that N represents an input terminal and NB represents an inverting terminal An example of the operation of the control circuit 113 will be described.

Figure 9:
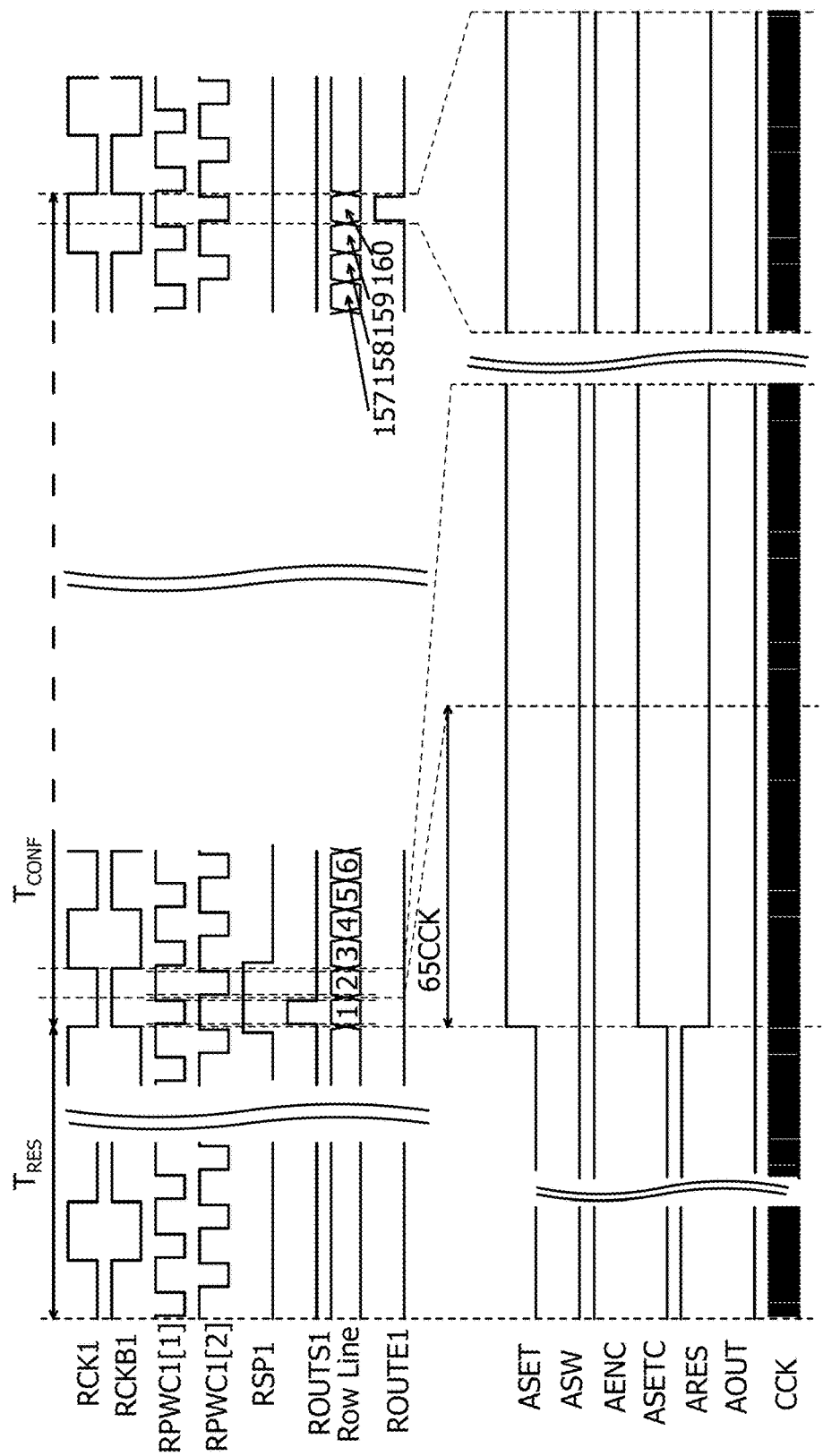
FIG. 9 is a timing chart illustrating one embodiment of the present invention.

First, operation for setting a reference current in the constant current source 114 will be described. FIG. 9 is a timing chart showing operation of signals at this time. The operation of the control circuit 113 is described using two divided periods of a reset period $T_{RES}$ and a setting period $T_{CONF}$ in FIG. 9.

The timing chart of FIG. 9 shows a clock signal RCK1, an inverted clock signal RCKB1, a pulse width control signal RPWC1[1], a pulse width control signal RPWC1[2], and a start pulse RSP1 that are supplied to the row driver, an output signal ROUTS1 of the first row, the order of selecting rows (Row Line), and an output signal ROUTE1 of the last row (here, the 160th row). The timing chart of FIG. 9 also illustrates the signal ASET, the signal ASW, the signal AENC, the signal ASETC, the signal ARES, the determination signal AOUT, and a reference clock CCK.

Operation in the reset period $T_{RES}$ for initializing the analog processing circuit 101 is described. In the reset period $T_{RES}$, the signal ARES is set to H level. The signal ASET and the signal ASW are set to L level, the signal AENC is set to H level, and the signal ASETC is set to L level. With the operation in the reset period $T_{RES}$, the determination signal AOUT becomes L level regardless of the state in the previous period.

Next, operation in the setting period $T_{CONF}$ for setting a reference current in the constant current source 114 is described. In the setting period $T_{CONF}$, the signal ASET is set to H level, the signal ASW is set to L level, the signal AENC and the signal ASETC are set to H level, and the signal ARES is set to L level. With the operation in the setting period $T_{CONF}$, the determination signal AOUT can be switched from L level to H level in accordance with a change in differential data.

Figure 10:
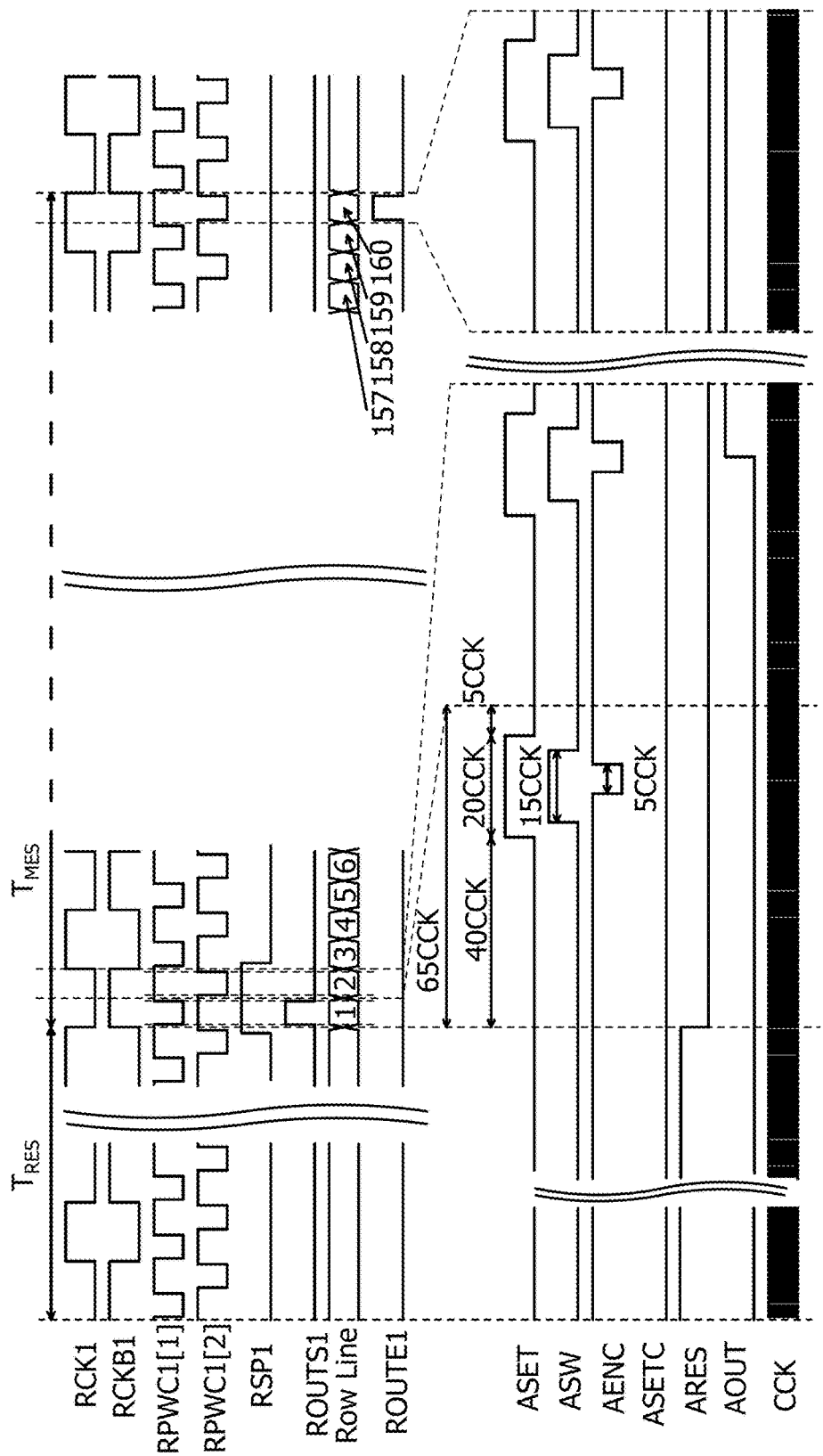
FIG. 10 is a timing chart illustrating one embodiment of the present invention.

Then, operation of detecting a change in differential data in accordance with a change in the determination signal AOUT will be described. FIG. 10 is a timing chart showing operation of signals at this time. The operation of the control circuit 113 is described using two divided periods of the reset period $T_{RES}$ and a measurement period $T_{MES}$ in FIG. 10. Note that the operation in the reset period $T_{RES}$ and the signals shown in the timing chart are the same as those in FIG. 9; therefore, the description is not repeated.

Operation in the measurement period $T_{MES}$ for detecting a change in differential data in accordance with a change in the determination signal AOUT is described. In the measurement period $T_{MES}$, assuming that one horizontal selection period has a length corresponding to a wavelength of 65 reference clocks CCK, the signal ASET is set to L level in a period with a length of 40 reference clocks CCK, set to H level in a period with a length of 20 reference clocks CCK, and set to L level in a period with a length of 5 reference clocks CCK. The signal ASW is set to H level in a period with a length of 15 reference clocks CCK in a period during which the signal ASET is at H level, and is set to L level in the other periods. The signal AENC is set to L level in a period with a length of 5 reference clocks CCK in a period during which the signal ASW is at H level, and is set to H level in the other periods. The signal ASETC and the signal ARES are set to L level. With the operation in the measurement period $T_{MES}$, the determination signal AOUT can be switched from L level to H level in accordance with a change in differential data.

As shown in FIG. 10, in the measurement period $T_{MES}$, the signal ASET, the signal ASW, and the signal AENC are set active only in a given period in a horizontal scan period for pixels. Accordingly, in a horizontal scan period, power consumption can be reduced at regular intervals while differential data is detected.

With the above-described constant current circuit, current comparison circuit, and control circuit that constitute the analog processing circuit, a current flowing through the constant current circuit 111 and the current comparison circuit 112 can be stopped under control of the control circuit 113 as the determination signal AOUT becomes active in the imaging device 10 described in Embodiment 1. Thus, the amount of current flowing through the analog processing circuit 101 can be reduced, resulting in lower power consumption.

This embodiment can be implemented in appropriate combination with any of the structures described in the other embodiments.

Embodiment 3

In this embodiment, a configuration example of the analog processing circuit that is different from that in Embodiment 2 will be described. Note that the description of the portions described in Embodiment 2 is omitted.

Figure 11:
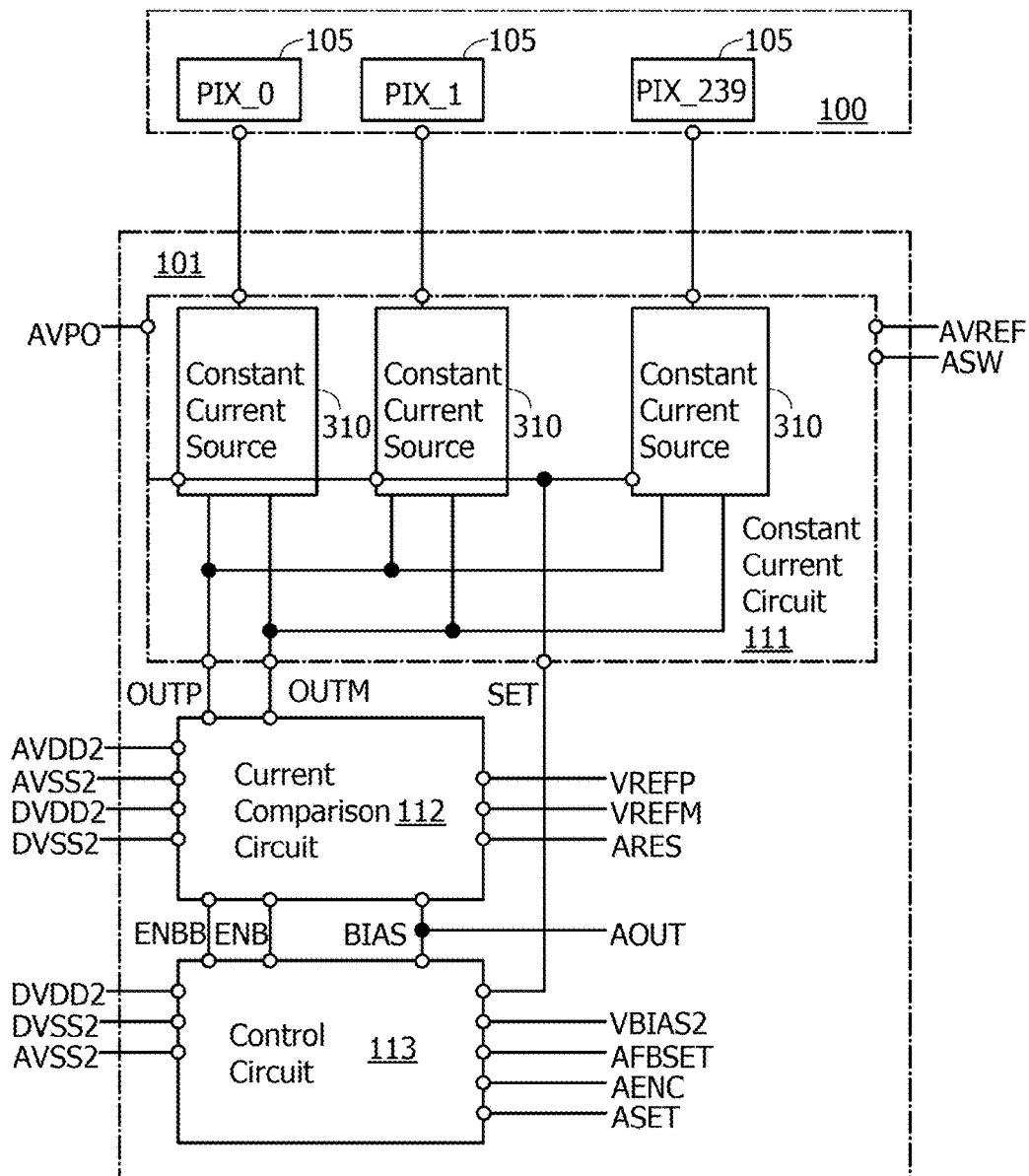
FIG. 11 is a block diagram illustrating one embodiment of the present invention.
Figure 12:
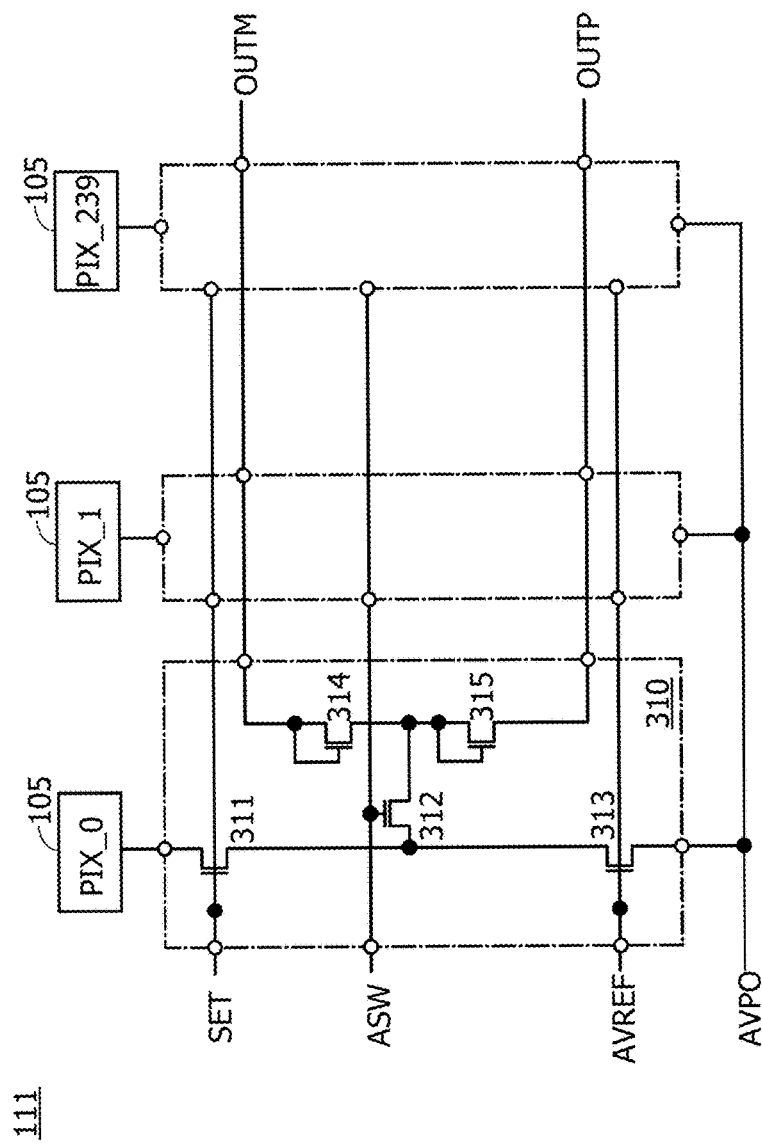
FIG. 12 is a circuit diagram illustrating one embodiment of the present invention.

Like FIG. 3, FIG. 11 is a block diagram illustrating the analog processing circuit 101 and the pixels 105 in the pixel portion 100 electrically connected to the analog processing circuit 101. FIG. 12 illustrates the constant current circuit 111 including a constant current source 310 having a configuration different from that in FIG. 4.

The configuration of FIG. 11 differs from that of FIG. 3 in that a potential AVREF is supplied instead of the signal ASETC. The configuration of FIG. 12 differs from that of FIG. 4 in that a transistor 313 whose gate is supplied with the potential AVREF is provided instead of the transistors 303 and 304 and the capacitor 307.

In the constant current circuit 111 of FIG. 11, the potential AVREF is supplied instead of the signal ASETC for setting a constant current; thus, a transistor and a capacitor needed to set a reference current can be omitted as illustrated in FIG. 12.

The circuit configuration illustrated in FIG. 12 is described. The constant current source 310 corresponding to the pixels 105 includes transistors 311 to 315. In the following description, the transistors 311 to 315 are n-channel transistors as an example.

A gate of the transistor 311 is supplied with the control signal SET. A gate of the transistor 312 is supplied with the signal ASW. A gate of the transistor 313 is supplied with the potential AVREF. FIG. 12 is referred to for connections of the other elements included in the constant current source 310.

An example of the operation of the constant current circuit 111 in FIG. 12 including the constant current source 310 will be described.

Operation for setting a reference current is described. The control signal SET is set to H level, the signal ASW is set to L level, and the potential AVREF is set to a predetermined potential. At this time, in a given row (e.g., the first row), the value of current flowing through the constant current source 310 in each column depends on the potential AVREF.

The value of current flowing through the transistor 311 is equal to that of current flowing through the transistor 313. The potential AVREF supplied to the transistor 313 of the constant current source 310 in each column is set to a potential corresponding to a gate voltage needed to feed a reference current. The potential AVREF is preferably set so that a current does not flow between the current comparison circuit 112 and the constant current circuit 111.

The other operations are similar to those described with FIG. 4 and thus are not repeatedly described.

As has been described, the constant current circuit included in the analog processing circuit is supplied externally with a potential for feeding a reference current without internally maintaining the potential. Accordingly, the area of the constant current source included in the constant current circuit can be reduced.

This embodiment can be implemented in appropriate combination with any of the structures described in the other embodiments.

Embodiment 4

This embodiment will show specific configuration examples of the pixel 105 that is included in the imaging device 10 in Embodiment 1 and is capable of retaining differential data.

An example of a configuration and operation of the pixel 105 will be described with reference to FIGS. 13A and 13B and FIG. 14.

Figure 13A:
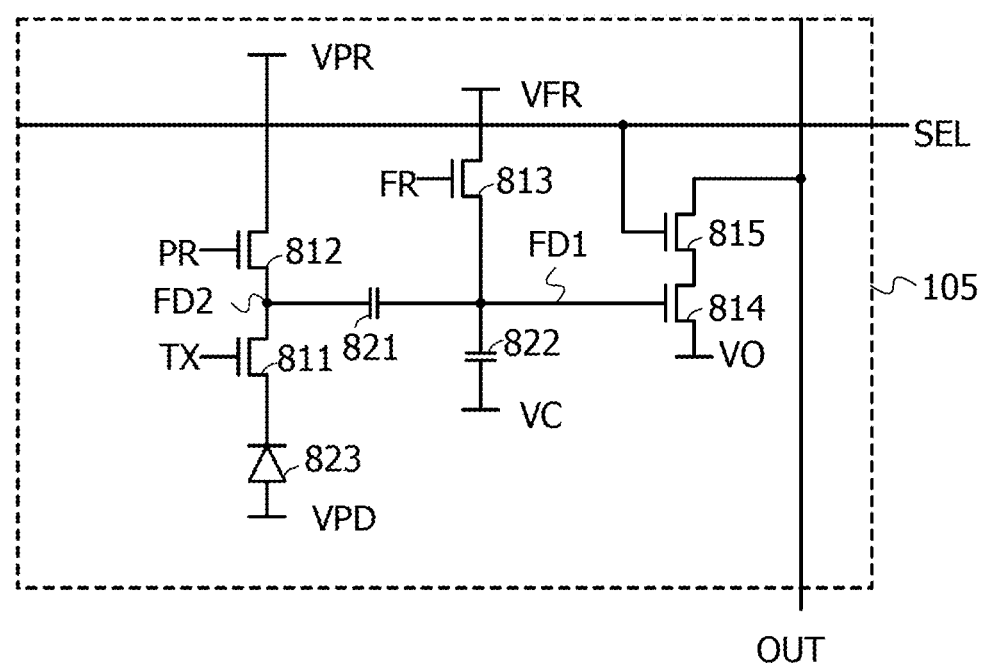
FIGS. 13A and 13B are a circuit diagram and a timing chart illustrating one embodiment of the present invention.
Figure 13B:
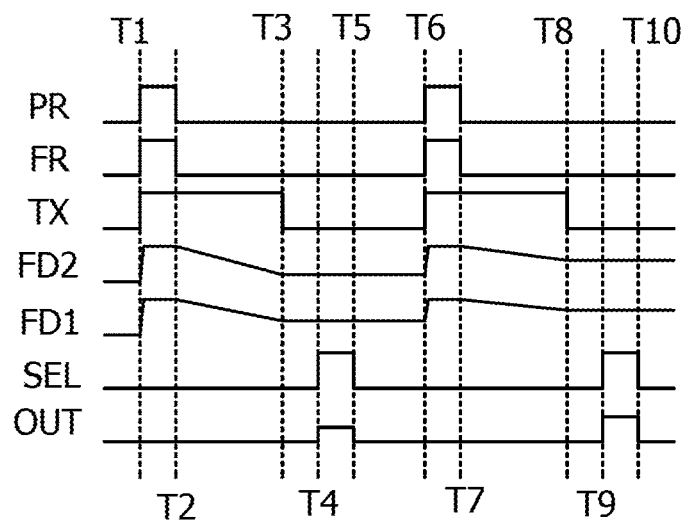
Figure 14:
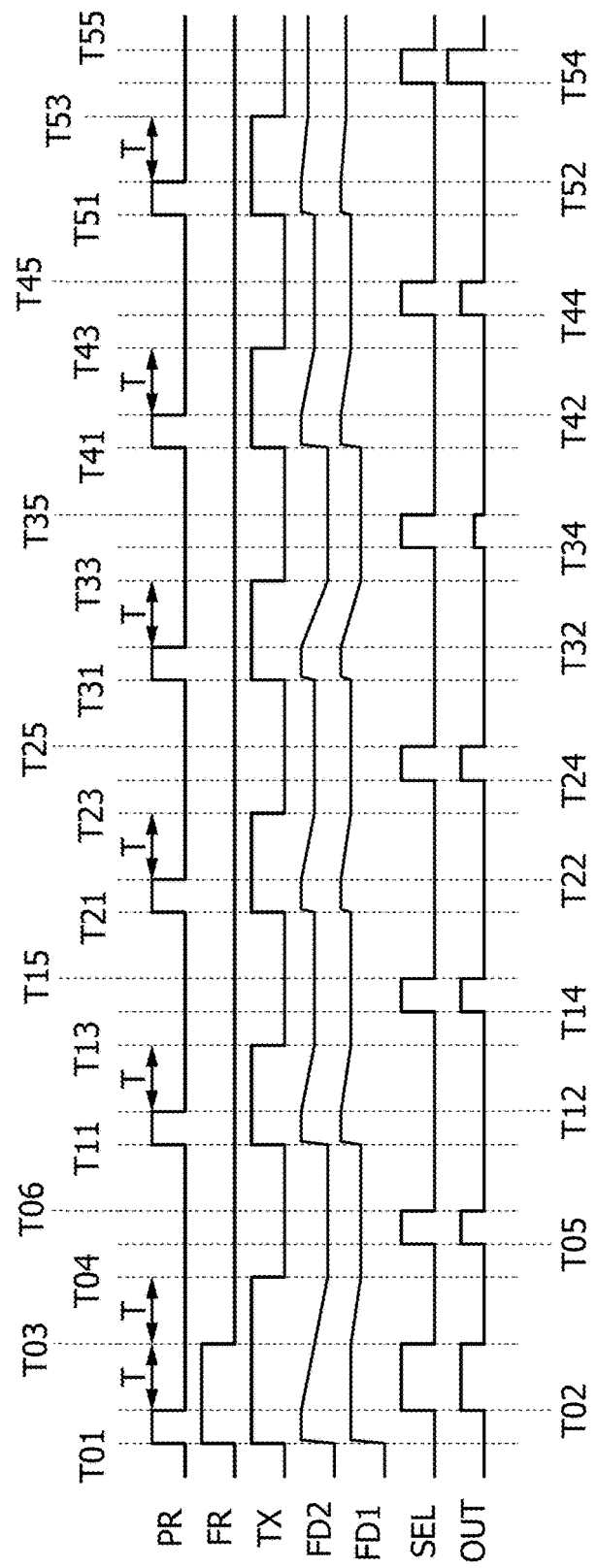
FIG. 14 is a timing chart illustrating one embodiment of the present invention.

The pixel 105 illustrated in FIG. 13A includes transistors 811 to 815, capacitors 821 and 822, and a photodiode 823. The pixel 105 is supplied with potentials from a power supply line VPD, a power supply line VPR, a power supply line VC, a power supply line VFR, and a power supply line VO and supplied with control signals from a signal line TX, a signal line PR, a signal line FR, and a signal line SEL. Imaging data of the pixel 105 is output to a signal line OUT. Charge corresponding to the imaging data is accumulated at a node FD1. Here, the capacitance of the capacitor 821 is preferably larger than the sum of the capacitance of the capacitor 822 and the gate capacitance of the transistor 814.

A gate of the transistor 811 is electrically connected to the signal line TX. One of a source and a drain of the transistor 811 is electrically connected to one terminal of the photodiode 823. The other of the source and the drain of the transistor 811 is electrically connected to one of a source and a drain of the transistor 812. A gate of the transistor 812 is electrically connected to the signal line PR, and the other of the source and the drain thereof is electrically connected to the power supply line VPR. A gate of the transistor 813 is electrically connected to the signal line FR. One of a source and a drain of the transistor 813 is electrically connected to one electrode of the capacitor 822. The other of the source and the drain of the transistor 813 is electrically connected to the power supply line VFR. A gate of the transistor 814 is electrically connected to the one electrode of the capacitor 822. One of a source and a drain of the transistor 814 is electrically connected to the power supply line VO. The other of the source and the drain of the transistor 814 is electrically connected to one of a source and a drain of the transistor 815. A gate of the transistor 815 is electrically connected to the signal line SEL, and the other of the source and the drain thereof is electrically connected to the signal line OUT. One electrode of the capacitor 821 is electrically connected to the other of the source and the drain of the transistor 811 and the one of the source and the drain of the transistor 812. The other electrode of the capacitor 821 is electrically connected to the one electrode of the capacitor 822 and the one of the source and the drain of the transistor 813. The other electrode of the capacitor 822 is electrically connected to the power supply line VC. The other terminal of the photodiode 823 is electrically connected to the power supply line VPD.

The operation of the pixel 105 will be described with reference to FIG. 13B and FIG. 14. Here, the power supply line VPD is set at a low potential, the power supply line VPR is set at a high potential, the power supply line VC is set at a low potential, the power supply line VFR is set at a high potential, and the power supply line VO is set at a high potential, for example.

First, operation in the second mode for obtaining imaging data of the pixel 105 is described with reference to FIG. 13B.

From Time T1 to Time T2, the signal line PR, the signal line FR, and the signal line TX are set to H level. In this period, the potential of the node FD1 is set to a potential (represented as V1) of the power supply line VFR, and the potential of a node FD2 is set to a potential (represented as V2) of the power supply line VPR. From Time T2 to Time T3, the signal line PR and the signal line FR are set to L level, and the signal line TX is set to H level. In this period, the potential of the node FD2 decreases in response to light with which the photodiode 823 is irradiated. Here, when a decreased amount of voltage of the node FD2 is represented as $\Delta V2$, the potential of the node FD2 is represented as $V2-\Delta V2$. The potential of the node FD1 also decreases owing to capacitive coupling between the capacitor 821 (capacitance C1) and the combined capacitance of the capacitor 822 (capacitance C2) and the gate capacitance (capacitance Cg) of the transistor 814. Here, when a decreased amount of charge of the node FD1 is represented as $\Delta V1$, $\Delta V1=\Delta V2 \cdot C1/(C1+C2+Cg)=\Delta V2 \cdot k_1$ $(0<k_1<1)$ is satisfied and the potential of the node FD1 is represented as $V1-\Delta V1$. Note that an increase in the intensity of the light with which the photodiode 823 is irradiated reduces the potential of the node FD2. In addition, the potential of the node FD1 is also reduced. From Time T4 to Time T5, the signal line SEL is set to H level. In this period, a signal corresponding to imaging data is output to the signal line OUT depending on the potential of the node FD1. Note that a lower potential of the node FD1 results in a lower potential of the signal line OUT. That is, an increase in the intensity of the light with which the photodiode 823 is irradiated reduces the potential of the signal line OUT. A period from Time T6 to Time T10 can be explained in a manner similar to that for the period from Time T1 to Time T5.

Next, operation in the first mode is described with reference to FIG. 14.

A period from Time T01 to Time T06 corresponds to a period for obtaining imaging data of a reference frame. From Time T01 to Time T02, the signal line PR, the signal line FR, and the signal line TX are set to H level. In this period, the potential of the node FD1 is set to the potential (V1) of the power supply line VFR, and the potential of the node FD2 is set to the potential (V2) of the power supply line VPR. From Time T02 to Time T03, the signal line PR is set to L level, and the signal line FR and the signal line TX are set to H level. In this period, the potential of the node FD2 decreases in response to light with which the photodiode 823 is irradiated. Here, when a decreased amount of voltage of the node FD2 is represented as $\Delta V2$, the potential of the node FD2 is represented as $V2-\Delta V2$. Note that an increase in the intensity of the light with which the photodiode 823 is irradiated reduces the potential of the node FD2. Note that the potential of the node FD1 is not changed. Furthermore, from Time T02 to Time T03, the signal line SEL is set to H level. In this period, a signal corresponding to imaging data is output to the signal line OUT depending on the potential (V1) of the node FD1. A current value flowing through the signal line OUT corresponds to a reference current value flowing in the constant current source in the analog processing circuit. From Time T03 to Time T04, the signal line PR and the signal line FR are set to L level, and the signal line TX is set to H level. Note that the period from Time T02 to Time T03 and the period from Time T03 to Time T04 have the same length T. In the period from Time T03 to Time T04, the potential of the node FD2 decreases in response to light with which the photodiode 823 is irradiated and becomes $V2-2 \cdot \Delta V2$. The potential of the node FD1 also decreases owing to capacitive coupling of the capacitor 821 with the capacitor 822 and the gate capacitance of the transistor 814. Here, when a decreased potential of the node FD1 is represented as $\Delta V1$, $\Delta V1=\Delta V2 \cdot k_1$ is satisfied and the potential of the node FD1 is represented as $V1-\Delta V1$. Note that an increase in the intensity of the light with which the photodiode 823 is irradiated reduces the potential of the node FD2. Furthermore, the potential of the node FD1 is also reduced. Although the period from Time T02 to Time T03 and the period from Time T03 to Time T04 have the same length T here, it is only essential to set these periods such that the amount of potential decrease of the node FD2 is equal in these periods. It is therefore preferred that the length of the period from Time T02 to Time T03 and the period from Time T03 to Time T04 be adjusted as appropriate to satisfy the above condition. From Time T05 to Time T06, the signal line SEL is set to H level. In this period, a signal corresponding to imaging data is output to the signal line OUT depending on the potential of the node FD1. Note that, from Time T05 to Time T06, the signal ASET is set to L level to prevent the signal corresponding to the imaging data from flowing in the analog processing circuit. Note that a lower potential of the node FD1 results in a lower potential of the signal line OUT. That is, an increase in the intensity of the light with which the photodiode 823 is irradiated reduces the potential of the signal line OUT.

A period from Time T11 to Time T15 corresponds to a period for obtaining differential data by obtaining imaging data of the present frame, and specifically corresponds to a period during which a difference between imaging data of the reference frame and that of the present frame is zero. From Time T11 to Time T12, the signal line PR is set to H level, the signal line FR is set to L level, and the signal line TX is set to H level. In this period, the potential of the node FD2 is set to the potential (V2) of the power supply line VPR; that is, the potential is increased by a decreased amount of voltage ($2 \cdot \Delta V2$) in the period from Time T02 to Time T04. Meanwhile, although the potential of the node FD1 also increases owing to the capacitive coupling of the capacitor 821 with the capacitor 822 and the gate capacitance of the transistor 814, the increased amount of potential ($2 \cdot \Delta V1$) is equivalent to twice the decreased amount of voltage in the period from Time T03 to Time T04. That is, the potential of the node FD1 becomes a potential ($V1+\Delta V1$), which is the sum of the potential (V1) of the power supply line VFR and the decreased amount of voltage ($\Delta V1$) in the period from Time T03 to Time T04. From Time T12 to Time T13, the signal line PR and the signal line FR are set to L level, and the signal line TX is set to H level. In this period, the potential of the node FD2 decreases in response to light with which the photodiode 823 is irradiated. Furthermore, the potential of the node FD1 also decreases owing to capacitive coupling of the capacitor 821 with the capacitor 822 and the gate capacitance of the transistor 814. Note that an increase in the intensity of the light with which the photodiode 823 is irradiated reduces the potential of the node FD2. In addition, the potential of the node FD1 is also reduced.

Given that the length of the period from Time T12 to Time T13 is T and the intensity of light with which the photodiode 823 is irradiated from Time T12 to Time T13 is the same as that from Time T02 to Time T04, the decreased amount of voltage of the node FD2 in the period from Time T12 to Time T13 is equal to the decreased amount of voltage ΔV2 in the period from Time T03 to Time T04. Furthermore, the decreased amount of voltage of the node FD1 in the period from Time T12 to Time T13 is equal to the decreased amount of voltage ΔV1 in the period from Time T03 to Time T04. Thus, the potential of the node FD1 becomes V1, which indicates that the difference between the imaging data of the reference frame and that of the present frame is zero. Note that the potential of the node FD1 corresponds to differential data retained in the pixel 105.

From Time T14 to Time T15, the signal line SEL is set to H level. In this period, a signal corresponding to the imaging data is output to the signal line OUT depending on the potential of the node FD1. Note that the potential of the signal indicates that the difference between the imaging data of the reference frame and that of the present frame is zero. The potential of the signal output from the signal line OUT is a potential corresponding to the differential data retained at the node FD1.

A period from Time T21 to Time T25 corresponds to a period for obtaining differential data by obtaining imaging data of the present frame, and specifically corresponds to a period during which a difference between the imaging data of the reference frame and that of the present frame is zero like the period from Time T11 to Time T15.

A period from Time T31 to Time T35 corresponds to a period for obtaining differential data by obtaining imaging data of the present frame, and specifically corresponds to a period during which a difference between the imaging data of the reference frame and that of the present frame is finite (negative). From Time T31 to Time T32, the signal line PR is set to H level, the signal line FR is set to L level, and the signal line TX is set to H level. In this period, the potential of the node FD2 is set to the potential (V2) of the power supply line VPR. That is, the potential is increased by a decreased amount of voltage (ΔV2) in the period from Time T12 to Time T13. Meanwhile, although the potential of the node FD1 also increases owing to the capacitive coupling of the capacitor 821 with the capacitor 822 and the gate capacitance of the transistor 814, the increased amount of potential (ΔV1) is equivalent to the decreased amount of voltage in the period from Time T12 to Time T13. That is, the potential of the node FD1 becomes a potential (V1+ΔV1), which is the sum of the potential (V1) of the power supply line VFR and the decreased amount of voltage (ΔV1) in the period from Time T03 to Time T04. From Time T32 to Time T33, the signal line PR and the signal line FR are set to L level, and the signal line TX is set to H level. In this period, the potential of the node FD2 decreases in response to light with which the photodiode 823 is irradiated. Furthermore, the potential of the node FD1 also decreases owing to capacitive coupling of the capacitor 821 with the capacitor 822 and the gate capacitance of the transistor 814. Note that the intensity of light with which the photodiode 823 is irradiated in the period from Time T32 to Time T33 is assumed to be higher than that in the period from Time T12 to Time T13. Given that the length of the period from Time T32 to Time T33 is T, a decreased amount of voltage (ΔV2') of the node FD2 in the period from Time T32 to Time T33 is larger than the decreased amount of voltage (ΔV2) in the period from Time T12 to Time T13 (ΔV2'>ΔV2). Furthermore, the decreased amount of voltage (ΔV1'=ΔV2'·$k_1$) of the node FD1 is larger than the decreased amount of voltage (ΔV1) in the period from Time T12 to Time T13 (ΔV1'>ΔV1). As a result, the potential (V1+ΔV1−ΔV1') of the node FD1 is lower than the potential (V1) of the power supply line VFR, which indicates that the difference between the imaging data of the reference frame and that of the present frame is finite (negative).

From Time T34 to Time T35, the signal line SEL is set to H level. In this period, a signal corresponding to the imaging data is output to the signal line OUT depending on the potential of the node FD1. Note that the potential of the signal is lower than that of the signal in a period from Time T24 to Time T25 and is a potential indicating that the difference between the imaging data of the reference frame and that of the present frame is finite (negative).

A period from Time T41 to Time T45 corresponds to a period for obtaining differential data by obtaining imaging data of the present frame, and specifically corresponds to a period during which a difference between the imaging data of the reference frame and that of the present frame becomes zero again. From Time T41 to Time T42, the signal line PR is set to H level, the signal line FR is set to L level, and the signal line TX is set to H level. In this period, the potential of the node FD2 is set to the potential (V2) of the power supply line VPR. That is, the potential is increased by a decreased amount of voltage (ΔV2') in the period from Time T32 to Time T33. Meanwhile, although the potential of the node FD1 also increases owing to the capacitive coupling of the capacitor 821 with the capacitor 822 and the gate capacitance of the transistor 814, the increased amount of potential (ΔV1') is equivalent to the decreased amount of voltage in the period from Time T32 to Time T33. That is, the potential of the node FD1 becomes a potential (V1+ΔV1), which is the sum of the potential (V1) of the power supply line VFR and the decreased amount of voltage (ΔV1) in the period from Time T03 to Time T04. From Time T42 to Time T43, the signal line PR and the signal line FR are set to L level, and the signal line TX is set to H level. In this period, the potential of the node FD2 decreases in response to light with which the photodiode 823 is irradiated. Furthermore, the potential of the node FD1 also decreases owing to capacitive coupling of the capacitor 821 with the capacitor 822 and the gate capacitance of the transistor 814. Note that an increase in the intensity of the light with which the photodiode 823 is irradiated reduces the potential of the node FD2. Moreover, the potential of the node FD1 is also reduced. Here, given that the length of the period from Time T42 to Time T43 is T and the intensity of light with which the photodiode 823 is irradiated from Time T42 to Time T43 is the same as that from Time T02 to Time T04, a decreased amount of voltage of the node FD2 is equal to the decreased amount of voltage (ΔV2) in the period from Time T03 to Time T04. Furthermore, the decreased amount of voltage of the node FD1 is also equal to the decreased amount of voltage (ΔV1) in the period from Time T03 to Time T04. Thus, the potential of the node FD1 becomes V1, which indicates that the difference between the imaging data of the reference frame and that of the present frame is zero. From Time T44 to Time T45, the signal line SEL is set to H level. In this period, a signal corresponding to the imaging data is output to the signal line OUT depending on the potential of the node FD1. Note that the potential of the signal indicates that the difference between the imaging data of the reference frame and that of the present frame is zero.

A period from Time T51 to Time T55 corresponds to a period for obtaining differential data by obtaining imaging data of the present frame, and specifically corresponds to a period during which a difference between the imaging data of the reference frame and that of the present frame is finite (positive). From Time T51 to Time T52, the signal line PR is set to H level, the signal line FR is set to L level, and the signal line TX is set to H level. In this period, the potential of the node FD2 is set to the potential (V2) of the power supply line VPR. That is, the potential is increased by a decreased amount of voltage (ΔV2) in the period from Time T42 to Time T43. Meanwhile, although the potential of the node FD1 also increases owing to the capacitive coupling of the capacitor 821 with the capacitor 822 and the gate capacitance of the transistor 814, the increased amount of potential (ΔV1) is equivalent to the decreased amount of voltage in the period from Time T42 to Time T43. That is, the potential of the node FD1 becomes a potential (V1+ΔV1), which is the sum of the potential (V1) of the power supply line VFR and the decreased amount of voltage (ΔV1) in the period from Time T03 to Time T04.

From Time T52 to Time T53, the signal line PR and the signal line FR are set to L level, and the signal line TX is set to H level. In this period, the potential of the node FD2 decreases in response to light with which the photodiode 823 is irradiated. Furthermore, the potential of the node FD1 decreases owing to capacitive coupling of the capacitor 821 with the capacitor 822 and the gate capacitance of the transistor 814. Note that the intensity of light with which the photodiode 823 is irradiated in the period from Time T52 to Time T53 is assumed to be lower than that in the period from Time T12 to Time T13.

Here, given that the length of the period from Time T52 to Time T53 is T, a decreased amount of voltage (ΔV2") of the node FD2 in the period from Time T52 to Time T53 is smaller than the decreased amount of voltage (ΔV2) in the period from Time T12 to Time T13 (ΔV2"<ΔV2). Furthermore, the decreased amount of voltage (ΔV1"=ΔV2"·$k_1$) of the node FD1 is also smaller than the decreased amount of voltage (ΔV1) in the period from Time T12 to Time T13 (ΔV1"<ΔV1). As a result, the potential of the node FD1 (V1+ΔV1−ΔV1") is higher than the potential (V1) of the power supply line VFR, which indicates that the difference between the imaging data of the reference frame and that of the present frame is finite (positive).

From Time T54 to Time T55, the signal line SEL is set to H level. In this period, a signal corresponding to the imaging data is output to the signal line OUT depending on the potential of the node FD1. Note that the potential of the signal is higher than that of the signal in the period from Time T24 to Time T25 and is a potential indicating that the difference between the imaging data of the reference frame and that of the present frame is finite (positive).

Note that the imaging data of the reference frame is output from Time T05 to Time T06 in this embodiment; however, in the case where it is only necessary to obtain differential data between the imaging data of the reference frame and that of the present frame, that is, in the case where the imaging data of the reference frame need not be output, the operation from Time T03 to Time T06 can be skipped. Operation in which the operation from Time T03 to Time T06 is skipped is as follows. When the signal line PR is set to H level, the signal line FR is set to L level, and the signal line TX is set to H level from Time T11 to Time T12, the potential of the node FD2 is changed from the potential V2−ΔV2 at Time T03 to the potential V2. Furthermore, the potential of the node FD1 is increased from the potential V1 at Time T03 to the potential V1+ΔV1. The operation after Time T12 can be the same as above.

The pixel 105 having the above configuration can obtain imaging data by image capturing and retain and output differential data between imaging data of a reference frame and that of the present frame.

As the transistor 811 and the photodiode 823 illustrated in FIG. 13A, a plurality of transistors and a plurality of photodiodes may be provided. For example, it is possible that a photodiode 823A and a photodiode 823B are provided, a gate of a transistor 811A is connected to a signal line TXA, and a gate of a transistor 811B is connected to a signal line TXB as in the pixel 105 of FIG. 15A. It is also possible that photodiodes 823A to 823C are provided, the gate of the transistor 811A is connected to the signal line TXA, the gate of the transistor 811B is connected to the signal line TXB, and a gate of the transistor 811C is connected to a signal line TXC as in the pixel 105 of FIG. 15B.

Figure 15A:
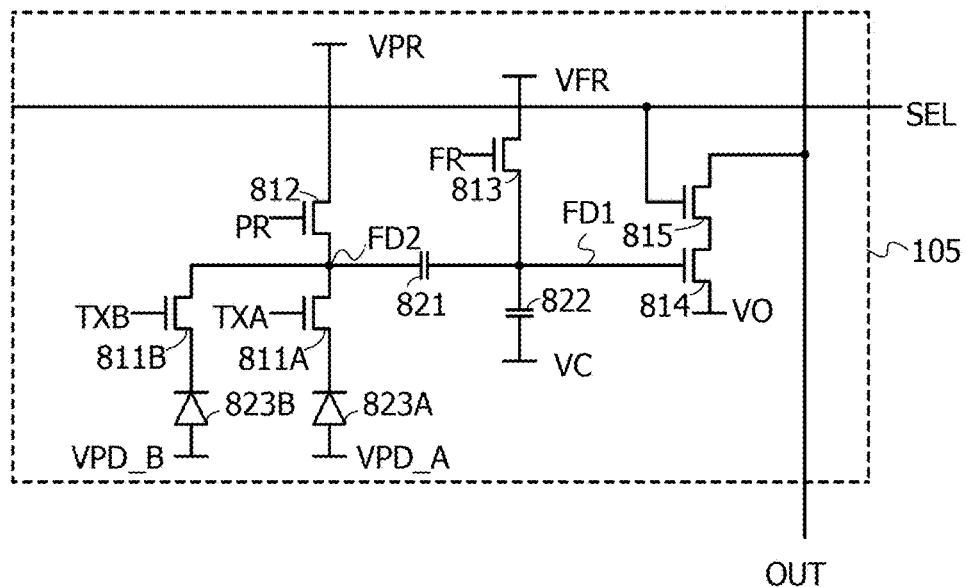
FIGS. 15A and 15B are circuit diagrams illustrating one embodiment of the present invention.
Figure 15B:
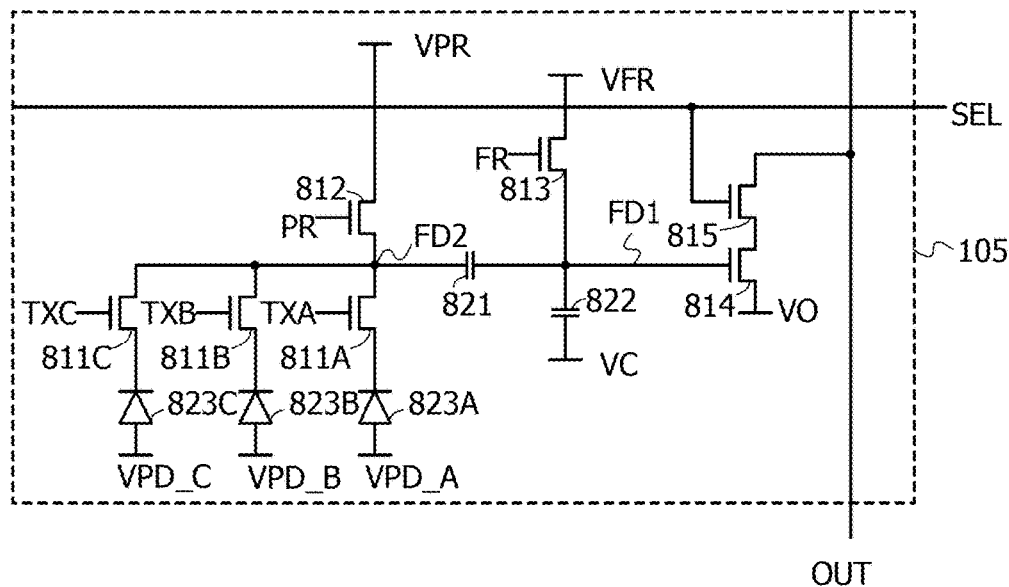
Figure 16A:
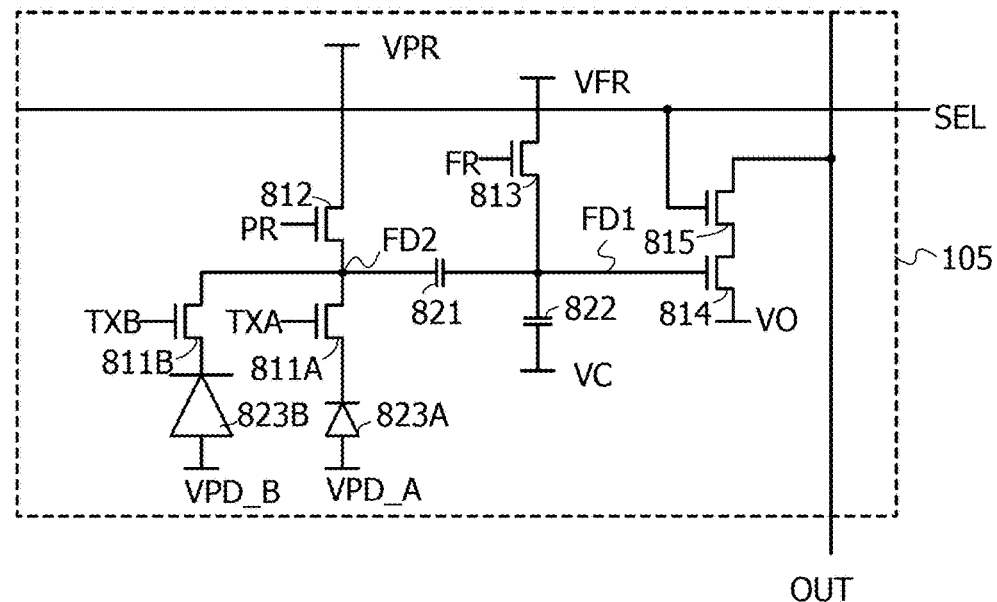
FIGS. 16A and 16B are circuit diagrams illustrating one embodiment of the present invention.
Figure 16B:
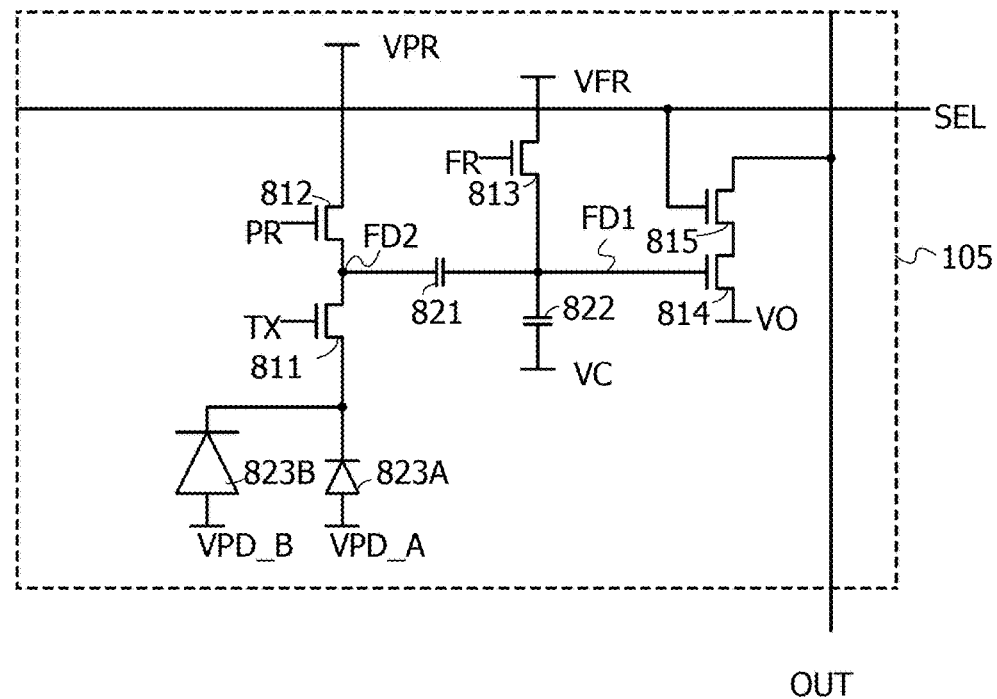

When a plurality of photodiodes are provided as illustrated in FIGS. 15A and 15B, photodiodes with different sizes of light-receiving surfaces may be used. In this case, the photodiode 823A and the photodiode 823B that have light-receiving surfaces of varying sizes may be provided for the corresponding transistors 811A and 811B as in the pixel 105 of FIG. 16A. The photodiode 823A is connected to a power supply line VPD_A, and the photodiode 823B is connected to a power supply line VPD_B. The power supply line VPD_A and the power supply line VPD_B may have the same potential or different potentials. In addition, the photodiode 823A and the photodiode 823B that have light-receiving surfaces of different sizes may be provided for one transistor 811 as in the pixel 105 of FIG. 16B. With the configuration in FIG. 16A or FIG. 16B, image capturing at places with different illumination intensities can be performed at the same time using photodiodes with different spectra sensitivities. To vary spectra sensitivities of photodiodes, the sizes of light-receiving surfaces of the photodiodes may be varied, or different semiconductor materials may be used for the light-receiving surfaces.

Figure 17:
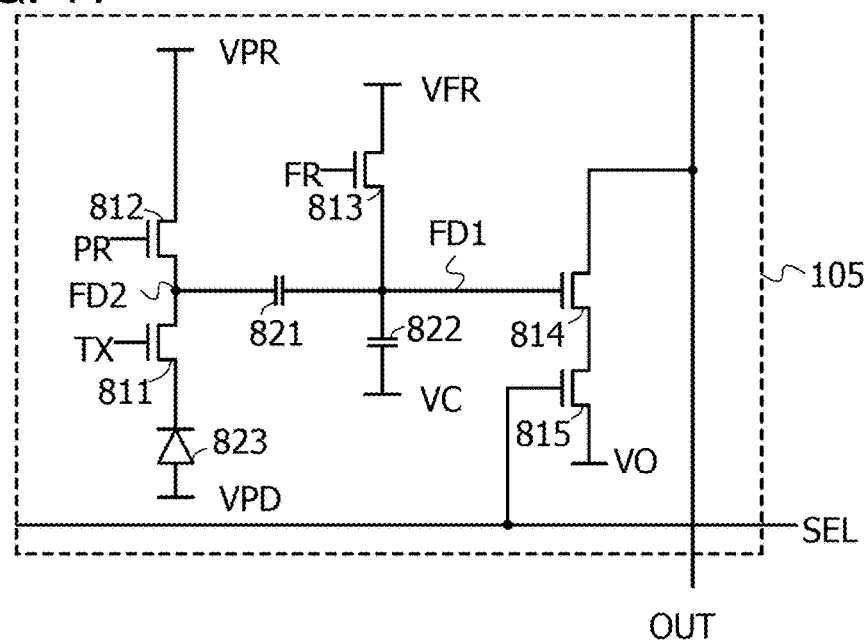
FIG. 17 is a circuit diagram illustrating one embodiment of the present invention.

Although the operation is described using FIG. 13A in which a current flowing through the transistor 814 flows in the direction from the power supply line VO to the signal line OUT, a current flowing through the transistor 814 may flow in the opposite direction, that is, in the direction from the signal line OUT to the power supply line VO. In the latter case, the pixel 105 may have a configuration illustrated in FIG. 17. In the configuration of the pixel 105 in FIG. 17, a low potential is supplied to the power supply line VO and a high potential is supplied to the signal line OUT.

Although several wirings are used to supply the same potential in FIG. 13A, the potential may be supplied by a common wiring.

The imaging device 10 described in Embodiment 1 retains differential data in the pixel 105. With the configurations described in Embodiments 1 to 3, the control circuit 113 can stop a current flowing through the constant current circuit 111 and the current comparison circuit 112 in accordance with the determination signal AOUT that is changed in response to a change in differential data. Then, the mode is transferred from the first mode to the second mode as the determination signal AOUT becomes active. In the first mode, digital processing that consumes a vast amount of power, such as A/D conversion, is not performed and only minimum analog processing for generating the determination signal AOUT is necessary; thus, power consumption can be reduced. In the second mode, the amount of current flowing through the analog processing circuit 101 can be reduced, resulting in lower power consumption.

This embodiment can be implemented in appropriate combination with any of the structures described in the other embodiments.

Embodiment 5

In this embodiment, variation examples of the pixel 105 shown in Embodiment 4 will be described.

Figure 18A:
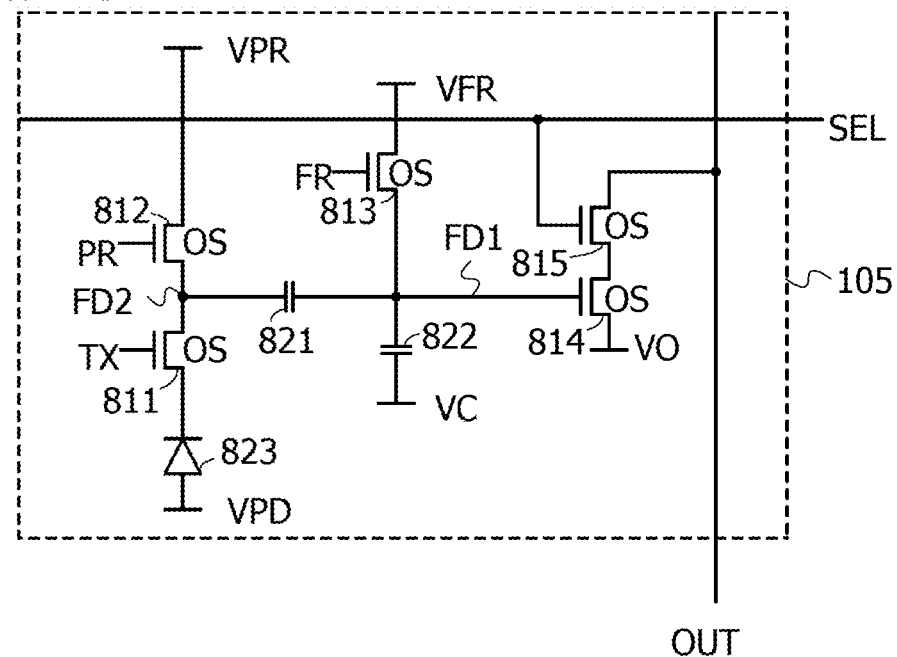
FIGS. 18A and 18B are circuit diagrams illustrating one embodiment of the present invention.
Figure 18B:
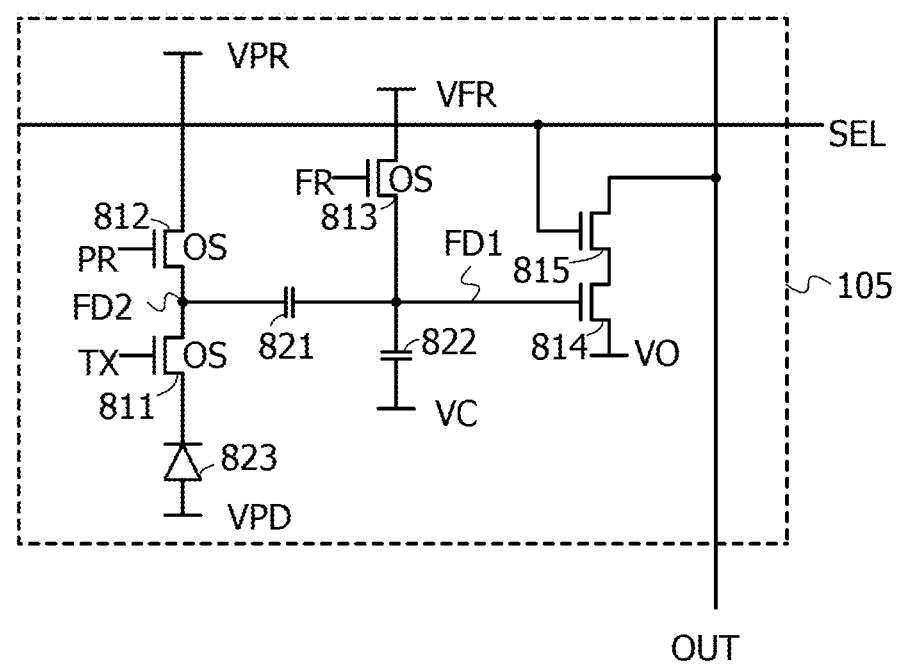

As a variation example of the circuit diagram in FIG. 13A, FIG. 18A illustrates a configuration in which transistors including a semiconductor layer containing an oxide semiconductor (OS transistors) are used. In the pixel 105 illustrated in FIG. 18A, the transistors 811 to 815 are OS transistors. In FIGS. 18A and 18B, "OS" is written beside a circuit symbol of an OS transistor for clarification.

An OS transistor has ultralow off-state current characteristics, which can broaden the dynamic range of imaging. In the circuit diagram in FIG. 18A, an increase in the intensity of light entering the photodiode 823 reduces the potential of the node FD1. Since the OS transistor exhibits an ultralow off-state current, it can accurately output a current corresponding to the gate potential even when the gate potential is extremely low. Thus, it is possible to broaden the detection range of illuminance, i.e., the dynamic range.

A period during which charge can be retained at the node FD1 can be extremely long owing to the ultralow off-state current of the OS transistor; thus, a global shutter system can be used without a complicated circuit configuration and operation method. Consequently, an image with little distortion can be easily obtained even in the case of a moving object. Furthermore, for the same reason, exposure time (a period for performing charge accumulation operation) can be long; thus, the imaging device is suitable for imaging even in a low illuminance environment.

The OS transistor has lower temperature dependence of change in electrical characteristics than a transistor including a semiconductor layer containing silicon (also referred to as Si transistor). Therefore, the OS transistor can be used at an extremely wide range of temperatures. Thus, an imaging device and a semiconductor device that include OS transistors are suitable for use in automobiles, aircraft, and spacecraft.

With the configuration illustrated in FIG. 18A, the pixel can be composed of a photodiode made of silicon and OS transistors. This configuration eliminates the need to form a Si transistor in the pixel, thereby facilitating an increase in effective area of the photodiode. Accordingly, the imaging sensitivity can be increased.

It is effective to use OS transistors in peripheral circuits such as the analog processing circuit 101, the A/D converter circuit 102, the column driver 103, and the row driver 104 as well as the pixels 105. A configuration where the peripheral circuits are composed only of OS transistors requires no process of forming a Si transistor, and thus is effective in reducing cost of the imaging device. A configuration where the peripheral circuits are composed only of OS transistors and p-channel Si transistors requires no process of forming an n-channel Si transistor, and thus is effective in reducing cost of the imaging device. Moreover, the peripheral circuits can be CMOS circuits, resulting in lower power consumption of the peripheral circuits, that is, lower power consumption of the imaging device.

FIG. 18B illustrates a variation example of the pixel 105 in FIG. 18A. In the pixel 105 in FIG. 18B, the transistors 814 and 815 are Si transistors.

A Si transistor has higher field-effect mobility than an OS transistor; therefore, the amount of current flowing through a transistor functioning as an amplifier transistor can be increased. For example, in FIG. 18B, the amount of current flowing through the transistors 814 and 815 can be increased depending on charge accumulated at the node FD1.

Figure 19:
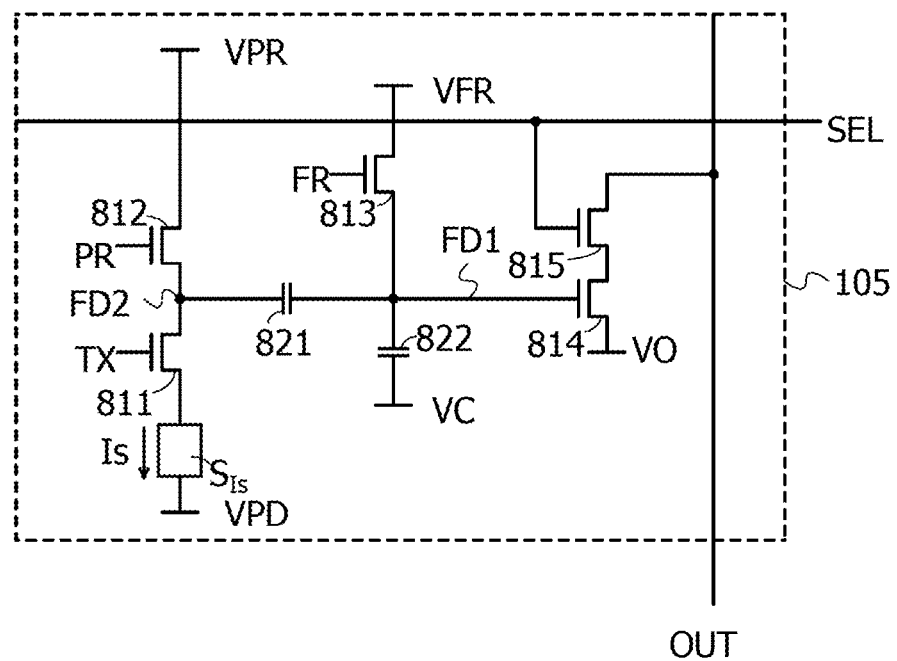
FIG. 19 is a circuit diagram illustrating one embodiment of the present invention.

FIG. 19 is a circuit diagram of the pixel 105 in which the photodiode 823 in the circuit diagram of FIG. 13A is replaced with a sensor $S_{IS}$.

The sensor $S_{IS}$ is preferably an element capable of converting a given physical amount into a value Is of current flowing through the element, or an element capable of converting a given physical amount into another physical amount and then converting it into a value of current flowing through the element.

For the sensor $S_{IS}$, a variety of sensors can be used. For example, the sensor $S_{IS}$ can be a temperature sensor, an optical sensor, a gas sensor, a flame sensor, a smoke sensor, a humidity sensor, a pressure sensor, a flow sensor, a vibration sensor, a voice sensor, a magnetic sensor, a radiation sensor, a smell sensor, a pollen sensor, an acceleration sensor, an inclination sensor, a gyro sensor, a direction sensor, or a power sensor.

For example, when an optical sensor is used as the sensor $S_{IS}$, the above-described photodiode or a phototransistor can be used.

When a gas sensor is used as the sensor $S_{IS}$, it is possible to use a semiconductor gas sensor that detects a change in resistance due to adsorption of a gas on a metal oxide semiconductor such as tin oxide, a catalytic combustion-type gas sensor, or a solid electrolyte-type gas sensor.

Figure 20A:
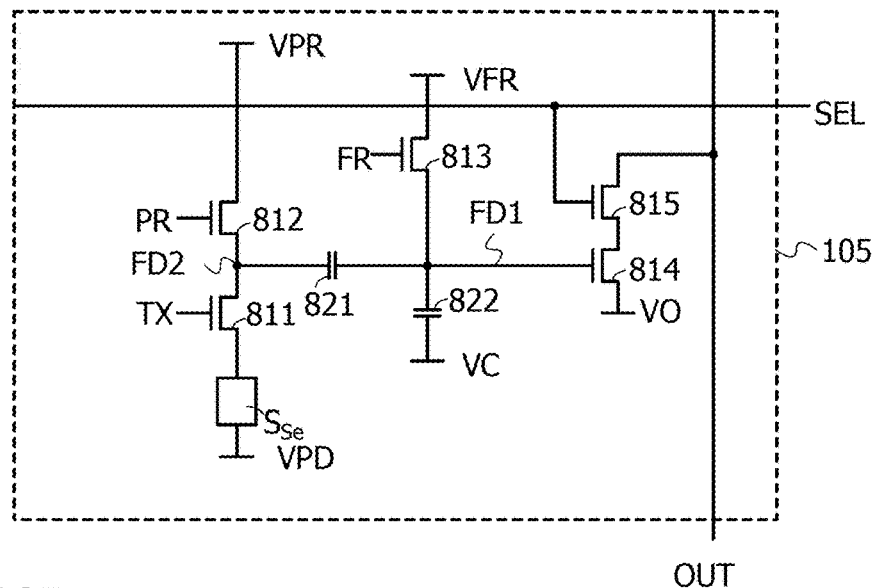
FIGS. 20A to 20C are a circuit diagram and schematic diagrams illustrating one embodiment of the present invention.

FIG. 20A is a circuit diagram of the pixel 105 in which the photodiode 823 in the circuit diagram of FIG. 13A or the sensor $S_{IS}$ in the circuit diagram of FIG. 19 is replaced with a selenium-based semiconductor element $S_{Se}$.

The selenium-based semiconductor element $S_{Se}$ is capable of conducting photoelectric conversion utilizing a phenomenon called avalanche multiplication, in which a plurality of electrons can be taken from one incident photon by voltage application. Thus, in the pixel 105 including the selenium-based semiconductor element $S_{Se}$, the gain of electrons to the amount of incident light can be large, and a highly sensitive sensor is obtained.

The selenium-based semiconductor element $S_{Se}$ can be formed using an amorphous or crystalline selenium-based semiconductor. For example, a crystalline selenium-based semiconductor may be obtained in such a manner that an amorphous selenium-based semiconductor is deposited and subjected to heat treatment. It is preferred that the crystal grain diameter of a crystalline selenium-based semiconductor be smaller than a pixel pitch because variations in characteristics of the pixels are reduced and the quality of a captured image becomes uniform.

A crystalline selenium-based semiconductor among selenium-based semiconductors has a light absorption coefficient in a wide wavelength range. Therefore, the element using a crystalline selenium-based semiconductor can be used as an imaging element for light in a wide wavelength range (e.g., visible light, ultraviolet light, X-rays, and gamma rays), and can be used for a direct conversion element, which is capable of directly converting light in a short wavelength range (e.g., X-rays and gamma rays) into charge.

Figure 20B:
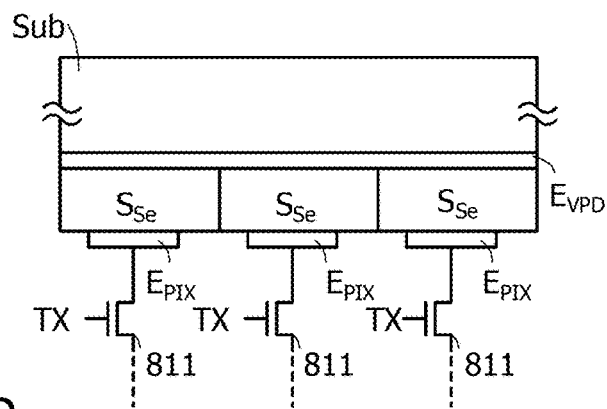

FIG. 20B is a cross-sectional schematic view corresponding to part of the circuit configuration of FIG. 20A. FIG. 20B illustrates the transistors 811, electrodes $E_{PIX}$ connected to the transistors 811, the selenium-based semiconductor elements $S_{Se}$, an electrode $E_{VPD}$, and a substrate Sub.

Light is emitted toward the selenium-based semiconductor elements $S_{Se}$ from the side where the electrode $E_{VPD}$ and the substrate Sub are provided. For this reason, the electrode $E_{VPD}$ and the substrate Sub preferably transmit light. Indium tin oxide (ITO) can be used for the electrode $E_{VPD}$, and a glass substrate can be used as the substrate Sub.

The selenium-based semiconductor elements $S_{Se}$ and the electrode $E_{VPD}$ stacked over the selenium-based semiconductor elements $S_{Se}$ can be used without processing their shapes in accordance with each pixel. A step for processing the shape can be omitted, leading to a reduction in the manufacturing cost and an increase in the manufacturing yield.

An example of the selenium-based semiconductor is a chalcopyrite-type semiconductor, specifically $CuIn_{1-x}Ga_xSe_2$ ($0 \leq x \leq 1$, abbreviated to CIGS). CIGS can be formed by an evaporation method, a sputtering method, or the like.

The selenium-based semiconductor with a chalcopyrite structure can perform avalanche multiplication by application of a voltage of several volts (from approximately 5 V to 20 V). By application of voltage to the selenium-based semiconductor, the movement of signal charge generated owing to light irradiation can have high linearity. Note that when the thickness of the selenium-based semiconductor is smaller than or equal to 1 μm, the applied voltage can be decreased.

In the case where the thickness of the selenium-based semiconductor is small, dark current flows at the time of voltage application. Providing a layer (hole-injection barrier layer) for inhibiting the dark current from flowing to CIGS, a chalcopyrite-type semiconductor, can prevent the dark current from flowing. An oxide semiconductor such as gallium oxide can be used for the hole-injection barrier layer. The thickness of the hole-injection barrier layer is preferably smaller than that of the selenium-based semiconductor.

Figure 20C:
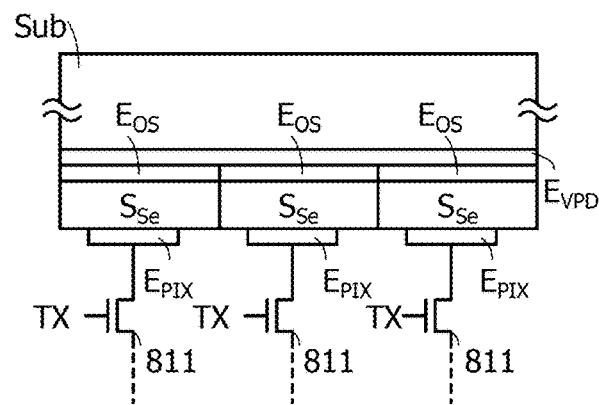

FIG. 20C is a schematic cross-sectional view different from that of FIG. 20B. FIG. 20C illustrates hole-injection barrier layers $E_{OS}$, the transistors 811, the electrodes $E_{PIX}$ connected to the transistors 811, the selenium-based semiconductor elements $S_{Se}$, the electrode $E_{VPD}$, and the substrate Sub.

As described above, the use of the selenium-based semiconductor element $S_{Se}$ as a sensor can reduce the manufacturing cost and characteristic variation among pixels and increase the manufacturing yield; as a result, a highly sensitive sensor is obtained.

This embodiment can be implemented in combination with any of the other embodiments as appropriate.

Embodiment 6

In this embodiment, a cross-sectional structure of elements included in an imaging device will be described with reference to drawings. As an example, this embodiment will explain a cross section of the structure described in FIG. 18B of Embodiment 5, in which a pixel is formed using Si transistors and OS transistors.

Figure 21A:
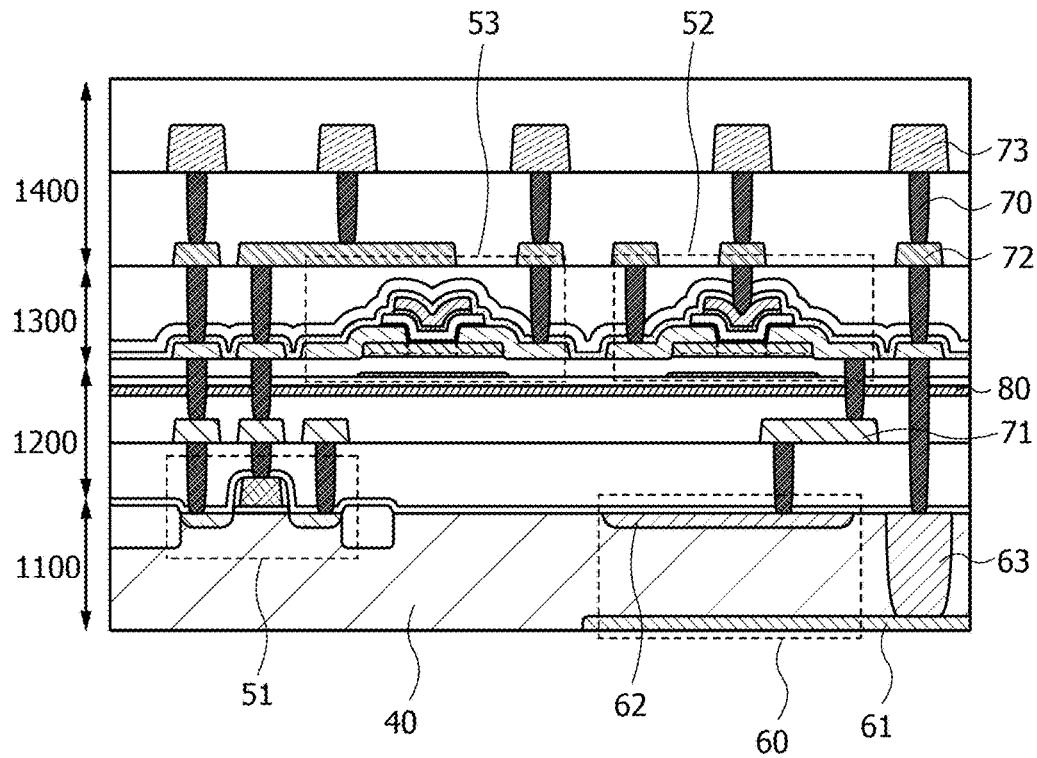
FIGS. 21A and 21B are cross-sectional views illustrating one embodiment of the present invention.
Figure 21B:
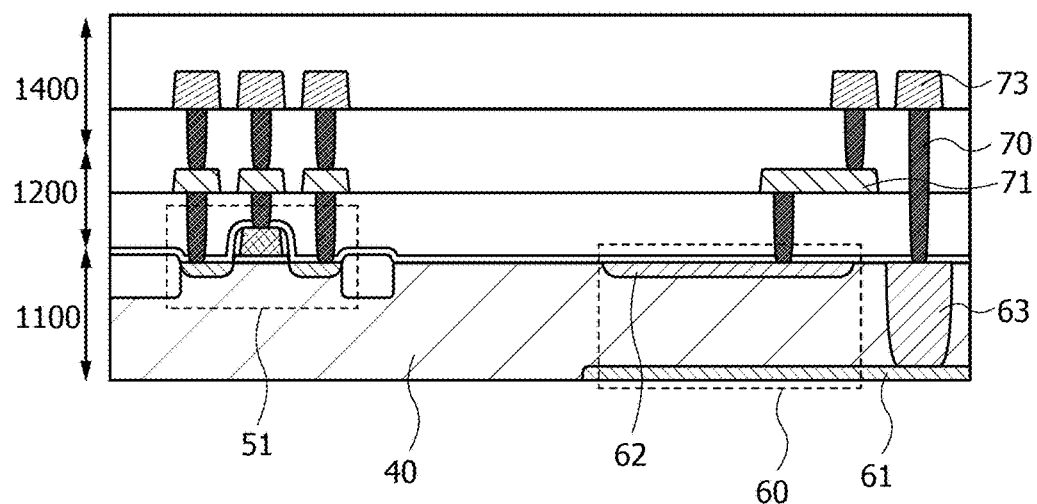

FIGS. 21A and 21B are cross-sectional views of elements included in an imaging device. The imaging device in FIG. 21A includes a Si transistor 51 provided on a silicon substrate 40, OS transistors 52 and 53 stacked over the Si transistor 51, and a photodiode 60 provided in the silicon substrate 40. The transistors and the photodiode 60 are electrically connected to contact plugs 70 and wiring layers 71. An anode 61 of the photodiode 60 is electrically connected to a cathode 62 through contact plug 70 and a low-resistance region 63.

The imaging device includes a layer 1100 including the Si transistor 51 provided on the silicon substrate 40 and the photodiode 60 provided in the silicon substrate 40, a layer 1200 that is in contact with the layer 1100 and includes the wiring layers 71, a layer 1300 that is in contact with the layer 1200 and includes the OS transistors 52 and 53, and a layer 1400 that is in contact with the layer 1300 and includes wiring layers 72 and wiring layers 73.

In the example of the cross-sectional view in FIG. 21A, a surface of the silicon substrate 40 opposite to a surface where the Si transistor 51 is formed includes a light-receiving surface of the photodiode 60. With this structure, an optical path can be obtained without the influence of the transistors and the wirings; thus, a pixel with a high aperture ratio can be formed. Note that the light-receiving surface of the photodiode 60 can be the same as the surface where the Si transistor 51 is formed.

When a pixel is formed using OS transistors as described using FIG. 18A of Embodiment 5, the layer 1100 can be a layer including the OS transistors. Alternatively, it is possible to employ a structure in which the layer 1100 is not provided and the pixel is formed using only OS transistors.

When a pixel is formed using Si transistors, the layer 1300 can be omitted. FIG. 21B illustrates an example of a cross-sectional view in which the layer 1300 is not provided.

Note that the silicon substrate 40 is not limited to a bulk silicon substrate and may be an SOI substrate. Furthermore, the silicon substrate 40 can be replaced with a substrate made of germanium, silicon germanium, silicon carbide, gallium arsenide, aluminum gallium arsenide, indium phosphide, gallium nitride, or an organic semiconductor.

An insulating layer 80 is provided between the layer 1100 including the Si transistor 51 and the photodiode 60 and the layer 1300 including the OS transistors 52 and 53, although there is no limitation on its specific position.

Hydrogen in an insulating layer provided in the vicinity of the active region of the Si transistor 51 terminates dangling bonds of silicon; accordingly, the reliability of the Si transistor 51 can be improved. Meanwhile, hydrogen in an insulating layer provided in the vicinity of the oxide semiconductor layers, which are the active layers, of the OS transistors 52 and 53 provided above the Si transistor 51 becomes a factor of generating carriers in the oxide semiconductor; thus, the reliability of the OS transistors 52 and 53 might be decreased. Therefore, in the case where the transistor using an oxide semiconductor is provided over the transistor using a silicon-based semiconductor material, it is preferred that the insulating layer 80 having a function of preventing diffusion of hydrogen be provided between the transistors. The insulating layer 80 makes hydrogen remain in the lower portion, thereby improving the reliability of the Si transistor 51. In addition, since the insulating layer 80 prevents diffusion of hydrogen from the lower portion to the upper portion, the reliability of the OS transistors 52 and 53 can also be improved.

The insulating layer 80 can be formed using aluminum oxide, aluminum oxynitride, gallium oxide, gallium oxynitride, yttrium oxide, yttrium oxynitride, hafnium oxide, hafnium oxynitride, or yttria-stabilized zirconia (YSZ), for example.

In the cross-sectional view of FIG. 21A, the photodiode 60 provided in the layer 1100 and the transistors provided in the layer 1300 can be formed to overlap each other. This structure can increase the pixel density. In other words, the resolution of the imaging device can be increased.

As illustrated in FIGS. 22A1 and 22B1, the imaging device may be bent. FIG. 22A1 illustrates a state in which the imaging device is bent in the direction of dashed-two dotted line X1-X2. FIG. 22A2 is a cross-sectional view illustrating a portion indicated by dashed-two dotted line X1-X2 in FIG. 22A1. FIG. 22A3 is a cross-sectional view illustrating a portion indicated by dashed-two dotted line Y1-Y2 in FIG. 22A1.

FIG. 22B1 illustrates a state where the imaging device is bent in the direction of dashed-two dotted line X3-X4 and the direction of dashed-dotted line Y3-Y4. FIG. 22B2 is a cross-sectional view illustrating a portion indicated by dashed-two dotted line X3-X4 in FIG. 22B1. FIG. 22B3 is a cross-sectional view illustrating a portion indicated by dashed-two dotted line Y3-Y4 in FIG. 22B1.

Bending the imaging device can reduce field curvature and astigmatism, thereby facilitating the optical design of a lens and the like, which are used in combination of the imaging device. For example, the number of lenses used for aberration correction can be reduced; accordingly, the size or weight of the imaging device can be easily reduced. In addition, the quality of a captured image can be increased.

This embodiment can be implemented in combination with any of the other embodiments as appropriate.

Embodiment 7

In this embodiment, a cross-sectional structure of an example of an imaging device including a color filter and the like will be described with reference to a drawing.

Figure 23A:
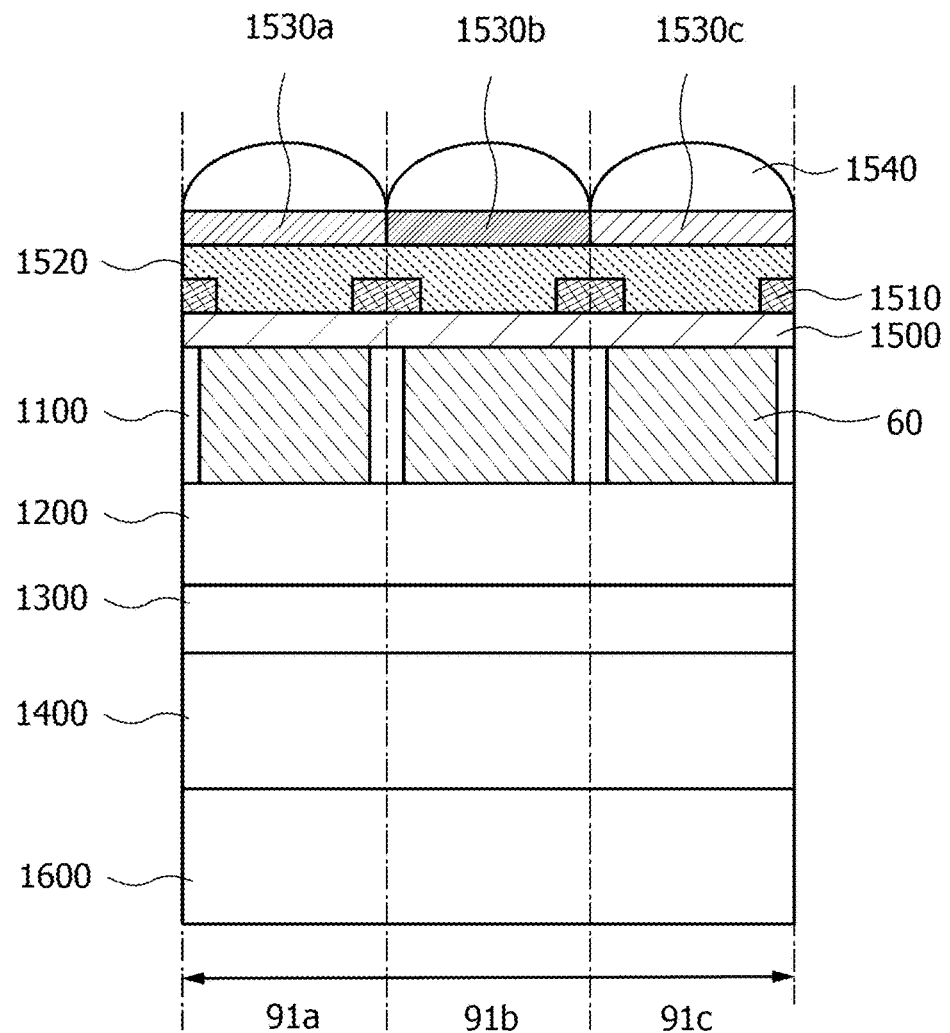
FIGS. 23A and 23B are cross-sectional views illustrating one embodiment of the present invention.

A cross-sectional view in FIG. 23A shows an example of a mode in which a color filter and the like are added to the imaging device illustrated in FIG. 21A or FIG. 21B, and illustrates a region occupied by circuits (circuits 91a, 91b, and 91c) corresponding to three pixels. An insulating layer 1500 is formed over the photodiode 60 provided in the layer 1100. As the insulating layer 1500, a silicon oxide film with a high visible-light transmitting property can be used, for example. In addition, a silicon nitride film may be stacked as a passivation film. Moreover, a dielectric film of hafnium oxide or the like may be stacked as an anti-reflection film.

A light-blocking layer 1510 is formed over the insulating layer 1500. The light-blocking layer 1510 has a function of inhibiting color mixing of light that has passed through color filters placed above. The light-blocking layer 1510 can be a metal layer of aluminum, tungsten, or the like or a stack including the metal layer and a dielectric film functioning as an anti-reflection film.

An organic resin layer 1520 is formed as a planarization film over the insulating layer 1500 and the light-blocking layer 1510. A color filter 1530a, a color filter 1530b, and a color filter 1530c are formed over the circuit 91a, the circuit 91b, and the circuit 91c to be paired with the circuit 91a, the circuit 91b, and the circuit 91c, respectively. The color filter 1530a, the color filter 1530b, and the color filter 1530c have colors of R (red), G (green), B (blue), and the like, whereby a color image can be obtained.

A microlens array 1540 is provided over the color filters 1530a, 1530b, and 1530c so that light penetrating a lens goes through the color filter positioned directly below the lens to reach the photodiode.

A supporting substrate 1600 is provided in contact with the layer 1400. As the supporting substrate 1600, a hard substrate such as a semiconductor substrate (e.g., a silicon substrate), a glass substrate, a metal substrate, or a ceramic substrate can be used. Note that an inorganic insulating layer or an organic resin layer as an adhering layer may be provided between the layer 1400 and the supporting substrate 1600.

Figure 23B:
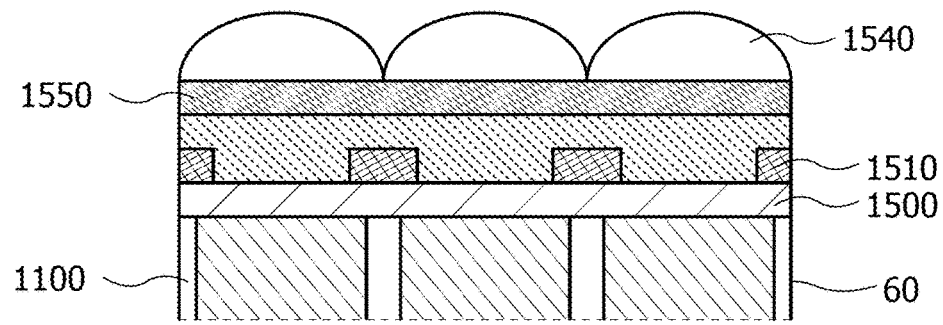

In the structure of the imaging device, an optical conversion layer 1550 may be used instead of the color filters 1530a, 1530b, and 1530c (see FIG. 23B). With the optical conversion layer 1550, the imaging device can capture images in various wavelength regions.

For example, when a filter that blocks light having a wavelength shorter than or equal to that of visible light is used as the optical conversion layer 1550, an infrared imaging device is obtained. When a filter that blocks light having a wavelength shorter than or equal to that of near infrared light is used as the optical conversion layer 1550, a far-infrared imaging device is obtained. When a filter that blocks light having a wavelength longer than or equal to that of visible light is used as the optical conversion layer 1550, an ultraviolet imaging device is obtained.

Furthermore, when a scintillator is used as the optical conversion layer 1550, it is possible to provide an imaging device that takes an image visualizing the intensity of radiation, such as a medical X-ray imaging device. Radiation such as X-rays passes through a subject to enter a scintillator, and then is converted into light (fluorescence) such as visible light or ultraviolet light owing to a phenomenon known as photoluminescence. Then, the photodiode 60 detects the light to obtain image data.

The scintillator is formed of a substance that, when irradiated with radial rays such as X-rays or gamma rays, absorbs energy of the radial rays to emit visible light or ultraviolet light or a material containing the substance. For example, materials such as $Gd_2O_2S:Tb$, $Gd_2O_2S:Pr$, $Gd_2O_2S:Eu$, $BaFCl:Eu$, $NaI$, $CsI$, $CaF_2$, $BaF_2$, $CeF_3$, $LiF$, $LiI$, and $ZnO$ and a resin or ceramics in which any of the materials is dispersed are known.

This embodiment can be implemented in appropriate combination with any of the structures described in the other embodiments.

Embodiment 8

In this embodiment, the OS transistor described in Embodiments 5 and 6 will be described.

The off-state current of an OS transistor can be reduced by reducing the concentration of impurities in an oxide semiconductor to make the oxide semiconductor intrinsic or substantially intrinsic. The term "substantially intrinsic" refers to a state where an oxide semiconductor has a carrier density lower than $1\times10^{17}/cm^3$, preferably lower than $1\times10^{15}/cm^3$, more preferably lower than $1\times10^{13}/cm^3$. In the oxide semiconductor, hydrogen, nitrogen, carbon, silicon, and metal elements that are not main components are impurities. For example, hydrogen and nitrogen form donor levels to increase the carrier density.

A transistor using an intrinsic or substantially intrinsic oxide semiconductor has a low carrier density and thus is less likely to have negative threshold voltage. In addition, because of few carrier traps in the oxide semiconductor, the transistor using the oxide semiconductor has small variation in electrical characteristics and high reliability. Furthermore, the transistor using the oxide semiconductor achieves an ultralow off-state current.

For example, the OS transistor with reduced off-state current can exhibit a normalized off-state current per micrometer in channel width of $1\times10^{-18}$ A or less, preferably $1\times10^{-21}$ A or less, more preferably $1\times10^{-24}$ A or less at room temperature (approximately 25° C.), or $1\times10^{-15}$ A or less, preferably $1\times10^{-18}$ A or less, more preferably $1\times10^{-21}$ A or less at 85° C.

Note that at least indium (In) or zinc (Zn) is preferably contained as an oxide semiconductor used for the semiconductor layer of the OS transistor. In particular, In and Zn are preferably contained. A stabilizer for strongly bonding oxygen is preferably contained in addition to In and Zn. As a stabilizer, at least one of gallium (Ga), tin (Sn), zirconium (Zr), hafnium (Hf), and aluminum (Al) may be contained.

As another stabilizer, the oxide semiconductor may contain one or more kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As the oxide semiconductor used for the semiconductor layer of the transistor, any of the following can be used, for example: indium oxide, tin oxide, zinc oxide, In—Zn-based oxide, Sn—Zn-based oxide, Al—Zn-based oxide, Zn—Mg-based oxide, Sn—Mg-based oxide, In—Mg-based oxide, In—Ga-based oxide, In—Ga—Zn-based oxide (also referred to as IGZO), In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—Zr—Zn-based oxide, In—Ti—Zn-based oxide, In—Sc—Zn-based oxide, In—Y—Zn-based oxide, In—La—Zn-based oxide, In—Ce—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, In—Lu—Zn-based oxide, In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, and In—Hf—Al—Zn-based oxide.

For example, it is possible to use an In—Ga—Zn-based oxide with an atomic ratio of In:Ga:Zn=1:1:1, 3:1:2, or 2:1:3 or an oxide with an atomic ratio close to the above atomic ratios.

If an oxide semiconductor film forming the semiconductor layer contains a large amount of hydrogen, the hydrogen and the oxide semiconductor are bonded to each other, so that part of the hydrogen serves as a donor and causes generation of an electron which is a carrier. As a result, the threshold voltage of the transistor shifts in the negative direction. It is therefore preferred that after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is sometimes reduced by the dehydration treatment (dehydrogenation treatment). For this reason, it is preferred that oxygen be added to the oxide semiconductor film to fill oxygen vacancies increased by the dehydration treatment (dehydrogenation treatment).

In this manner, hydrogen or moisture is removed from the oxide semiconductor film by the dehydration treatment (dehydrogenation treatment) and oxygen vacancies therein are filled by oxygen adding treatment, whereby the oxide semiconductor film can be turned into an i-type (intrinsic) oxide semiconductor film or a substantially i-type (intrinsic) oxide semiconductor film that is extremely close to an i-type oxide semiconductor film.

The transistor including an i-type or substantially i-type oxide semiconductor film can have extremely favorable off-state current characteristics.

Unless otherwise specified, the off-state current in this specification refers to a drain current of a transistor in the off state (also referred to as non-conduction state and cutoff state). Unless otherwise specified, the off state of an n-channel transistor means that the voltage between its gate and source (Vgs: gate-source voltage) is lower than the threshold voltage Vth, and the off state of a p-channel transistor means that the gate-source voltage Vgs is higher than the threshold voltage Vth. For example, the off-state current of an n-channel transistor sometimes refers to a drain current that flows when the gate-source voltage Vgs is lower than the threshold voltage Vth.

The off-state current of a transistor depends on Vgs in some cases. Thus, "the off-state current of a transistor is lower than or equal to I" may mean that there is Vgs at which the off-state current of the transistor becomes lower than or equal to I. The off-state current of a transistor may refer to an off-state current at given Vgs, at Vgs in a given range, or at Vgs at which sufficiently low off-state current is obtained.

As an example, the assumption is made of an n-channel transistor where the threshold voltage Vth is 0.5 V and the drain current is $1\times10^{-9}$ A at Vgs of 0.5 V, $1\times10^{-13}$ A at Vgs of 0.1 V, $1\times10^{-19}$ A at Vgs of −0.5 V, and $1\times10^{-22}$ A at Vgs of −0.8 V. The drain current of the transistor is $1\times10^{-19}$ A or lower at Vgs of −0.5 V or at Vgs in the range of −0.8 V to −0.5 V; therefore, it can be said that the off-state current of the transistor is $1\times10^{-19}$ A or lower. Since there is Vgs at which the drain current of the transistor is $1\times10^{-22}$ A or lower, it may be said that the off-state current of the transistor is $1\times10^{-22}$ A or lower.

In this specification, the off-state current of a transistor with a channel width W is sometimes represented by a current value in relation to the channel width W or by a current value per given channel width (e.g., 1 μm). In the latter case, the off-state current may be expressed in a unit with the dimension of current per length (e.g., A/μm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability of a semiconductor device or the like including the transistor is ensured or a temperature at which the semiconductor device or the like is used (e.g., temperature in the range of 5° C. to 35° C.). The expression "the off-state current of a transistor is lower than or equal to I" sometimes means that there is Vgs at which the off-state current of the transistor is lower than or equal to I at room temperature, 60° C., 85° C., 95° C., 125° C., a temperature at which the reliability of a semiconductor device or the like including the transistor is ensured, or a temperature at which the semiconductor device or the like is used (e.g., temperature in the range of 5° C. to 35° C.).

The off-state current of a transistor depends on voltage Vds between its drain and source in some cases. Unless otherwise specified, the off-state current in this specification may be an off-state current at Vds of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at Vds at which the reliability of a semiconductor device or the like including the transistor is ensured or Vds used in the semiconductor device or the like. The expression "the off-state current of a transistor is lower than or equal to I" sometimes means that there is Vgs at which the off-state current of the transistor is lower than or equal to I at Vds of 0.1 V, 0.8 V, 1 V, 1.2 V, 1.8 V, 2.5 V, 3 V, 3.3 V, 10 V, 12 V, 16 V, or 20 V, Vds at which the reliability of a semiconductor device or the like including the transistor is ensured, or Vds used in the semiconductor device or the like.

In the above description of off-state current, a drain may be replaced with a source. That is, the off-state current sometimes refers to a current that flows through a source of a transistor in the off state.

In this specification, the term "leakage current" sometimes expresses the same meaning as off-state current.

In this specification, the off-state current sometimes refers to a current that flows between a source and a drain when a transistor is off, for example.

This embodiment can be implemented in appropriate combination with any of the structures described in the other embodiments.

Embodiment 9

In this embodiment, a monitoring device (also referred to as a monitoring system) including the imaging device described in Embodiment 1 will be described.

Figure 24:
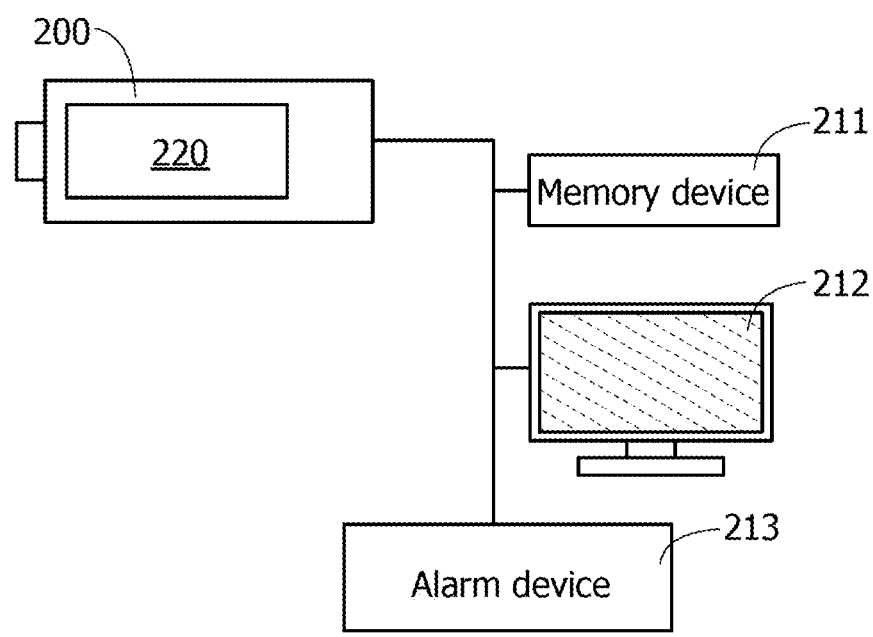
FIG. 24 is a block diagram illustrating a structure example of an imaging device.

FIG. 24 is a block diagram illustrating a structure example of a monitoring device of this embodiment. The monitoring device includes a camera 200, a memory device 211, a display device 212, and an alarm device 213. The camera 200 includes an imaging device 220. The camera 200, the memory device 211, the display device 212, and the alarm device 213 are functionally connected to each other. An image taken by the camera 200 is stored in the memory device 211 and displayed on the display device 212. The alarm device 213 gives an alarm to an administrator when the camera 200 detects movement, for example.

The imaging device 220 generates a determination signal when the camera 200 detects differential data. The imaging device 220 stops analog processing and starts digital processing on the basis of the determination signal. Accordingly, it is not necessary to continuously perform both analog processing and digital processing; thus, power consumption can be reduced.

For example, analog processing is performed but no digital processing is performed while there is surely no intruder entering a monitored area. Here, when the imaging device 220 is performing analog processing and there is no intruder, a difference between imaging data is not detected and differential data corresponds to zero. Thus, a determination signal is not generated. In contrast, when there is an intruder, a difference between imaging data is detected and differential data is finite. Accordingly, a determination signal is generated. Along with the generation of the determination signal, the imaging device 220 stops analog processing. Imaging data is converted into digital data with digital processing by an A/D converter circuit or the like, and the details of the captured image are analyzed with digital processing by a PC or the like. As a result, detailed information on the intruder is obtained.

Therefore, in a period during which movement in the image is not detected, the imaging device 220 does not execute digital processing. While digital processing is performed, a function of the circuit executing analog processing is stopped. As a result, the power consumption in the camera 200 can be reduced. Furthermore, since the memory capacity of the memory device 211 can be saved by image data in the period during which movement is not detected, recording for a longer period is possible. Power consumption of the display device 212 can be reduced by stopping operation of a driver circuit in a period during which image data is not updated.

The alarm device 213 may give an alarm to those around the alarm device 213 when a determination signal is generated. Alternatively, whether or not an alarm is given may be determined on the basis of a result of comparison by a certification system.

This embodiment can be implemented in appropriate combination with any of the structures described in the other embodiments.

Embodiment 10

This embodiment will show examples of electronic devices to which an imaging device of one embodiment of the present invention can be applied.

Examples of electronic devices to which the imaging device of one embodiment of the present invention can be applied are display devices such as televisions and monitors, lighting devices, desktop personal computers and laptop personal computers, word processors, image reproduction devices that reproduce still images and moving images stored in recording media such as digital versatile discs (DVD), portable CD players, radios, tape recorders, headphone stereos, stereos, navigation systems, table clocks, wall clocks, cordless phone handsets, transceivers, mobile phones, car phones, portable game consoles, tablet terminals, large game machines such as pinball machines, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, medical equipment such as dialyzers, facsimiles, printers, multifunction printers, automated teller machines (ATM), and vending machines. Other examples are industrial equipment such as guide lights, traffic lights, conveyor belts, elevators, escalators, industrial robots, power storage systems, and power storage device for electric power load leveling and smart grids. In addition, moving objects driven by an electric motor using electric power are also included in the category of electronic devices. Examples of the moving objects are electric vehicles (EV), hybrid electric vehicles (HEV) that include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircraft, rockets, artificial satellites, space probes, planetary probes, and spacecraft.

Figure 25A:
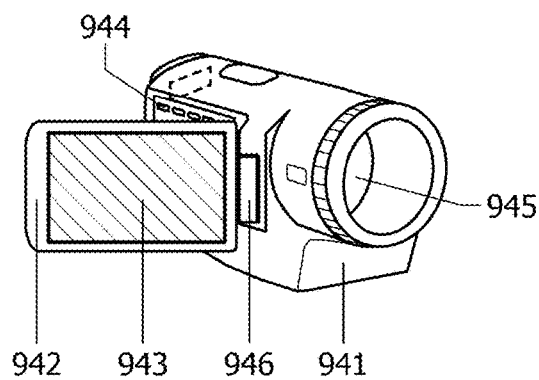
FIGS. 25A to 25F each illustrate an electronic device including an imaging device.

FIG. 25A illustrates a video camera that includes a housing 941, a housing 942, a display portion 943, operation keys 944, a lens 945, a joint 946, and the like. The operation keys 944 and the lens 945 are provided in the housing 941, and the display portion 943 is provided in the housing 942. The housing 941 and the housing 942 are connected to each other with the joint 946, and the angle between the housing 941 and the housing 942 can be changed with the joint 946. Images displayed on the display portion 943 may be switched in accordance with the angle at the joint 946 between the housing 941 and the housing 942. The imaging device of one embodiment of the present invention can be used for the lens 945.

Figure 25B:
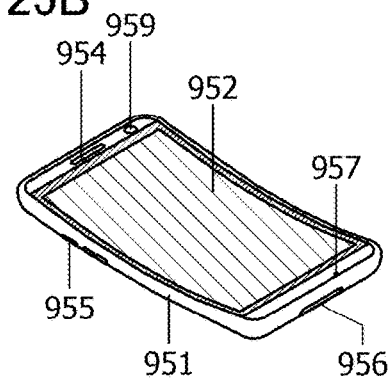

FIG. 25B illustrates a mobile phone that includes a housing 951 provided with a display portion 952, a microphone 957, a speaker 954, a camera 959, an input-output terminal 956, an operation button 955, and the like. The imaging device of one embodiment of the present invention can be used for the camera 959.

Figure 25C:
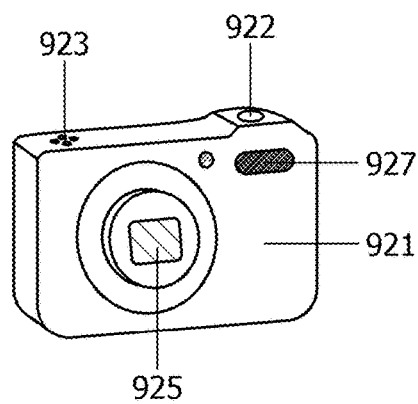

FIG. 25C illustrates a digital camera that includes a housing 921, a shutter button 922, a microphone 923, a light-emitting portion 927, a lens 925, and the like. The imaging device of one embodiment of the present invention can be used for the lens 925.

Figure 25D:
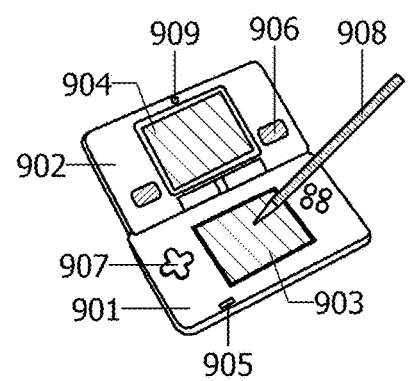

FIG. 25D illustrates a portable game console that includes a housing 901, a housing 902, a display portion 903, a display portion 904, a microphone 905, a speaker 906, an operation key 907, a stylus 908, a camera 909, and the like. Although the portable game console in FIG. 25D has the two display portions 903 and 904, there is no limitation on the number of display portions included in a portable game console. The imaging device of one embodiment of the present invention can be used for the camera 909.

Figure 25E:
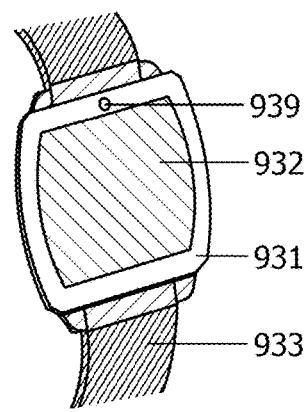

FIG. 25E illustrates a wrist-watch-type information terminal that includes a housing 931, a display portion 932, a wristband 933, a camera 939, and the like. The display portion 932 may be a touch panel. The imaging device of one embodiment of the present invention can be used for the camera 939.

Figure 25F:
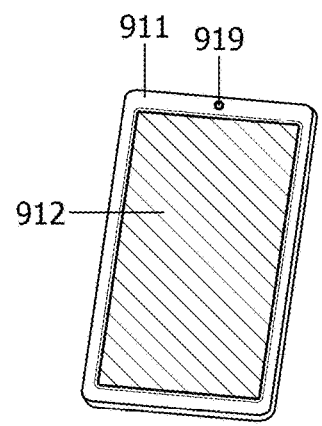

FIG. 25F illustrates a portable data terminal that includes a housing 911, a display portion 912, a camera 919, and the like. A touch panel function of the display portion 912 enables input and output of information. The imaging device of one embodiment of the present invention can be used for the camera 919.

Needless to say, an electronic device is not particularly limited to the above examples as long as it incorporates the imaging device of one embodiment of the present invention.

This embodiment can be implemented in appropriate combination with any of the structures described in the other embodiments.

Example 1

In this example, the configuration of a fabricated imaging device of one embodiment of the present invention will be described.

Figure 26A:
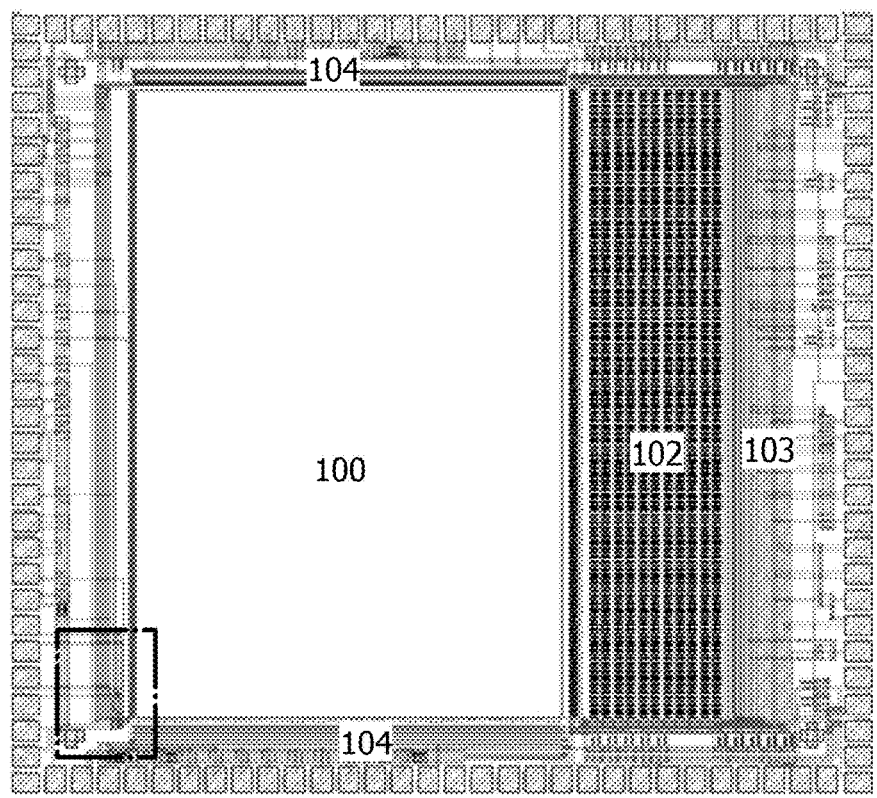
FIGS. 26A and 26B are photographs of a fabricated imaging device.
Figure 26B:
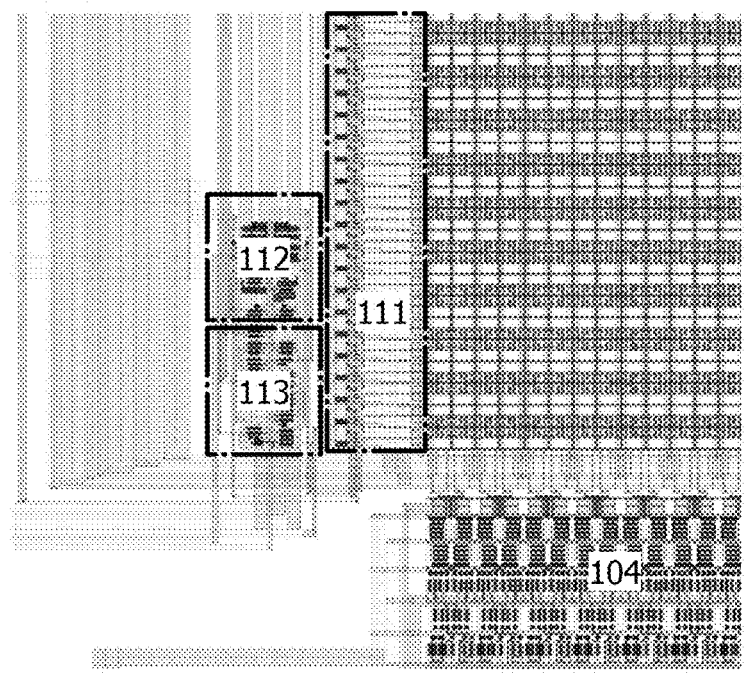

FIGS. 26A and 26B are photographs of a fabricated imaging device. FIG. 26A is a photograph showing an arrangement example of the blocks illustrated in FIG. 1. FIG. 26B is an enlarged photograph of a region surrounded by a dashed-dotted line in FIG. 26A.

As shown in FIG. 26A, the pixel portion 100 was arranged in the middle, and the A/D converter circuit 102, the column driver 103, and the row driver 104 were arranged around the pixel portion 100. Furthermore, the constant current circuit 111 included in the analog processing circuit 101 was arranged as shown in FIG. 26B, and the current comparison circuit 112 and the control circuit 113 were arranged near the constant current circuit 111.

As seen from the photographs of the fabricated imaging device in FIGS. 26A and 26B, the area of the current comparison circuit 112 and the control circuit 113 was smaller than that of the other circuits. With little contribution to an increase in area of the imaging device, the control circuit 113 was able to operate to stop a current flowing through the constant current circuit 111 and the current comparison circuit 112 and reduce power consumption.

Example 2

In this example, a specific configuration of the fabricated imaging device will be described.

Table 1 shows the specifications of the fabricated imaging device.

TABLE 1

| Process | 0.5-μm n-ch CAAC-OS FET, 0.18-μm p-ch Si FET | | |
|---|---|---|---|
| Die size | 6.5 mm × 6.5 mm | | |
| Number of pixels | 240 × 160 | | |
| Size (per pixel) | 20 μm × 20 μm | | |
| Pixel complexity | 5 transistors, 2 capacitors | | |
| Fill factor | 27.5% | | |
| Contrast sensitivity | ≥±1050 lux (at 9000 lux) | | |
| Power supply | 3.3 V | | |
| Power consumption/mode | Motion capturing | Imaging | Wait |
| Power (at 60 fps) | 25.3 μW | 3.6 mW | 1.88 μW |
| FOM (power/pixel · fps) | 10.98 pW/fps | 1.56 nW/fps | 0.82 pW/fps |

As seen from Table 1, the imaging device was fabricated using OS transistors as n-channel transistors and Si transistors as p-channel transistors. The die size was designed to be 6.5 mm×6.5 mm. Pixels were arranged in a matrix of 240×160. The pixel size was designed to be 20 μm×20 μm. The pixel consists of five transistors and two capacitors. The fill factor was 27.5%. The dynamic range was 63.0 dB. The contrast sensitivity that is detection sensitivity to a change in illuminance from 9000 lux ranged from ±1050 lux. The power supply voltage was 3.3 V.

In the fabricated imaging device, power consumption in a motion capturing mode that corresponds to the first mode for obtaining differential data was 25.3 μW; that in a wait mode was 1.88 μW; and that in an imaging mode that corresponds to the second mode for obtaining imaging data was 3.6 mW. That is, the power consumptions in the motion capturing mode and the wait mode were 1/140 and 1/2000 of that in the imaging mode.

Figure 27:
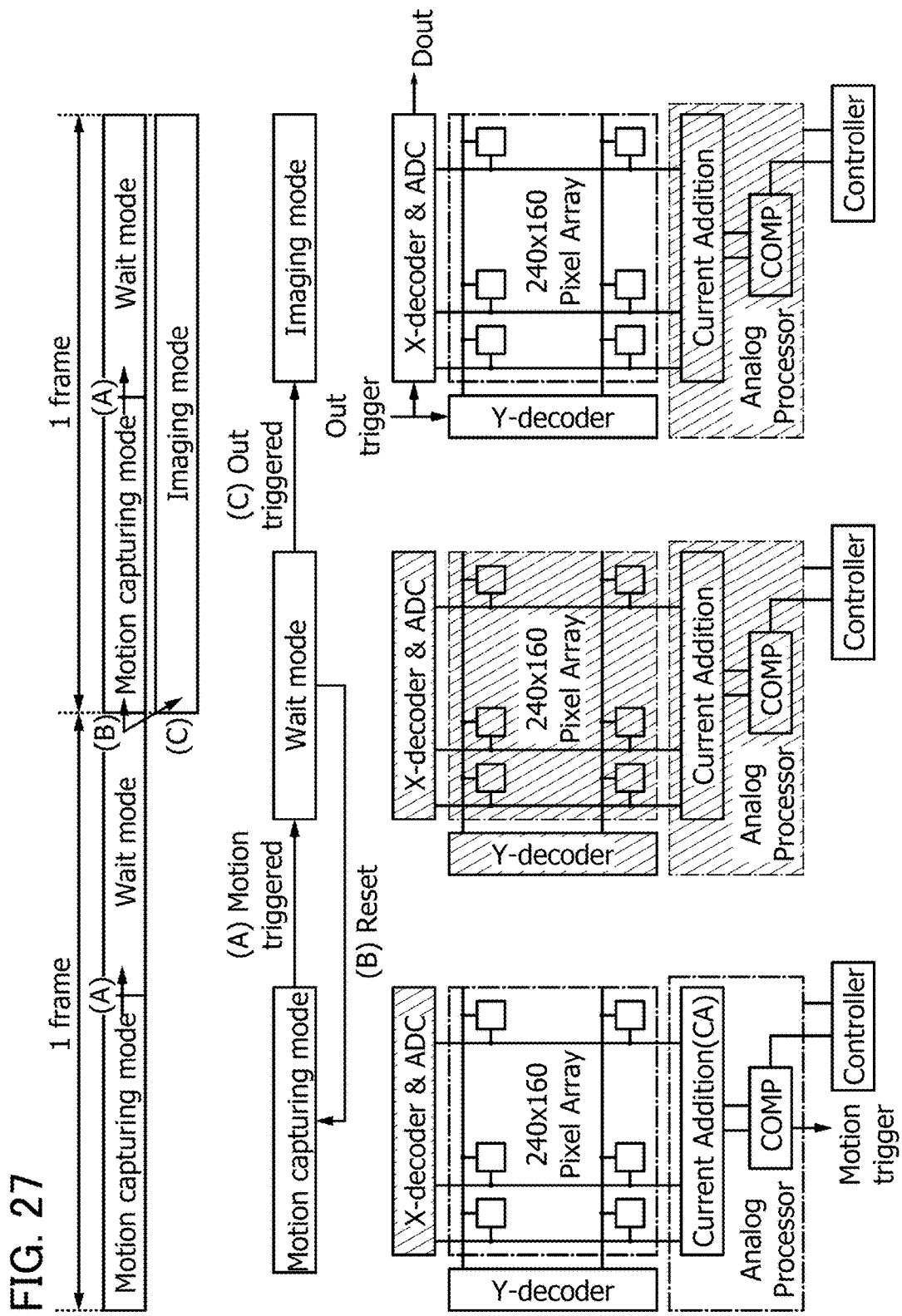
FIG. 27 shows block diagrams of a fabricated imaging device and a diagram showing its operating state.

FIG. 27 illustrates block diagrams of the fabricated imaging device and operating states of the blocks in each operating mode.

The pixels in a matrix of 240×160 illustrated in FIG. 27 have the functions of the pixel described in the forgoing embodiment. That is, the pixels can not only obtain normal imaging data but also obtain differential data between imaging data of a given reference frame and that of the present frame by switching an imaging method. The configuration of the fabricated pixel and a timing chart for showing the operation will be shown later.

The analog processing circuit (Analog Processor) illustrated in FIG. 27 has the functions of the analog processing circuit described in the forgoing embodiment. That is, the analog processing circuit has functions of determining whether a change in differential data of pixels of each row occurs or not sequentially frame by frame on a row-by-row basis and outputting a 1-bit determination signal (Motion trigger in FIG. 27). Note that a 1-bit determination signal corresponds to the determination signal AOUT in the forgoing embodiment.

A power addition circuit (Current Addition (CA)) illustrated in FIG. 27 has the function of the constant current circuit described in the forgoing embodiment. A comparison circuit (COMP) illustrated in FIG. 27 has the function of the current comparison circuit described in the forgoing embodiment. A control circuit (Controller) illustrated in FIG. 27 has the function of the control circuit described in the forgoing embodiment.

With the circuits having the above structures, the fabricated imaging device can capture motion of an object in a wide range of speed (i.e., an object moving at low and high speeds) within a chip, unlike a normal frame-based imaging device. Note that the fabricated imaging device can also output imaging data from an 8-bit single slope A/D converter circuit (ADC) with a global shutter method.

The fabricated imaging device has three operating modes of motion capturing, wait, and imaging modes. In the motion capturing mode, the ADC and a column driver (X-decoder & ADC) stop while the analog processing circuit captures motion.

The analog processing circuit sequentially determines differential data of pixels row by row, and when the analog processing circuit captures motion from differential data of a pixel in one row ((A) Motion triggered), the imaging device autonomously shifts to the wait mode without determining differential data of pixels in the remaining rows. Thus, unnecessary power consumed after motion capturing can be reduced.

The imaging device is transferred to the wait mode by stopping the analog processing circuit by the control circuit when motion is captured. In the wait mode, all the circuit blocks except the control circuit stop. When a period of a target frame where motion is captured ends, the imaging device autonomously transfers to the motion capturing mode ((B) Reset) or transfers to the imaging mode with a signal (Out trigger) from the outside ((C) Out triggered).

In the imaging mode, the analog processing circuit stops; thus, unnecessary power consumption can be reduced. The imaging device obtains differential data of a frame where motion is captured with or without obtaining imaging data of the present frame, and outputs the data as image data.

As described above, power consumption of the fabricated imaging device is reduced in such a manner only circuit blocks required for a target operating mode operate.

Figure 28A:
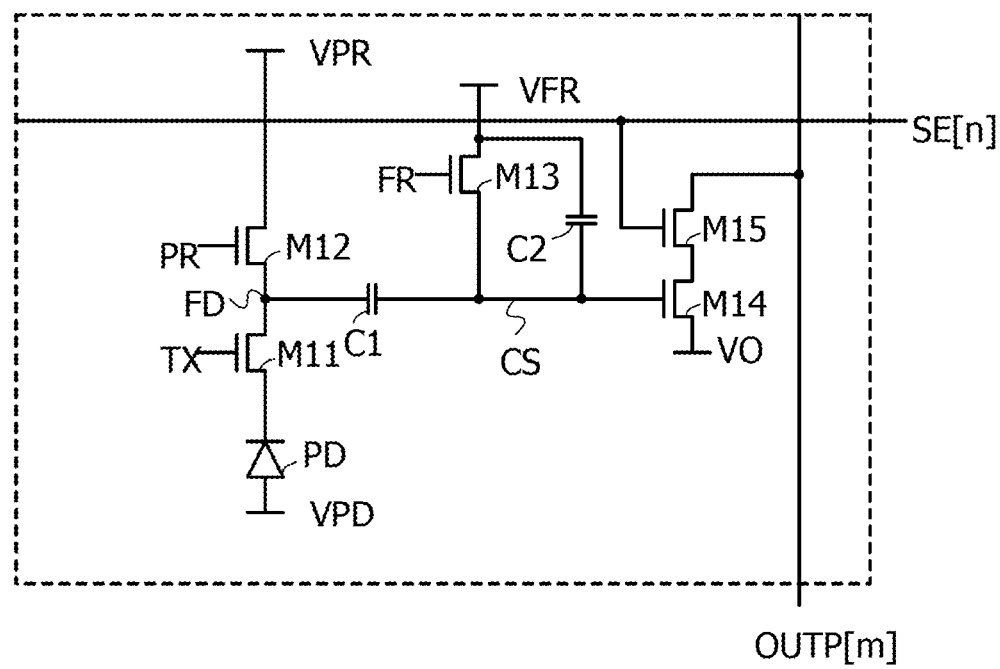
FIGS. 28A and 28B are a circuit diagram and a timing chart of a fabricated imaging device.
Figure 28B:
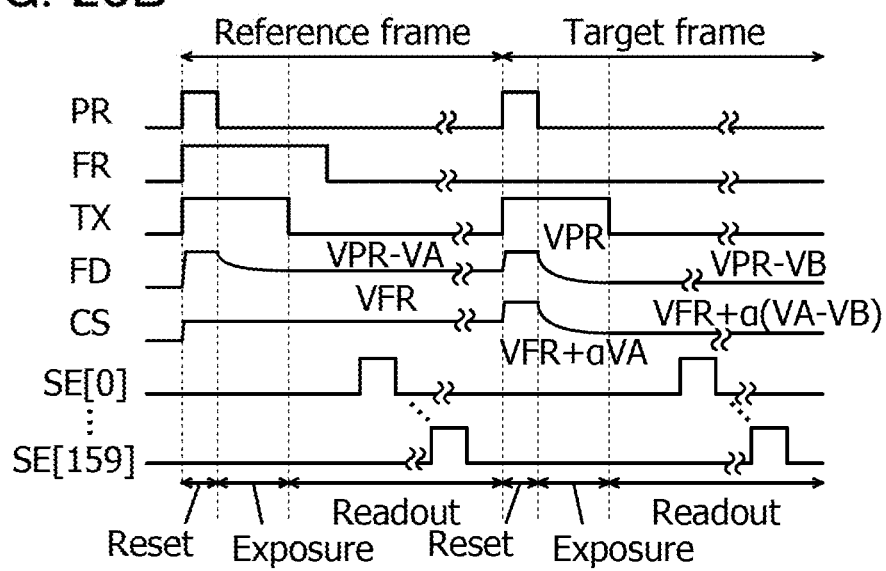

FIG. 28A is a circuit diagram of a pixel employed in the fabricated imaging device. FIG. 28B is a timing chart showing differential data acquisition. Although the pixel is partly different from the pixel described using FIGS. 13A and 13B, FIG. 14, and the like, it operates basically in the same manner as the aforementioned pixel; FIGS. 28A and 28B are referred to for the details.

The pixel in FIG. 28A includes OS transistors as transistors M11 to M15 and operates by utilizing low off-state current of the transistors M11 to M15. For example, nodes represented by FD and CS can be regarded as nonvolatile storage nodes; thus, a potential that corresponds to imaging data and is set at the nodes FD and CS can be retained for a long time.

The operation of obtaining differential data in the pixel of FIG. 28A will be described with reference to FIG. 28B.

First, Reset, Exposure, and Readout operations are performed in a reference frame, whereby the node CS is set to a reset potential (VFR), and the node FD is set to a potential (VPR−VA) after imaging in the reference frame.

Then, in a reset period of a target frame, when the potential of the node FD is set to the reset potential (VPR), the potential of the node CS is set to a potential (VFR+αVA), which corresponds to the potential set in the reference frame, by capacitive coupling. Here, α is a constant determined by the capacitance C1, the capacitance C2, and the gate capacitance of the transistor M14. In a light exposure period of the target frame, when the potential of the node FD changes to a potential (VPR−VB) after imaging in the target frame, the potential of the node CS is set to a potential (VFR+α(VA−VB)) corresponding to the difference between the imaging potential of the reference frame and that of the target frame. The potentials of the nodes CS and FD can be retained for a long time by turning off the transistors M11 to M13 and utilizing low off-state current of the OS transistors. For this reason, the pixel can subsequently obtain differential data with respect to a reference frame by keeping imaging in target frames. Note that imaging in the present frame is performed in such a manner that the potential of the node CS is set to an appropriate potential (e.g., VFR) and then a node FR is controlled in synchronization with a node PR.

Figure 29:
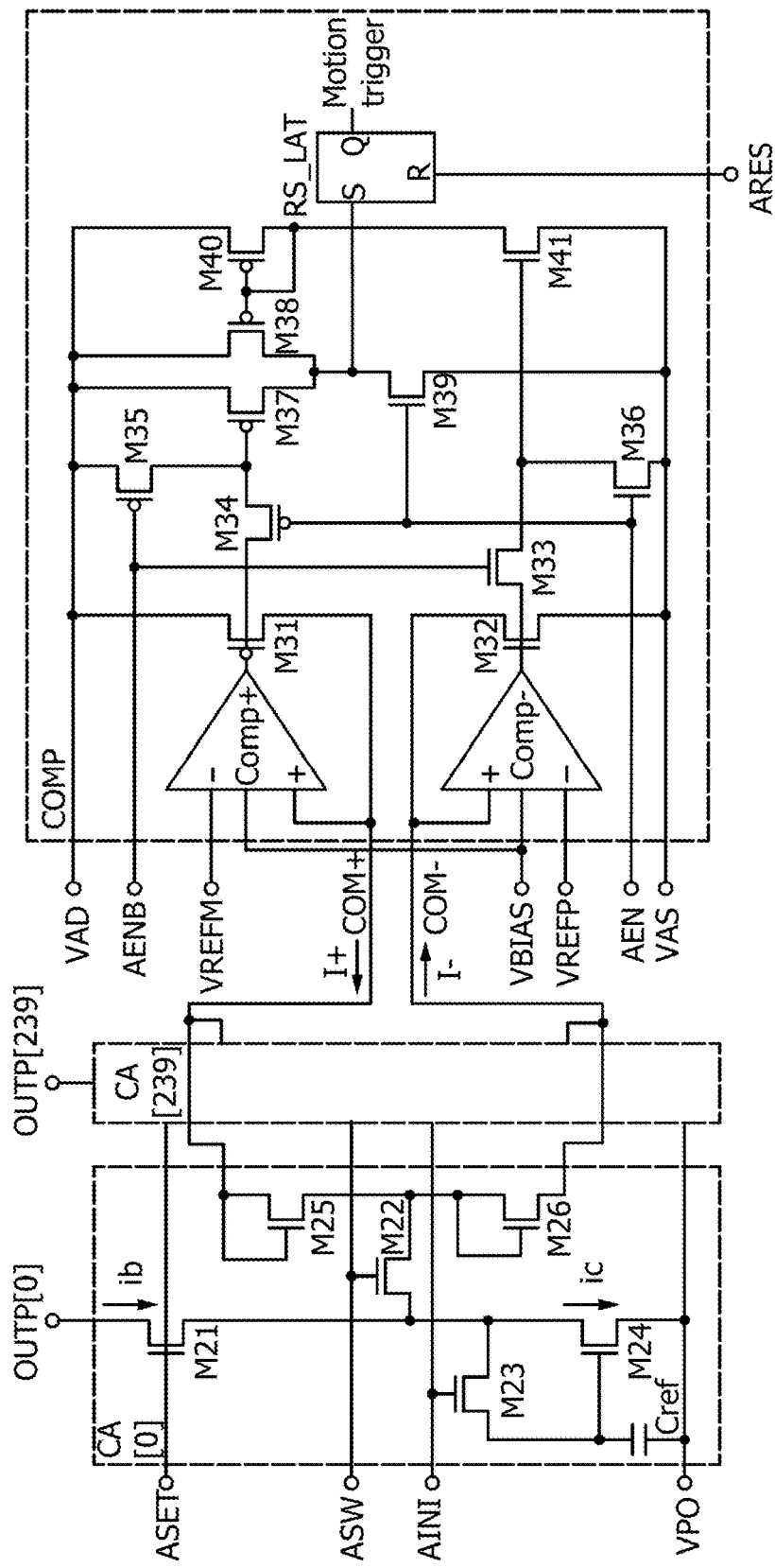
FIG. 29 is a circuit diagram of a fabricated imaging device.
Figure 30:
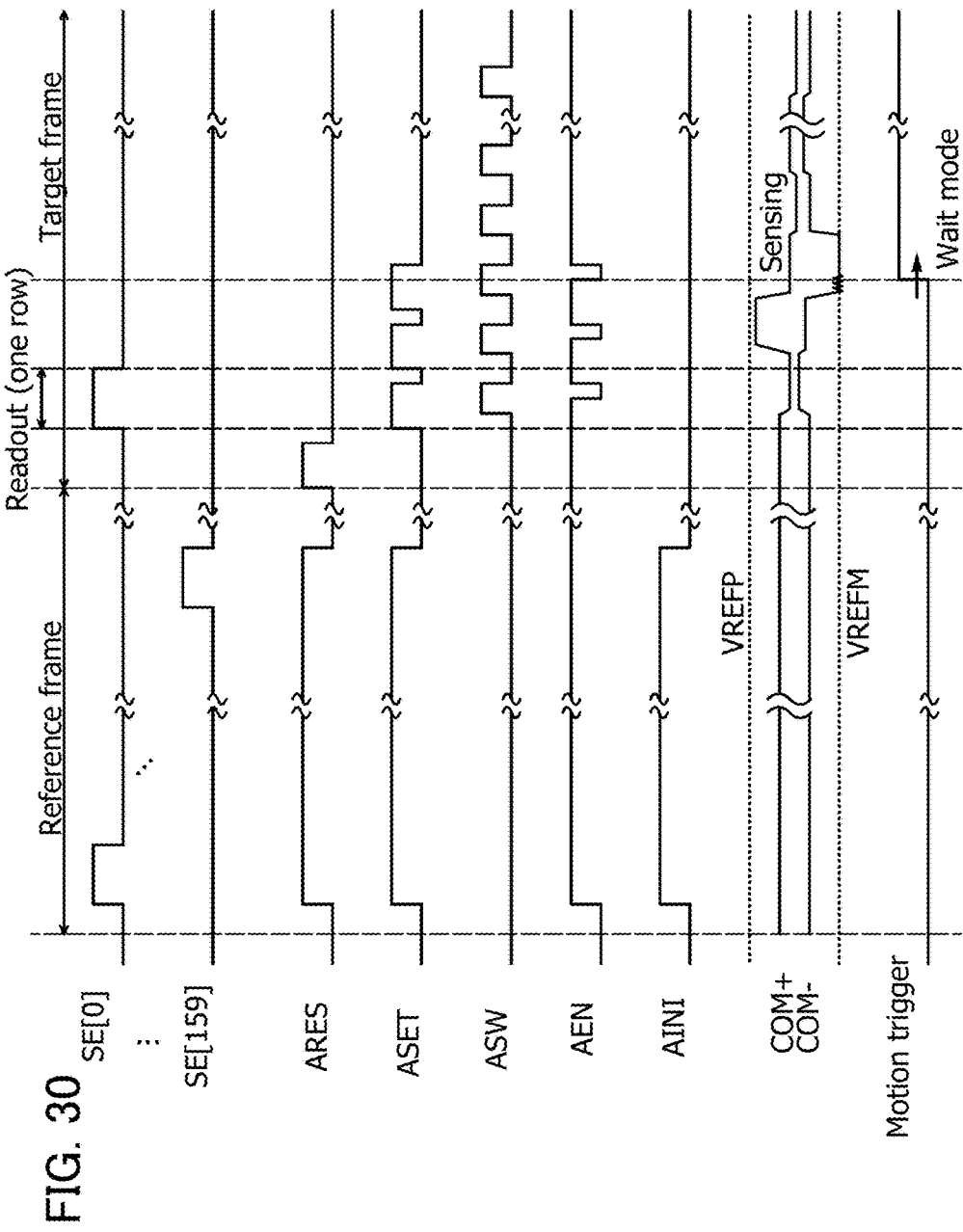
FIG. 30 is a timing chart showing operation of a fabricated imaging device.

FIG. 29 is a circuit diagram of the fabricated analog processing circuit. FIG. 30 is a timing chart showing a period for capturing motion by the analog processing circuit. The analog processing circuit illustrated in FIG. 29 can operate in a manner similar to that of the analog processing circuit described using FIGS. 4, 5, and the like. Specifically, the analog processing circuit can capture motion by determining a change in differential data of pixels in each row sequentially frame by frame on a row-by-row basis with a current comparison method.

The motion capturing method of the analog processing circuit is described with reference to FIGS. 29 and 30. First, in a readout period for a reference frame, a capacitor Cref of each column in the power addition circuit (CA) is set to a potential corresponding to a current (ic) of pixels in each column. Here, ic corresponds to a current at the time when the potential of the node CS of pixels in each column is VFR, that is, the difference is 0. The potential set in the capacitor Cref of each column can be retained for a long time by turning off a transistor M23 that is an OS transistor. In other words, a transistor M24 serves as a constant current source (with the current ic) to correct variations between columns.

Next, in a readout period for a target frame, pixels in columns and in a selected row output a current (ib) that corresponds to the potential (VR+α(VA−VB)) retained at the node CS, to output lines OUTP[0] to OUTP[239] in the corresponding columns. Here, a differential current flows in accordance with α(VA−VB) that is a change in potential of the node CS of the pixel in each selected column. A differential current i+(=ic−ib) flows when ic>ib, whereas a differential current i−(=ib−ic) flows through transistors M25 and M26 when ic<ib. The potentials of nodes represented by COM+ and COM− change in response to I+=Σi+ and I−=Σi− each of which is the total of differential currents of the output lines in all the columns. Then, two comparators Comp+ and Comp− compare these potentials with reference voltages, whereby the analog processing circuit determines whether motion has captured or not. The reference voltages VREFM and VREFP of the comparators Comp+ and Comp− are set to upper and lower limit voltages considering errors including pixel variations and noise. The above operation enables motion capturing with respect to a given reference frame. When motion is captured, the control circuit controls a bias (VBIAS) of the comparators, enable signals (AEN and AENB) of circuits to which outputs of the comparators are input, and the signal ASET for controlling the constant current source of each column. Then, the imaging device autonomously transfers to the wait mode, where power consumption of the analog processing circuit is reduced as much as possible.

Since the analog processing circuit determines a change in differential data of pixels that are sequentially selected on a row-by-row basis in each frame, it can identify a row address where motion is captured from the output timing of a determination signal in a certain frame. This determination corresponds to detection of the sum of differential data of each column; accordingly, it is possible to decrease the probability of false motion capturing due to a defective bit in pixels, as well as to suppress power consumption of the circuit. The reliability of detection sensitivity of the analog processing circuit is secured as much as possible by using the constant current sources for correcting variations between columns.

Figure 31:
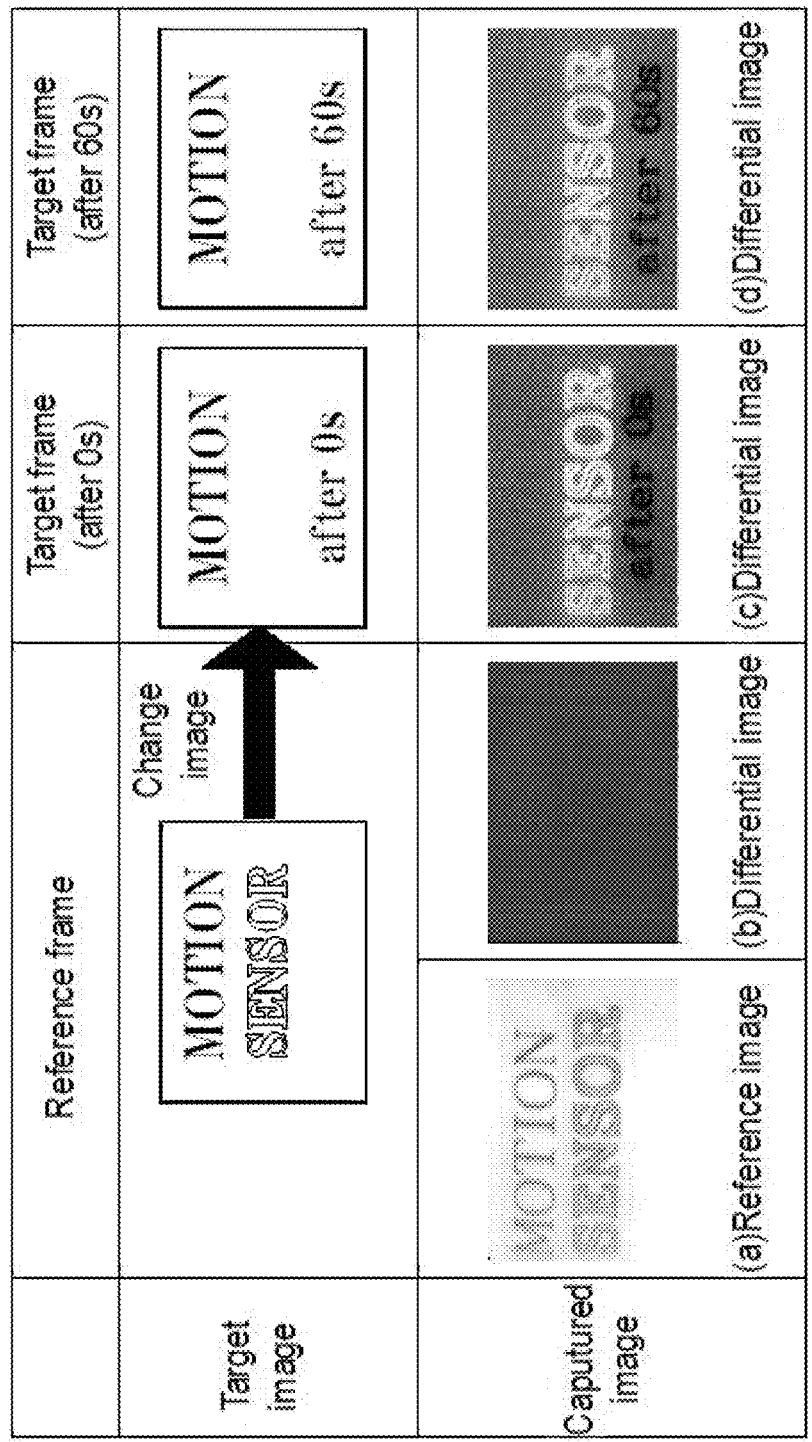
FIG. 31 shows images captured with a fabricated imaging device.

FIG. 31 shows an object with letters, an image of the object captured with the fabricated imaging device, and differential images obtained by changing the letters of the object over time using the captured image as a reference image. The results demonstrated that differential data between the reference frame and the present frame was obtained even after 60 seconds.

Figure 32:
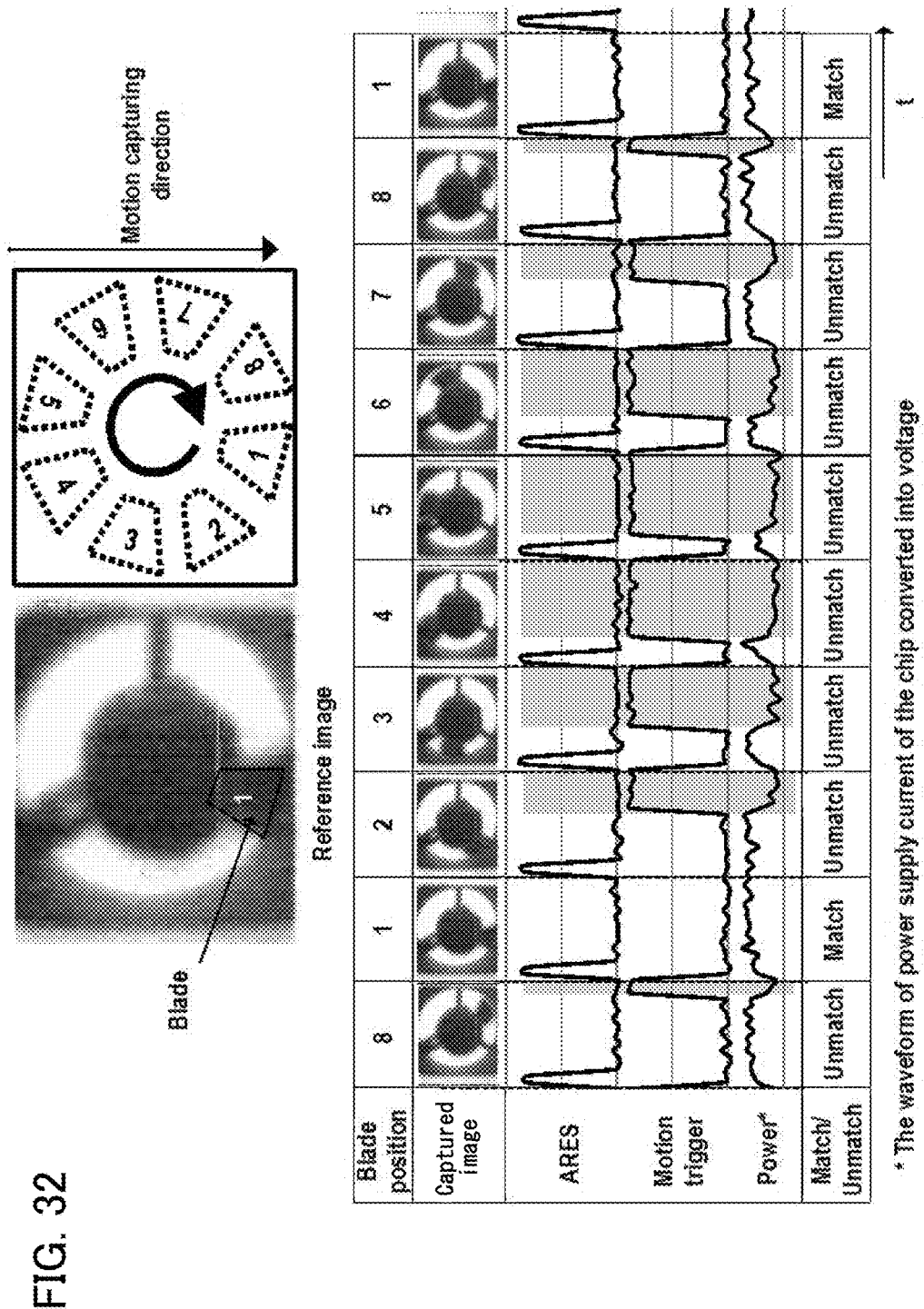
FIG. 32 shows images captured with a fabricated imaging device and waveforms of signals during operation.

FIG. 32 shows captured images, taken at 60 fps, of a DC fan rotating at 315° per frame period and measured waveforms of a reset signal (corresponding to the start of each frame), a motion trigger, and chip current consumption. The frame for capturing an image of the fan with a blade at the position "1" in FIG. 32 was used as the reference frame, and motion was captured when the blade was not at the position "1" while rotated. Moreover, even after the blade was fixed at the position in the reference frame over 60 seconds, false motion capturing did not occur. This means that the motion of an object that takes 60 seconds to move slightly can be captured.

This application is based on Japanese Patent Applications serial no. 2014-156296 and no. 2014-179769 filed with Japan Patent Office on Jul. 31, 2014 and Sep. 4, 2014, respectively, the entire contents of which are hereby incorporated by reference.

What is claimed is:

1. An imaging device comprising:
a pixel;
a digital circuit; and
an analog processing circuit comprising:
  a constant current circuit;
  a current comparison circuit; and
  a control circuit,
wherein the pixel is capable of outputting differential data,
wherein the constant current circuit is capable of supplying a first current corresponding to the differential data, in accordance with a first control signal,
wherein the current comparison circuit is capable of supplying a second current flowing in the constant current circuit in accordance with a change in the differential data,
wherein the current comparison circuit is capable of setting a determination signal active depending on whether to supply the second current to the constant current circuit or not,
wherein the control circuit is capable of stopping functions of the constant current circuit and the current comparison circuit when the determination signal becomes active, and
wherein the digital circuit is capable of operating when the determination signal becomes active.

2. A monitoring device comprising:
the imaging device according to claim 1;
a memory device functionally connected to the imaging device;
an alarm device functionally connected to the imaging device; and
a display device functionally connected to the imaging device.

3. An electronic device comprising:
the monitoring device according to claim 2; and
an operation key.

4. An imaging device comprising:
a pixel;
a digital circuit; and
an analog processing circuit comprising:
  a constant current circuit;
  a current comparison circuit comprising a comparator, an amplifier circuit, a transistor, and a latch circuit; and
  a control circuit,
wherein the pixel is capable of outputting differential data,
wherein the constant current circuit is capable of supplying a first current corresponding to the differential data, in accordance with a first control signal,
wherein the current comparison circuit is capable of supplying the constant current circuit with a second current flowing in accordance with a change in the differential data,
wherein the comparator is capable of generating an output signal for inputting and outputting the second current, when a bias voltage is applied,
wherein the amplifier circuit is capable of amplifying the output signal,
wherein the transistor is provided between the comparator and the amplifier circuit,
wherein the on/off state of the transistor is controlled in accordance with a second control signal,
wherein the latch circuit is capable of latching the amplified output signal,
wherein the latch circuit is capable of setting a determination signal active,
wherein the control circuit is capable of stopping output of the bias voltage, switching output of the first control signal so that the first current does not flow through the constant current circuit, and switching output of the second control signal so that the transistor is turned off, when the determination signal becomes active, and
wherein the digital circuit is capable of operating when the determination signal becomes active.

5. The imaging device according to claim 4, wherein the latch circuit is initialized with a reset signal.

6. The imaging device according to claim 4, wherein a channel formation region of the transistor comprises an oxide semiconductor.

7. A monitoring device comprising:
the imaging device according to claim 4;
a memory device functionally connected to the imaging device;
an alarm device functionally connected to the imaging device; and
a display device functionally connected to the imaging device.

8. An electronic device comprising:
the monitoring device according to claim 7; and
an operation key.

9. An imaging device comprising:
a pixel comprising an imaging element;
an analog processing circuit; and
a digital circuit,
wherein the analog processing circuit is configured to compare a current output from the pixel with a reference current output from the pixel to determine whether the current and the reference current are the same or not,
wherein the analog processing circuit is configured to output a control signal when the current is different from the reference current, and
wherein the control signal makes the analog processing circuit inactive and the digital circuit active.

10. The imaging device according to claim 9,
wherein the analog processing circuit comprises:
a constant current circuit;
a current comparison circuit; and
a control circuit,
wherein the constant current circuit is configured so that the reference current flows,
wherein the current comparison circuit is configured to maintain the reference current and output the control signal when the current output from the pixel is different from the reference current, and
wherein the control circuit is configured to output a signal making the analog processing circuit inactive in accordance with the control signal.

11. The imaging device according to claim 10, wherein the control circuit is configured to output a signal to stop the current flowing in the constant current circuit in accordance with the control signal.

12. The imaging device according to claim 10, wherein the control circuit is configured to output a signal to stop the current comparison circuit outputting the control signal.

13. The imaging device according to claim 10,
wherein the constant current circuit comprises:
first to sixth transistor, each comprising a first terminal, a second terminal, and a gate; and
a capacitor comprising a first terminal and a second terminal,
wherein the first terminal of the first transistor is electrically connected to the pixel,
wherein the gate of the first transistor is electrically connected to the control circuit,
wherein the second terminal of the first transistor is electrically connected to the first terminal of the second transistor, the first terminal of the third transistor, and the first terminal of the fourth transistor,
wherein the second terminal of the third transistor is electrically connected to the gate of the fourth transistor and the first terminal of the capacitor,
wherein the second terminal of the fourth transistor is electrically connected to the second terminal of the capacitor,
wherein the second terminal of the second transistor is electrically connected to the second terminal of the fifth transistor, the first terminal of the sixth transistor, and the gate of the sixth transistor,
wherein the first terminal of the fifth transistor is electrically connected to the current comparison circuit and the gate of the fifth transistor, and
wherein the second terminal of the sixth transistor is electrically connected to the current comparison circuit.

14. The imaging device according to claim 10,
wherein the pixel comprises:
first to fourth transistor, each comprising a first terminal, a second terminal, and a gate;
a first capacitor comprising a first terminal and a second terminal; and
the imaging element,
wherein the first terminal of the first transistor is electrically connected to the first terminal of the second transistor and the first terminal of the first capacitor,
wherein the second terminal of the first transistor is electrically connected to the imaging element,
wherein the second terminal of the first capacitor is electrically connected to the first terminal of the third transistor and the gate of the fourth transistor, and
wherein the first terminal of the fourth transistor is electrically connected to the constant current circuit.

15. The imaging device according to claim 14,
wherein the pixel comprises a second capacitor, and
wherein a first terminal of the second capacitor is electrically connected to the second terminal of the first capacitor, the first terminal of the third transistor, and the gate of the fourth transistor.

16. The imaging device according to claim 14,
wherein the third transistor comprises an oxide semiconductor layer comprising a channel formation region.

17. The imaging device according to claim 14,
wherein the first transistor and the second transistor each comprise an oxide semiconductor layer comprising a channel formation region.

18. The imaging device according to claim 10, wherein the imaging element is a photoelectric conversion element.

19. The imaging device according to claim 10, wherein the digital circuit is an A/D converter circuit.

20. The imaging device according to claim 10, wherein the digital circuit is configured to convert imaging data output from the pixel into digital data.

* * * * *